US012206972B2

(12) United States Patent
Han et al.

(10) Patent No.: US 12,206,972 B2
(45) Date of Patent: Jan. 21, 2025

(54) DISTANCE MEASURING CAMERA APPARATUS

(71) Applicant: LG INNOTEK CO., LTD., Seoul (KR)

(72) Inventors: Sang Heon Han, Seoul (KR); Bum Jin Kim, Seoul (KR); Seok Hyun Kim, Seoul (KR); In Jun Seo, Seoul (KR); Myung Jin Song, Seoul (KR); Jae Hoon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 247 days.

(21) Appl. No.: 17/909,290

(22) PCT Filed: Mar. 2, 2021

(86) PCT No.: PCT/KR2021/002551
§ 371 (c)(1),
(2) Date: Sep. 2, 2022

(87) PCT Pub. No.: WO2021/177692
PCT Pub. Date: Sep. 10, 2021

(65) Prior Publication Data
US 2023/0078421 A1  Mar. 16, 2023

(30) Foreign Application Priority Data

Mar. 3, 2020 (KR) .................. 10-2020-0026597
Jan. 15, 2021 (KR) .................. 10-2021-0005926

(51) Int. Cl.
*H04N 23/56* (2023.01)
*G01S 17/894* (2020.01)
(Continued)

(52) U.S. Cl.
CPC ........... *H04N 23/56* (2023.01); *G01S 17/894* (2020.01); *H04N 23/54* (2023.01); *H04N 23/55* (2023.01); *H04N 23/57* (2023.01)

(58) Field of Classification Search
CPC ........ H04N 23/56; H04N 23/54; H04N 23/57; H04N 23/50; H04N 23/55; G01S 17/894
See application file for complete search history.

(56) References Cited

U.S. PATENT DOCUMENTS

2021/0099618 A1   4/2021 O

FOREIGN PATENT DOCUMENTS

| CN | 109151271 A | * 1/2019 | ............. G03B 15/05 |
| CN | 110412540 A |  11/2019 | |

(Continued)

OTHER PUBLICATIONS

Translation of WIPO publication WO2020038060A1, Feb. 27, 2020 (Year: 2020).*

(Continued)

*Primary Examiner* — Nicholas G Giles
(74) *Attorney, Agent, or Firm* — Birch, Stewart, Kolasch & Birch, LLP

(57) ABSTRACT

According to an embodiment of the present invention, disclosed is a camera apparatus comprising: a substrate; a light emitting part; a light receiving part comprising an image sensor located on the substrate; and a controller that controls the optical part or the light source using an output value received from a photodetector, wherein the light emitting part comprises: a light source located on the substrate; a holder located on the substrate; an optical part located on the light source; a driving part that moves the optical part along an optical axis; and the photodetector located on the substrate.

14 Claims, 34 Drawing Sheets

(51) Int. Cl.
*H04N 23/54* (2023.01)
*H04N 23/55* (2023.01)
*H04N 23/57* (2023.01)

(56) References Cited

FOREIGN PATENT DOCUMENTS

| | | |
|---|---|---|
| EP | 1 830 304 A1 | 9/2007 |
| JP | 2008-300095 A | 12/2008 |
| JP | 2012-93189 A | 5/2012 |
| JP | 2014-17716 A | 1/2014 |
| KR | 10-2010-0003639 A | 1/2010 |
| KR | 10-2011-0051877 A | 5/2011 |
| KR | 10-2015-0042631 A | 4/2015 |
| KR | 10-2019-0110231 A | 9/2019 |
| WO | WO 2019/240517 A1 | 12/2019 |
| WO | WO-2020038060 A1 * | 2/2020 ............ G03B 15/05 |

OTHER PUBLICATIONS

Translation of Chinese publication CN109151271A, Jan. 4, 2019 (Year: 2019).*

* cited by examiner

[Fig.1]
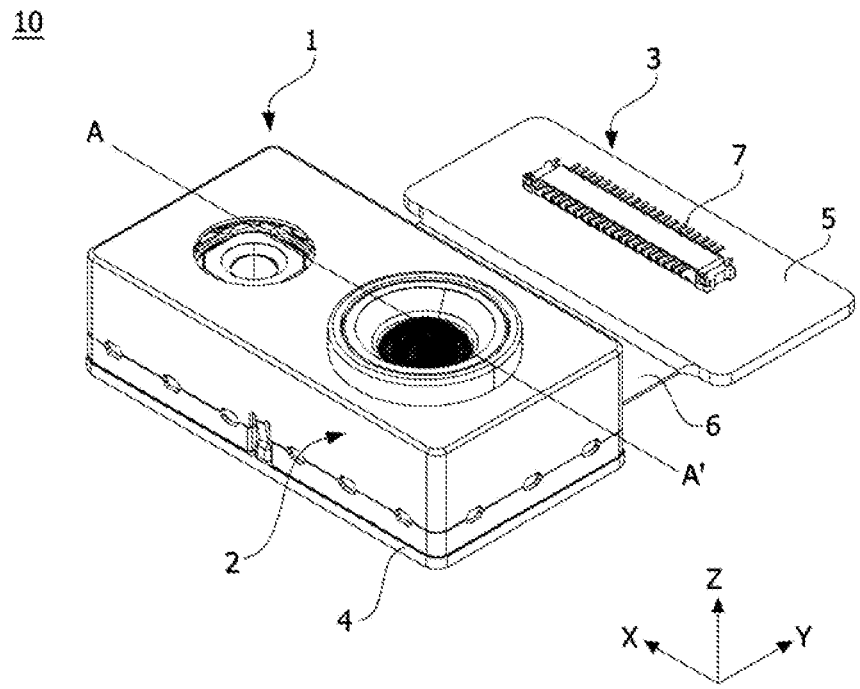
[Fig.2]
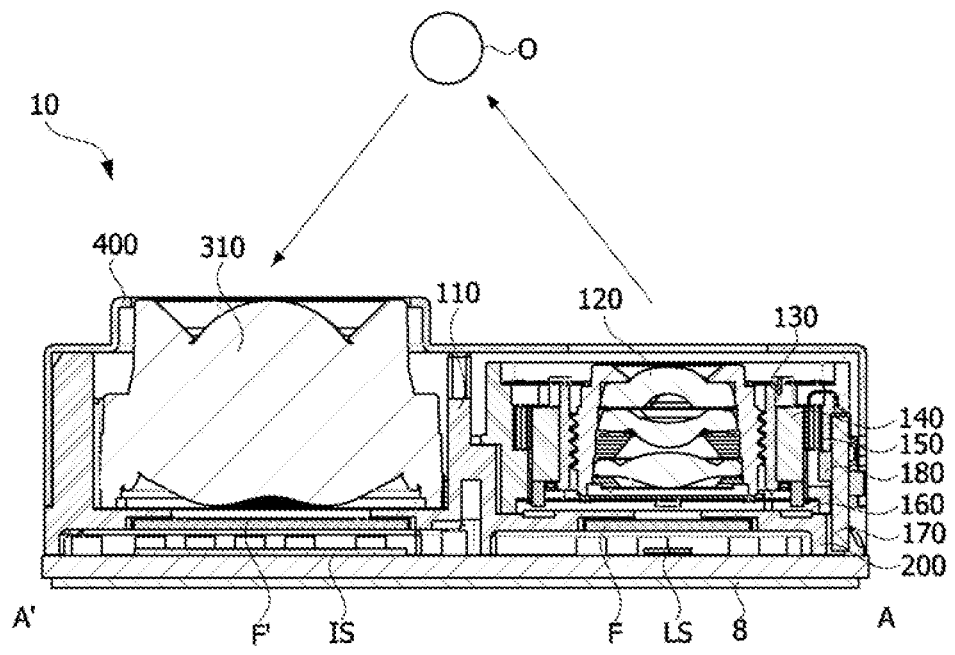

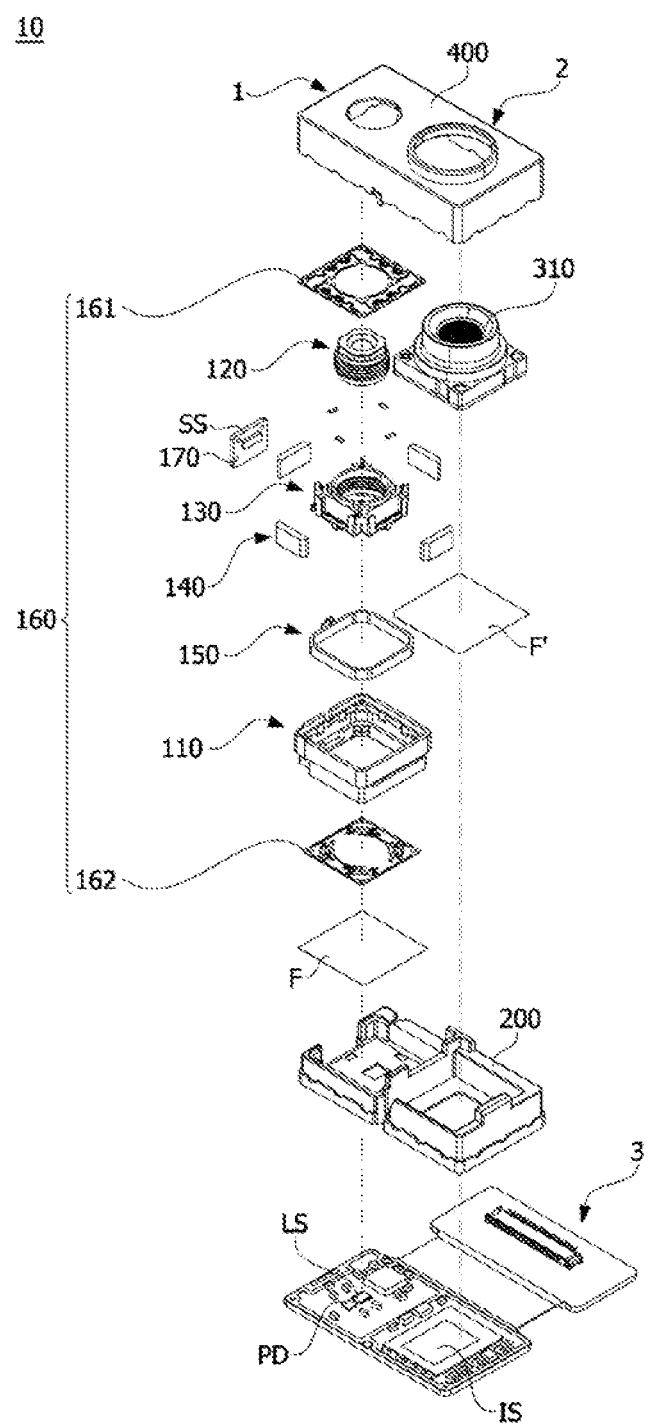
[Fig.3]

[Fig.4]
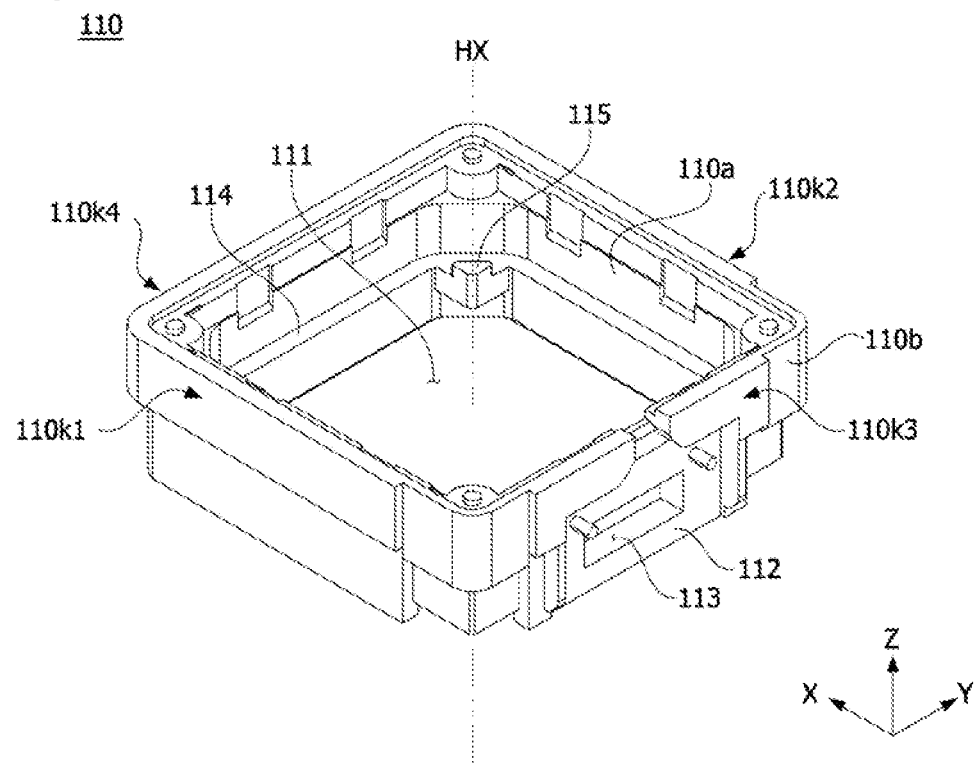
[Fig.5]
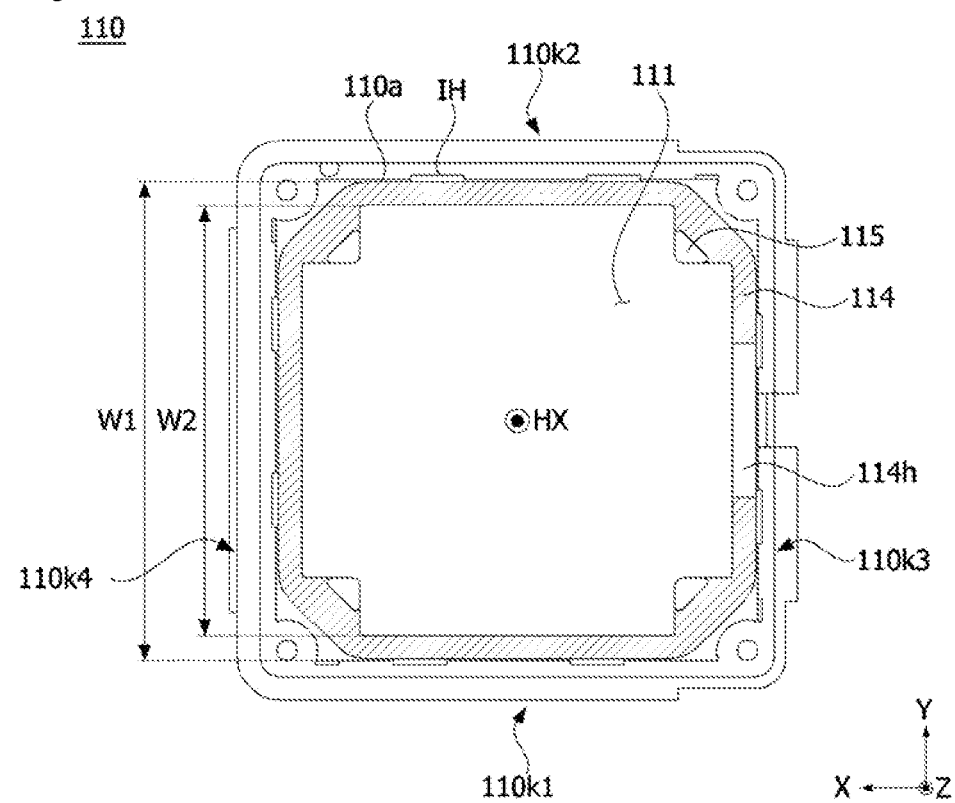

[Fig.6]
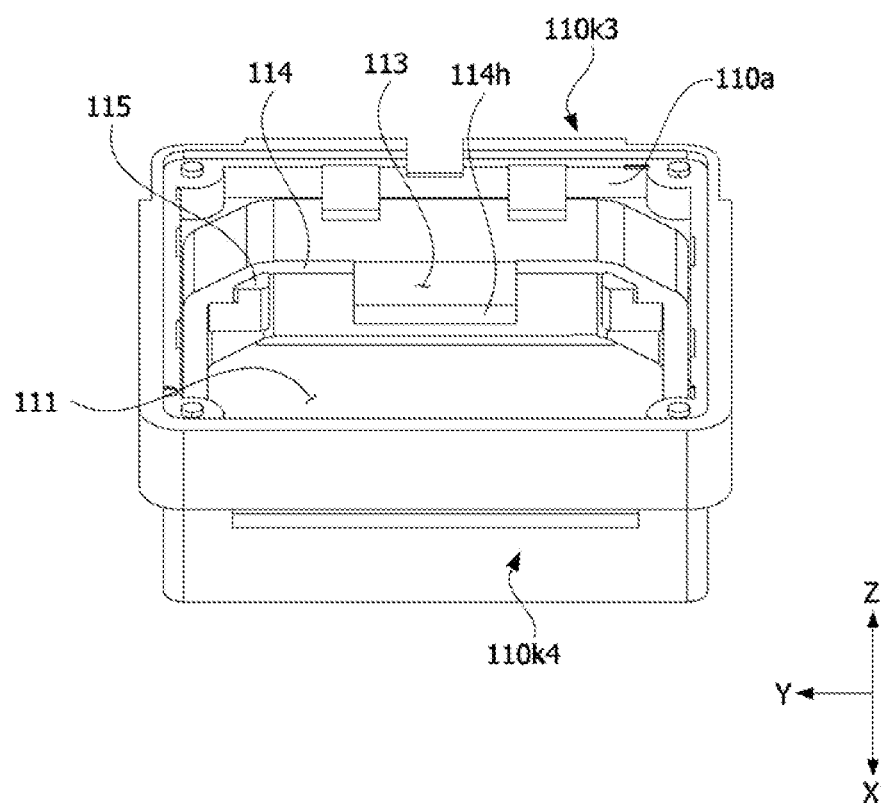

[Fig.7]
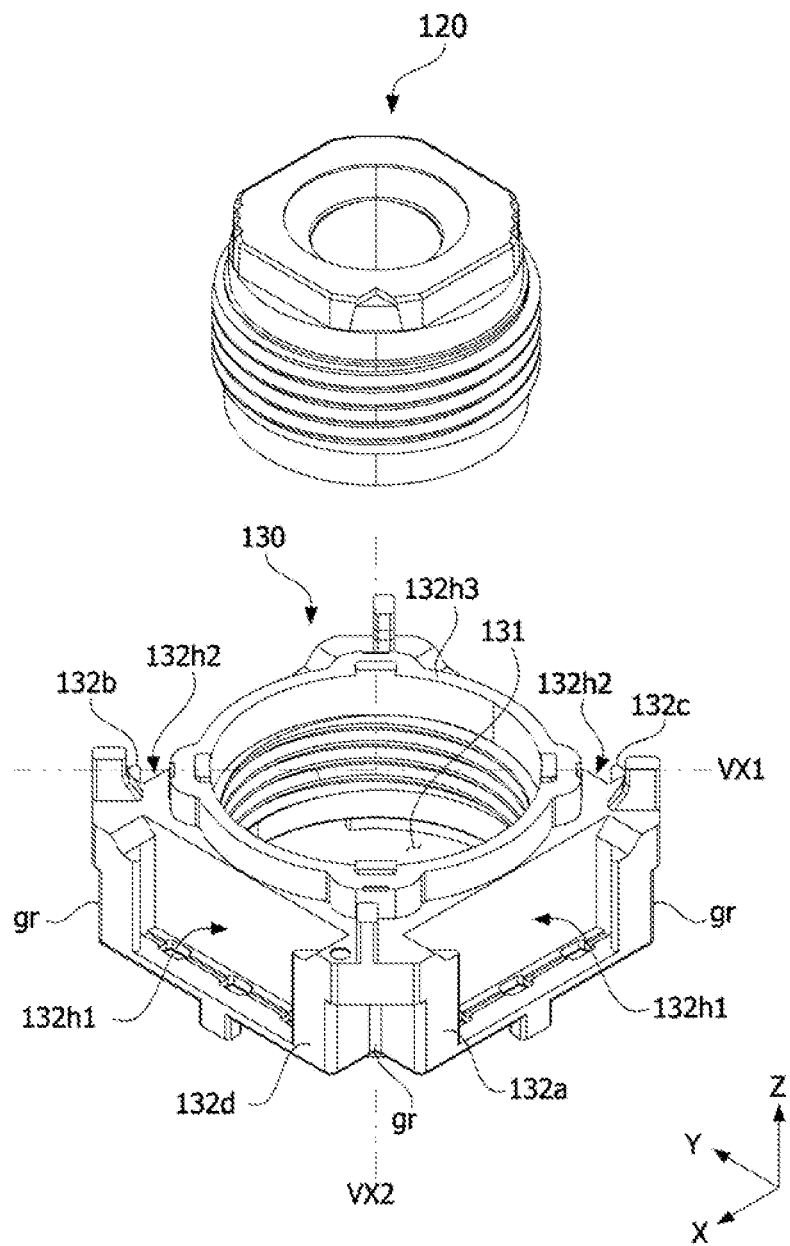

[Fig.8]
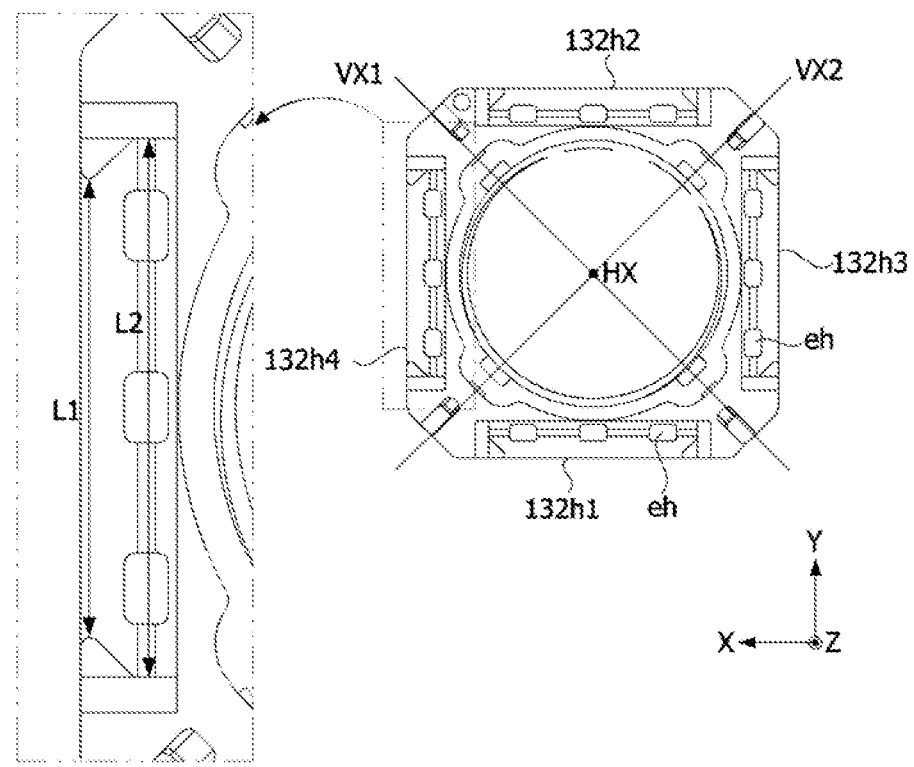
[Fig.9]
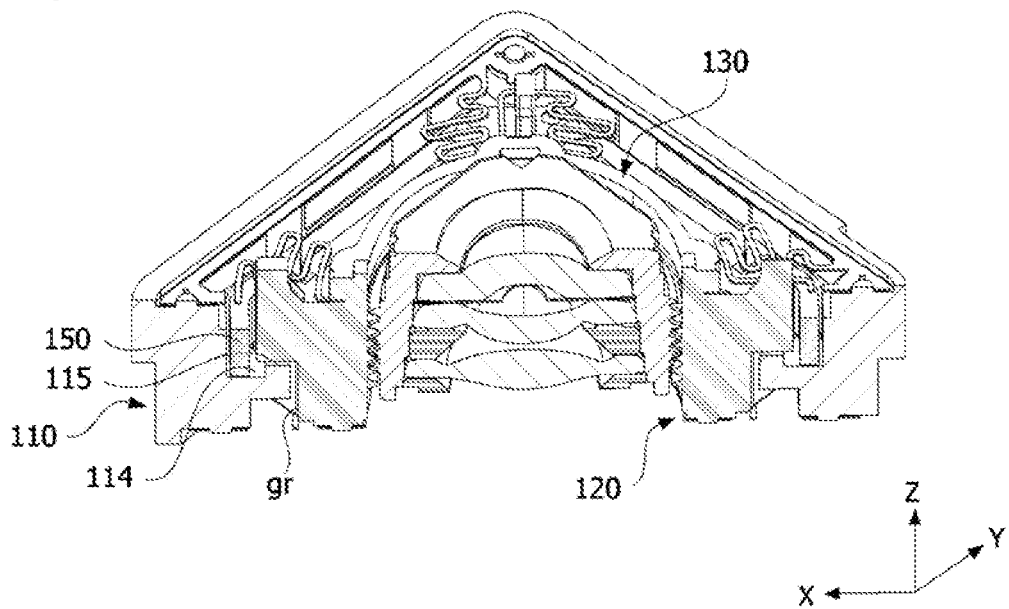

[Fig.10]
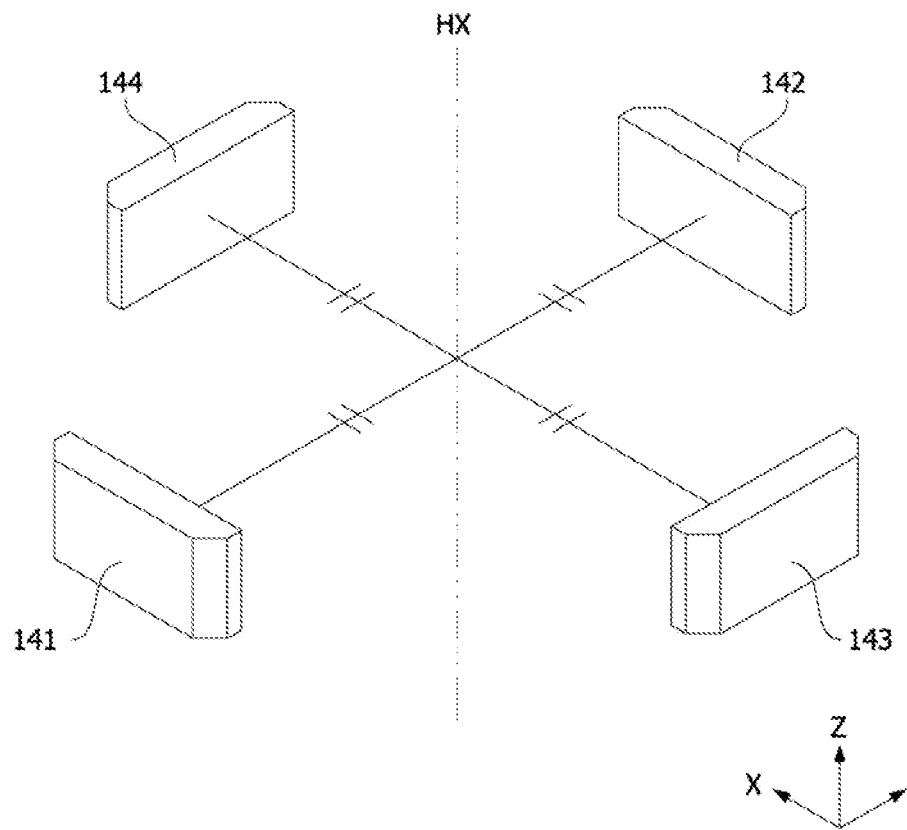
[Fig.11]
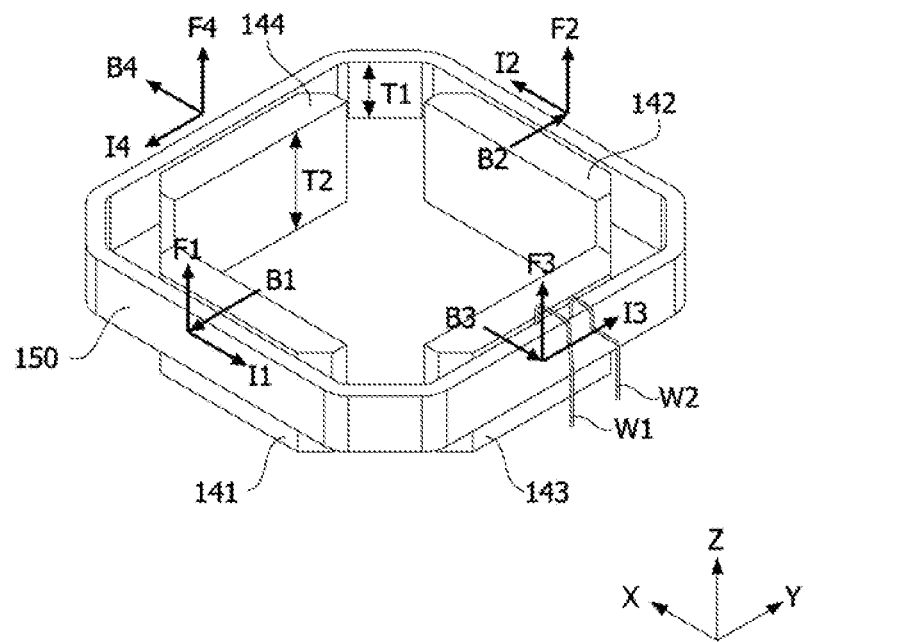

[Fig.12]
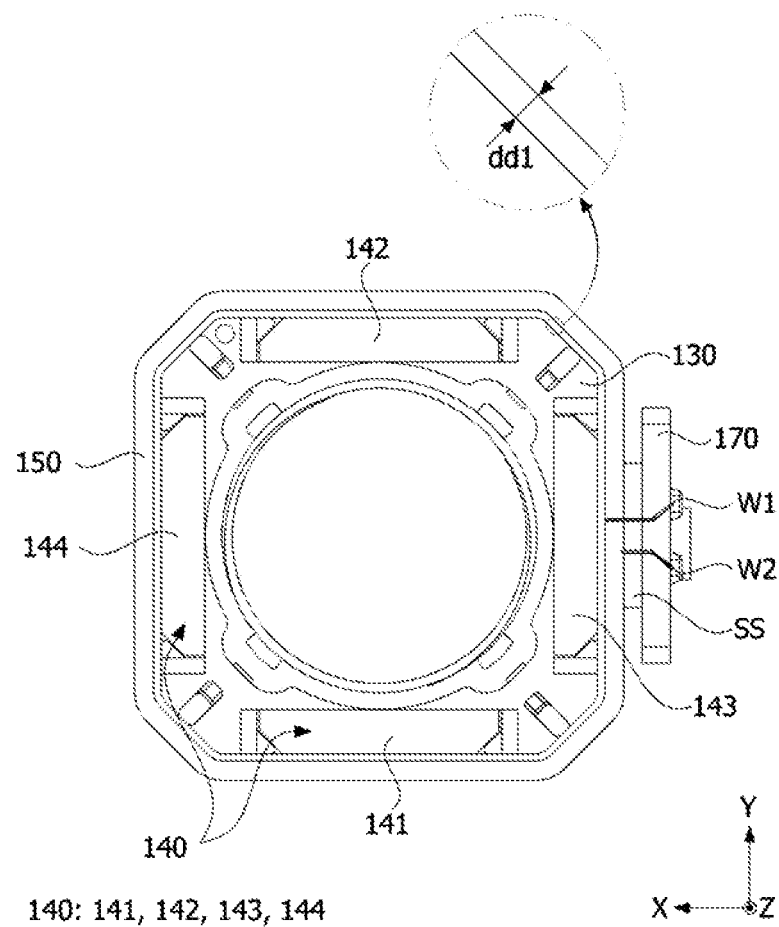

[Fig.13]
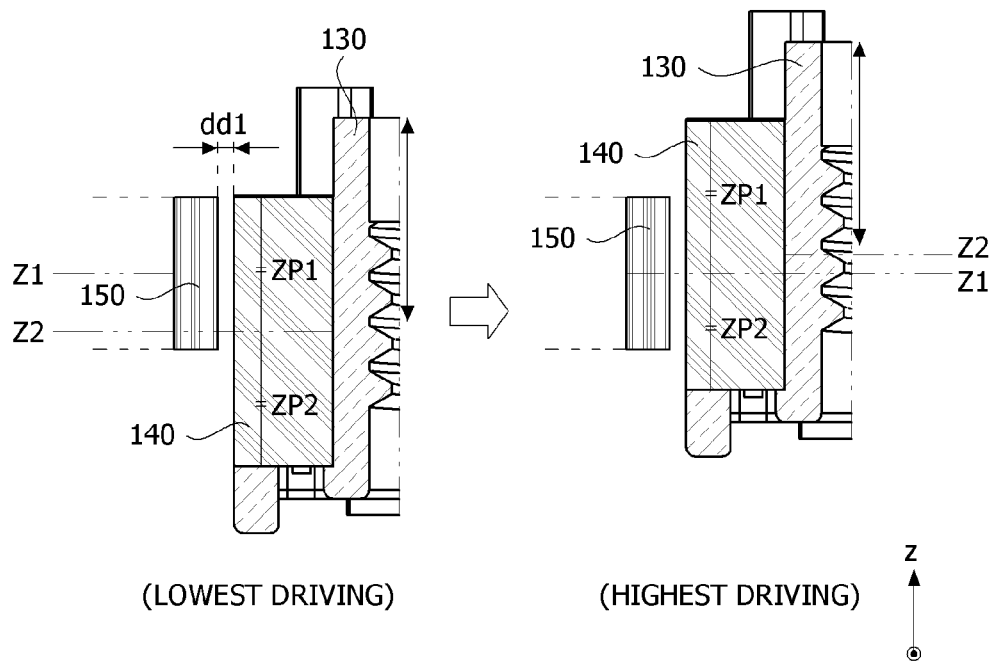
(LOWEST DRIVING) (HIGHEST DRIVING)
[Fig.14]
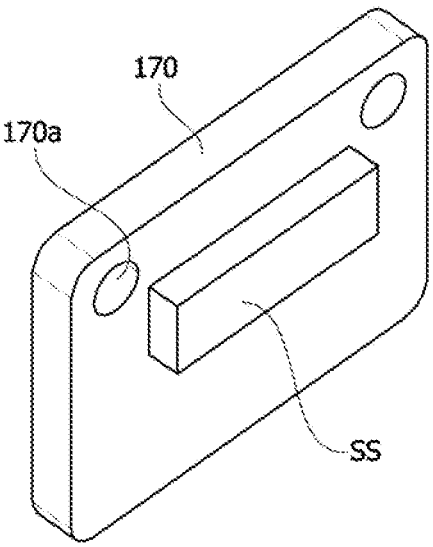

【Fig.15】
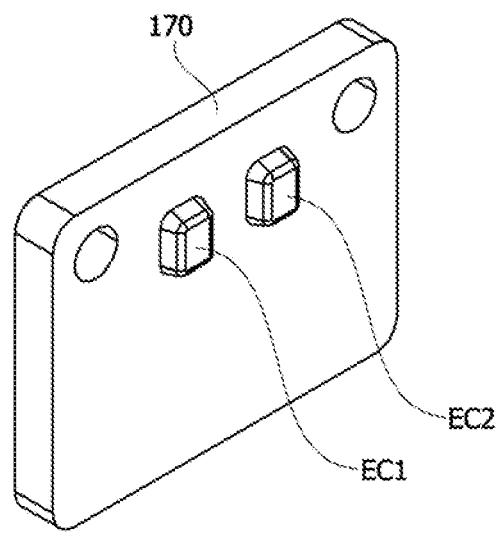
【Fig.16】
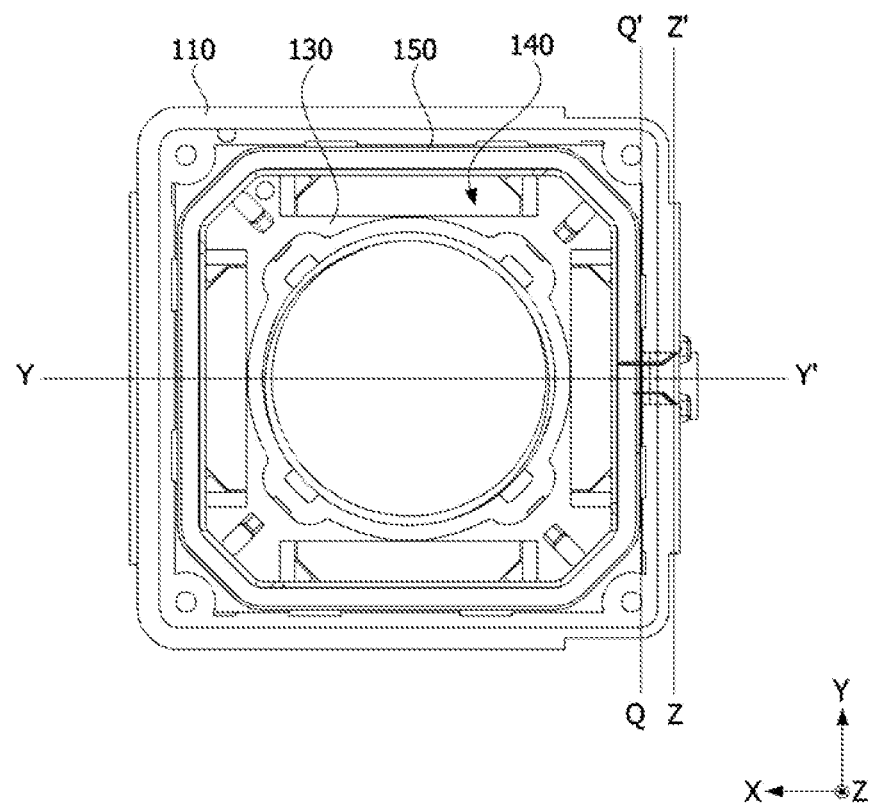

[Fig.17]
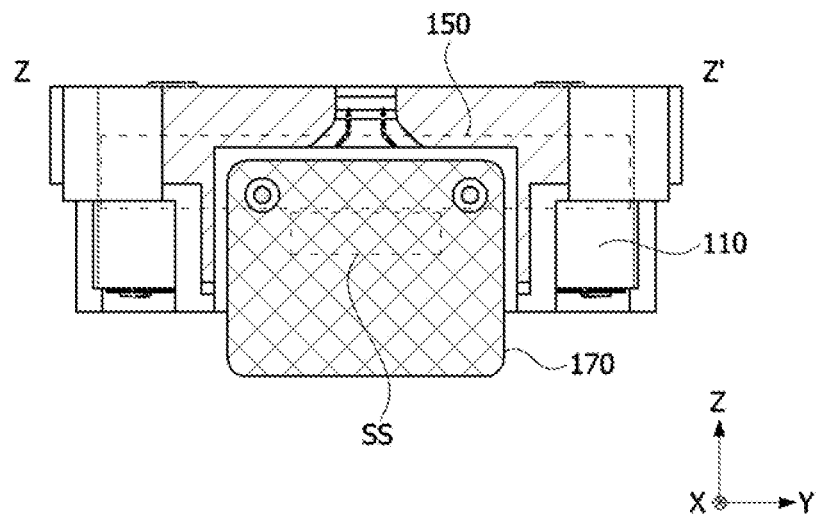
[Fig.18]
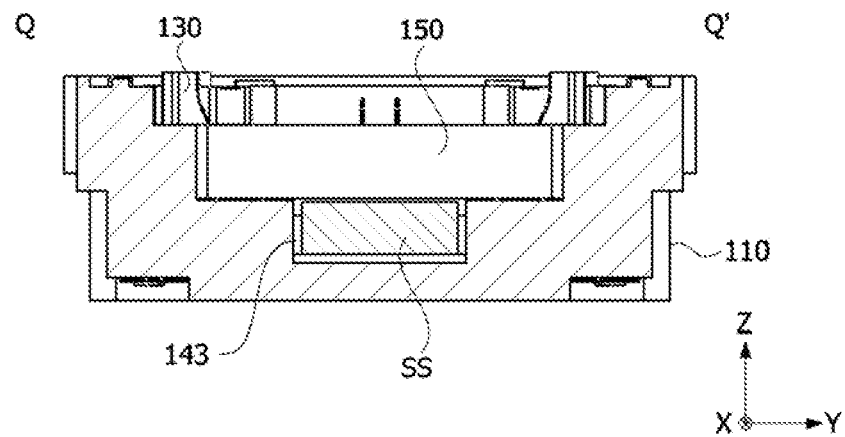

[Fig.19]
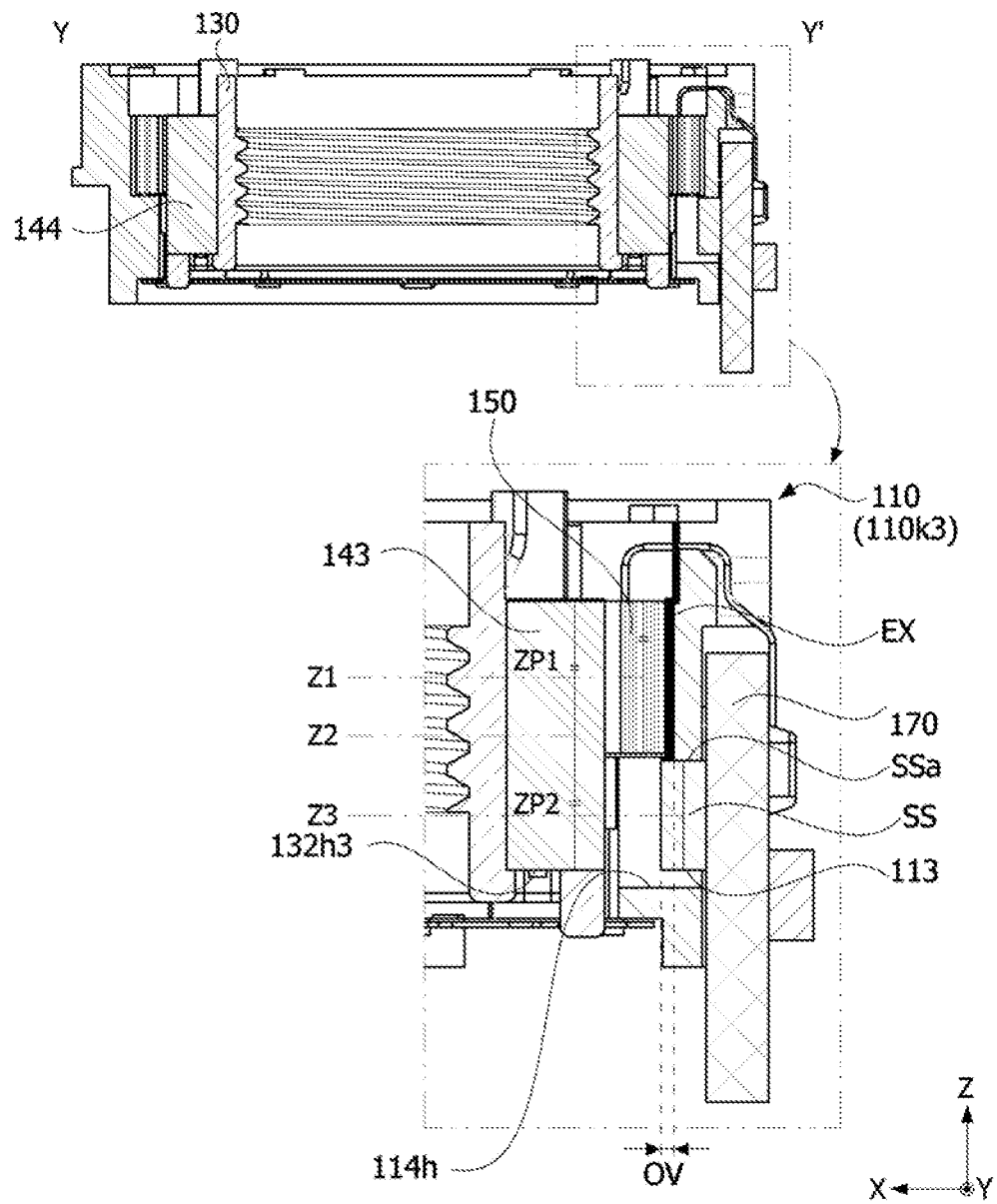

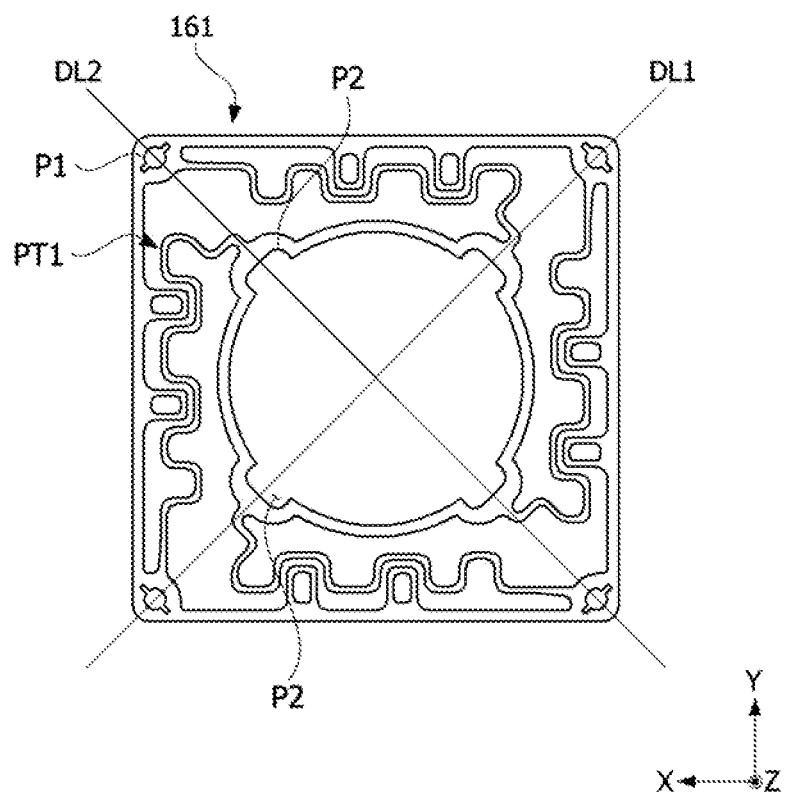
[Fig.20]

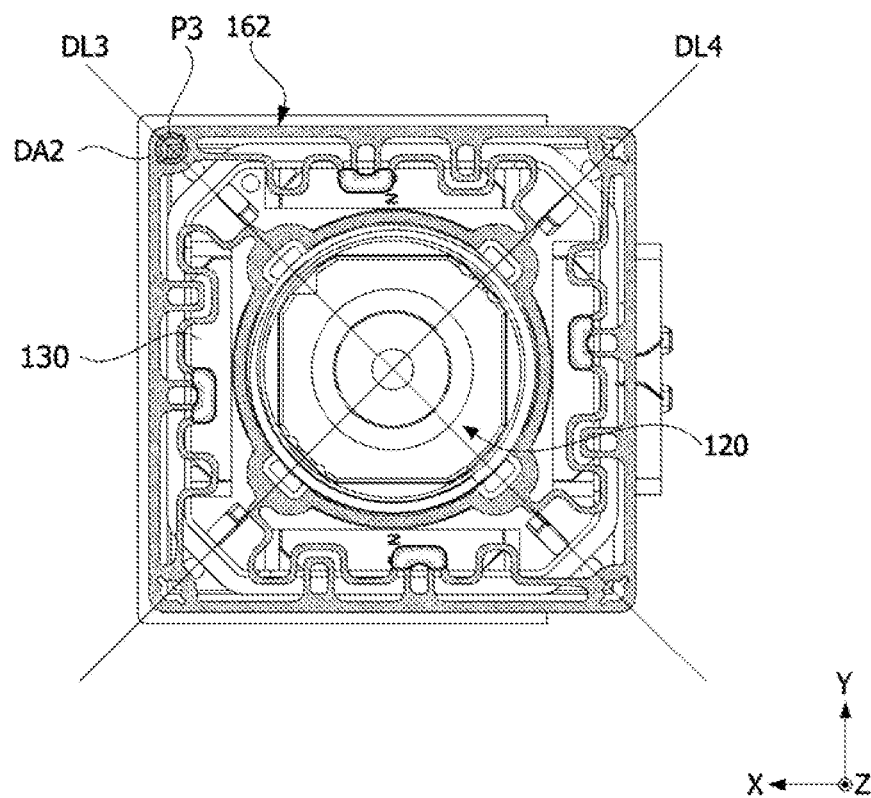
[Fig.21]

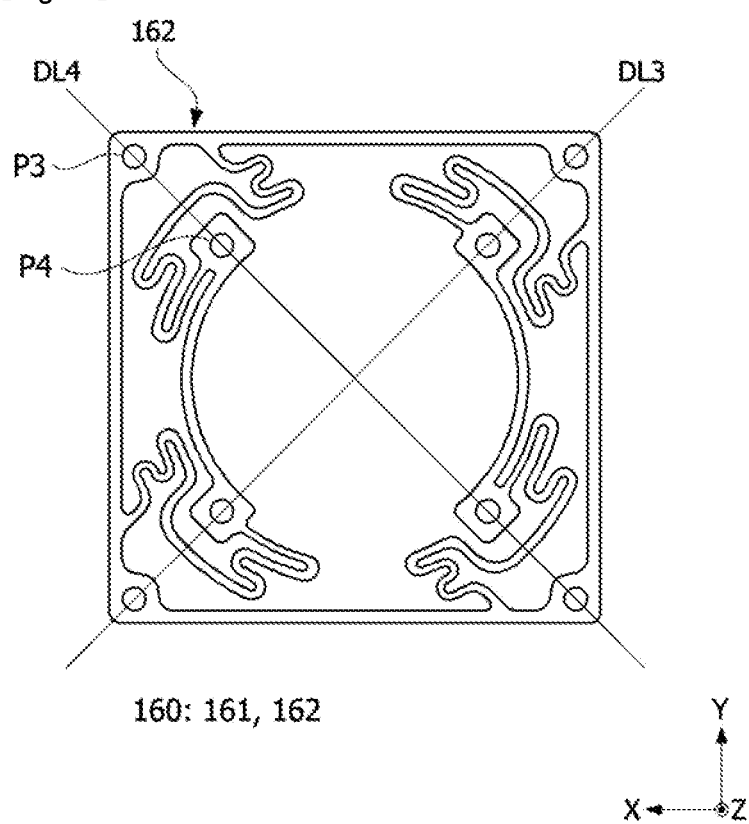
[Fig.22]

[Fig.23]
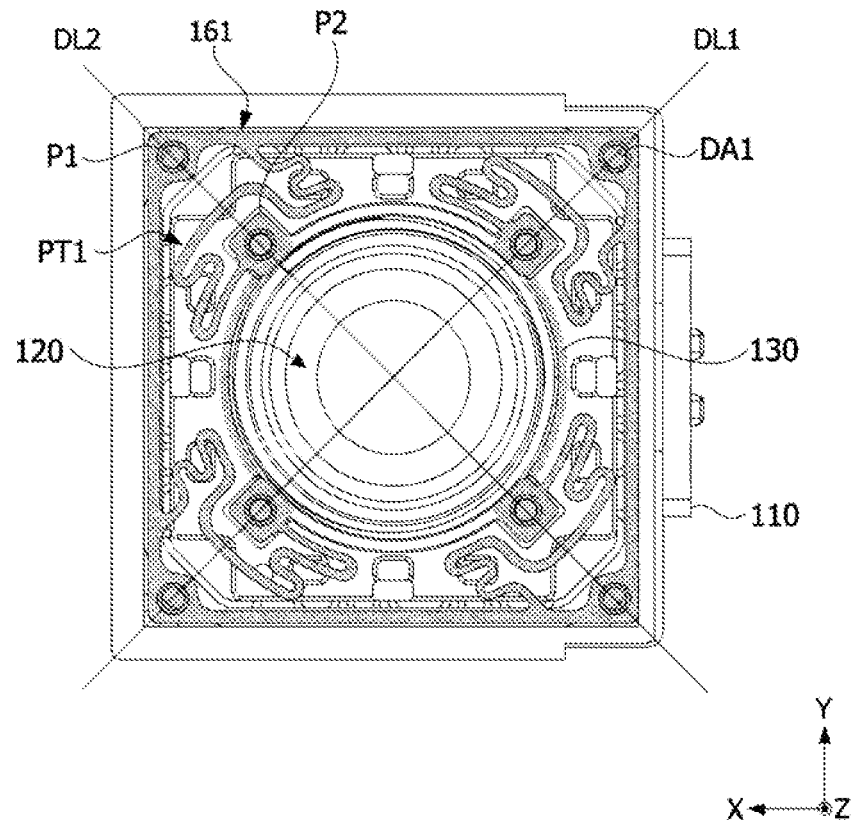
[Fig.24]
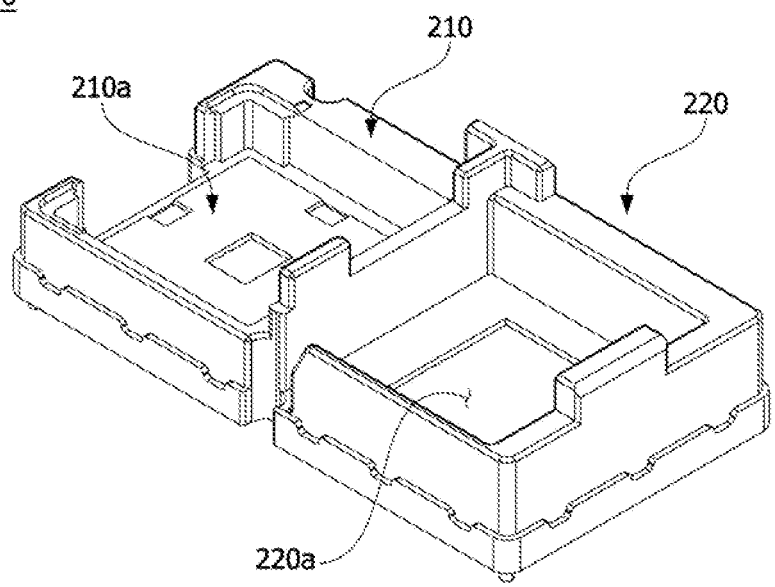

【Fig.25】
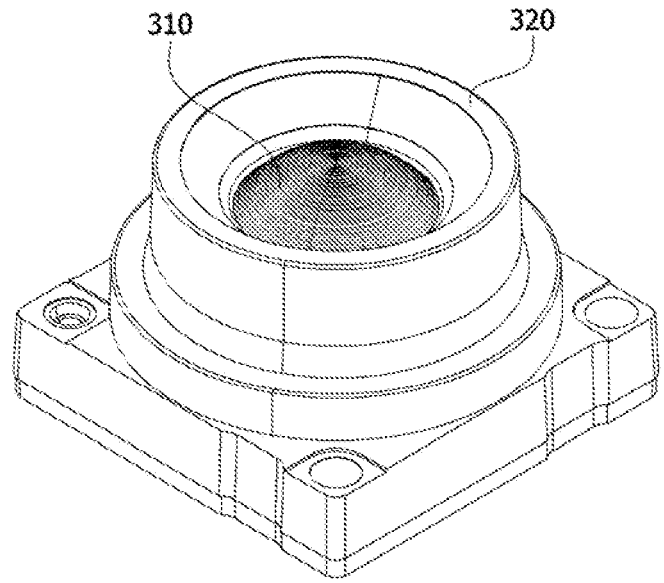
【Fig.26】
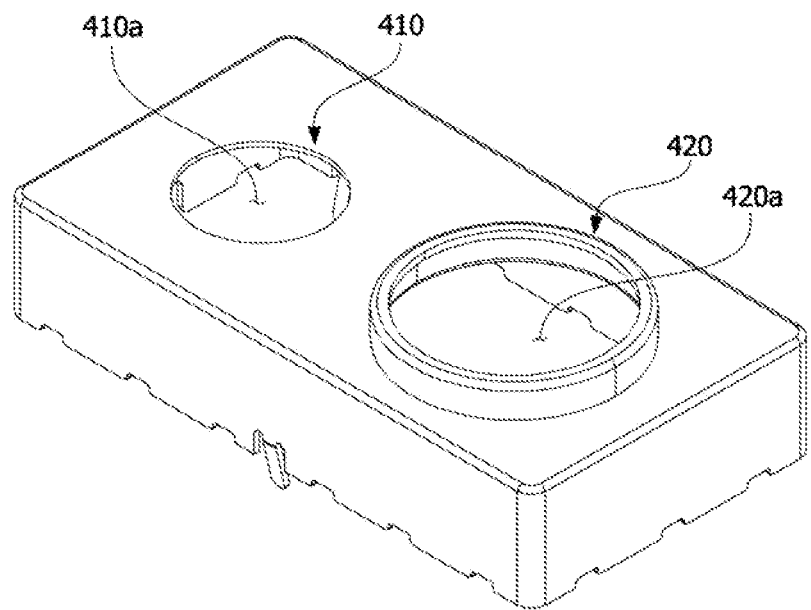

[Fig.27]
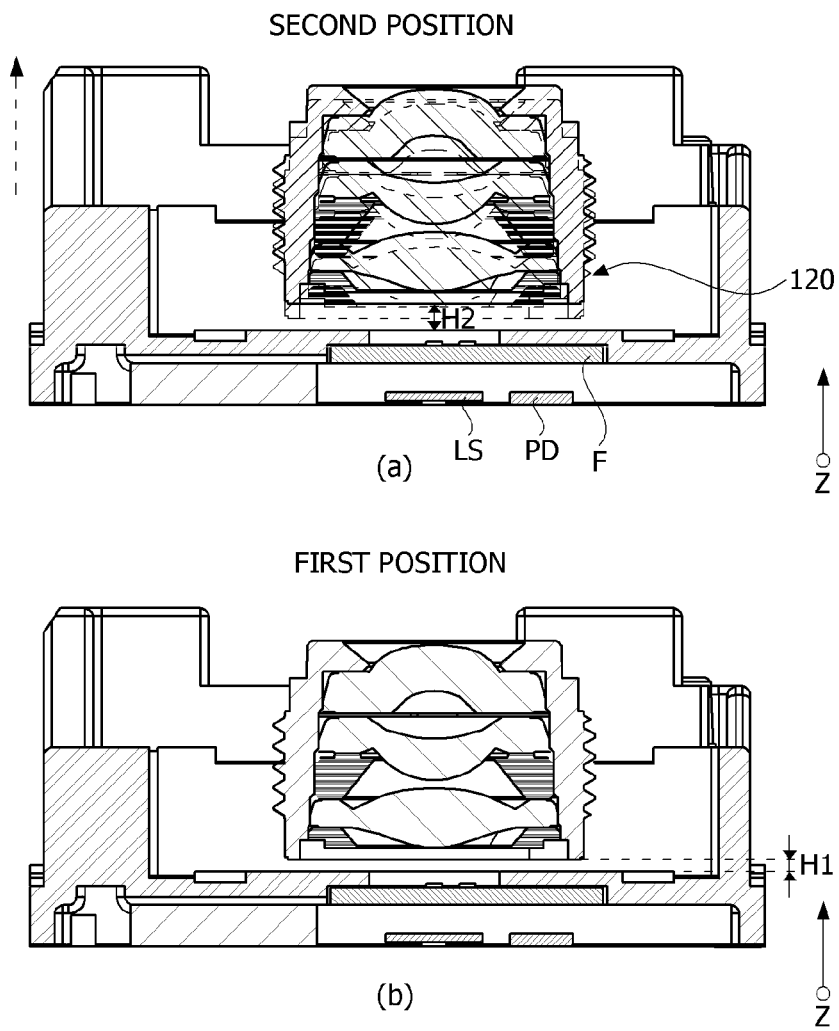
[Fig.28]
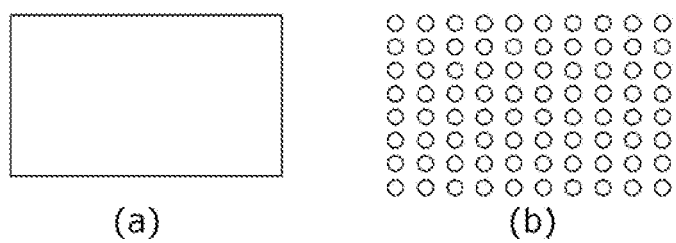

[Fig.29]
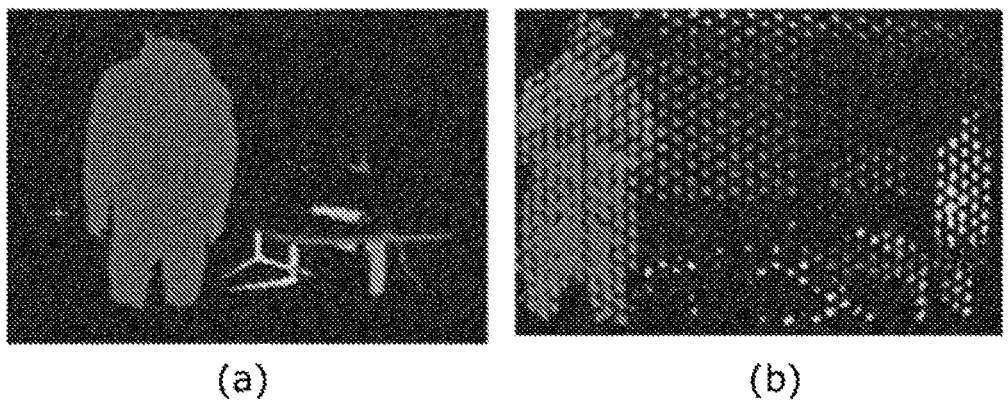
(a)        (b)
[Fig.30]
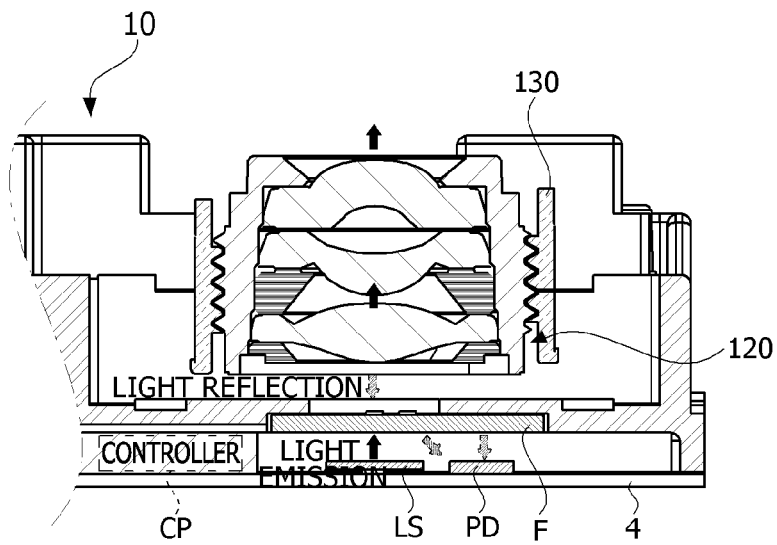

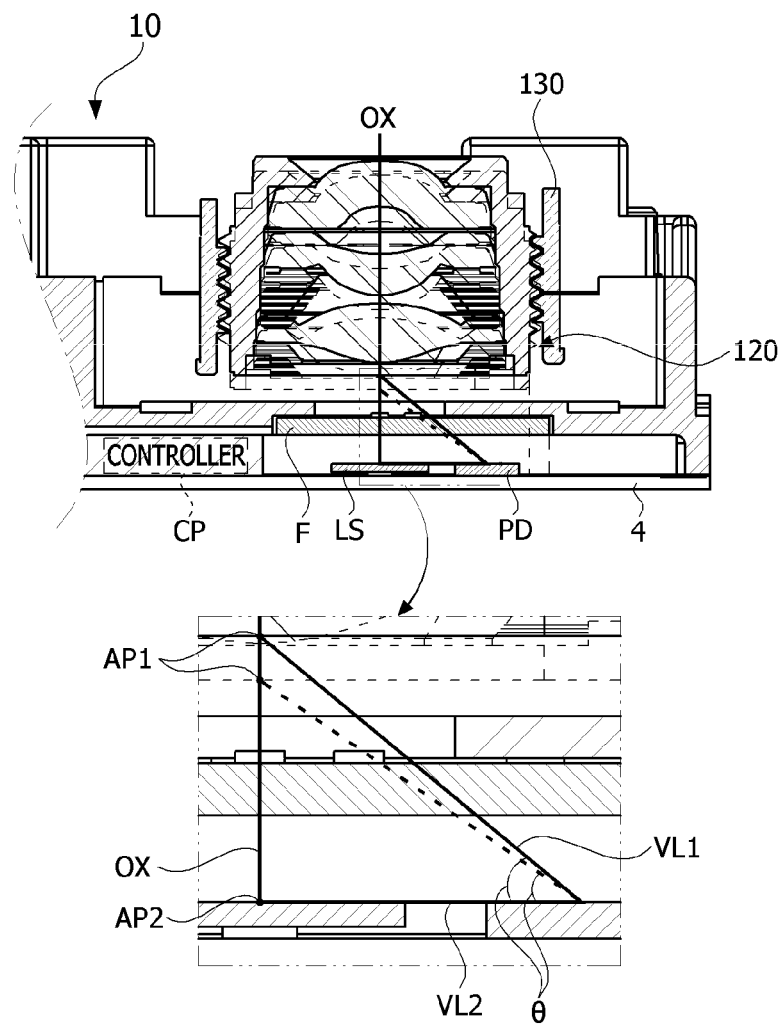
[Fig.31]

[Fig.32]
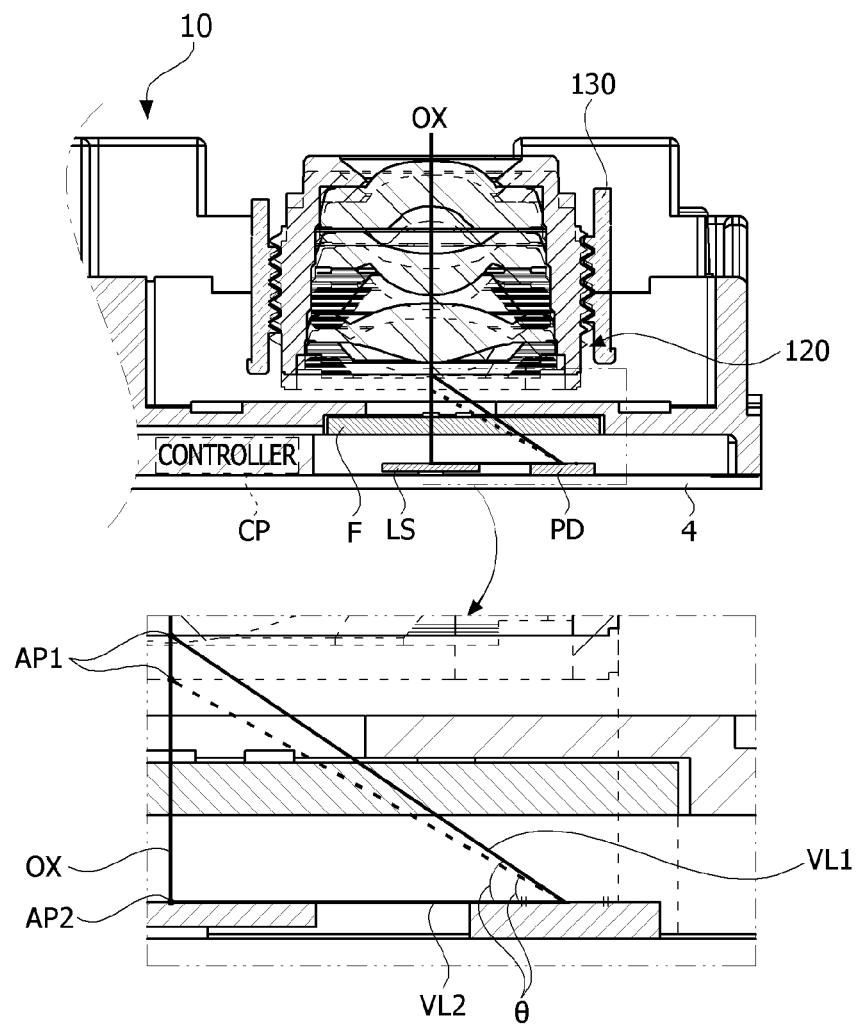

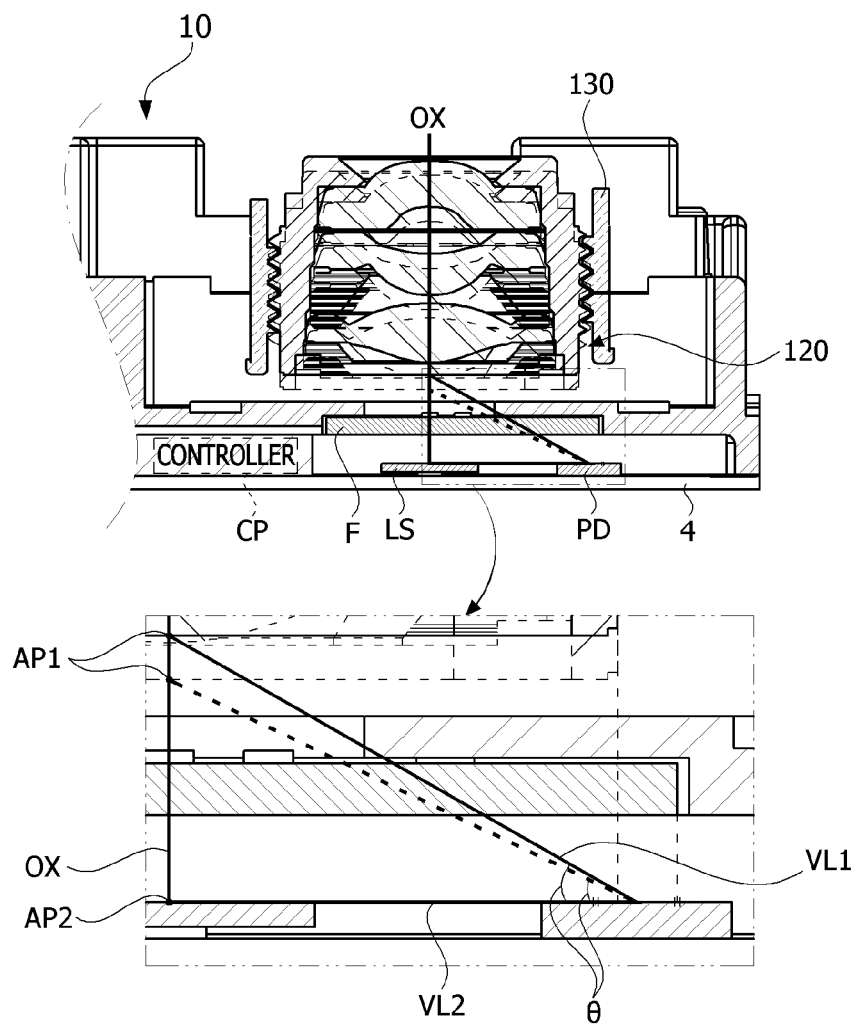
[Fig.33]

[Fig.34]
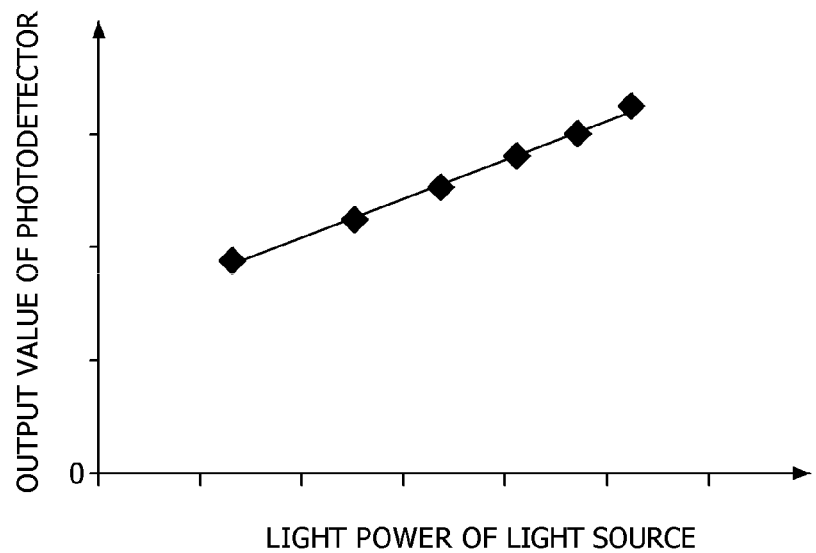
[Fig.35]
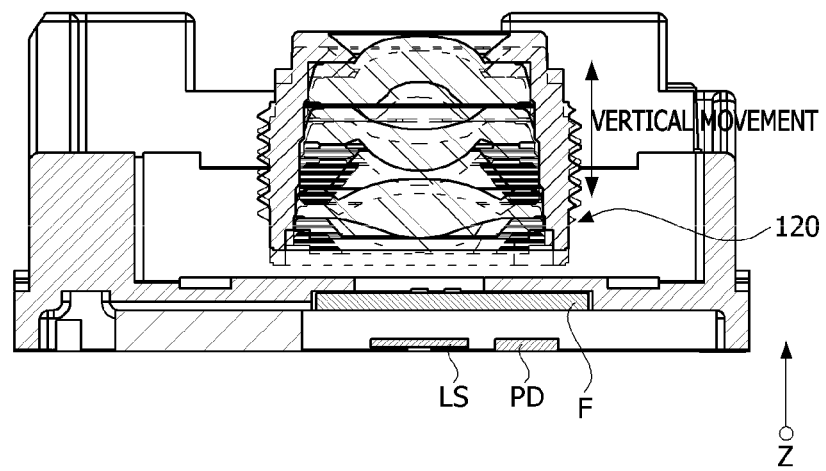

[Fig.36]
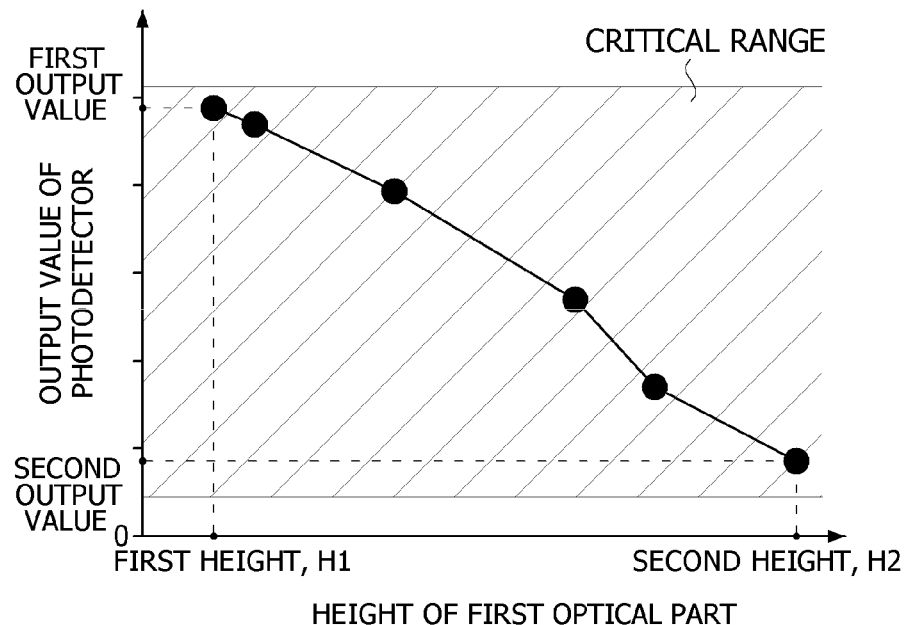
[Fig.37]
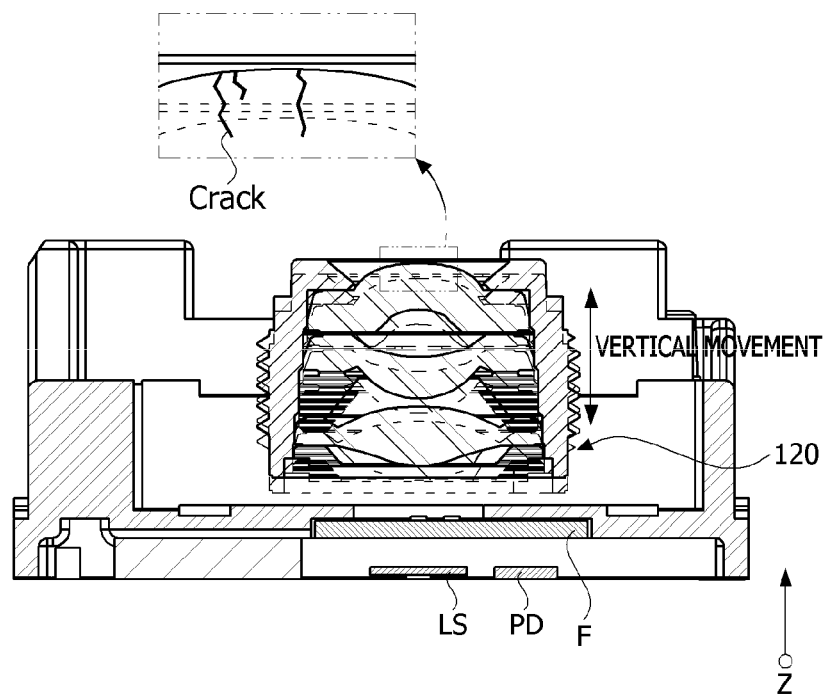

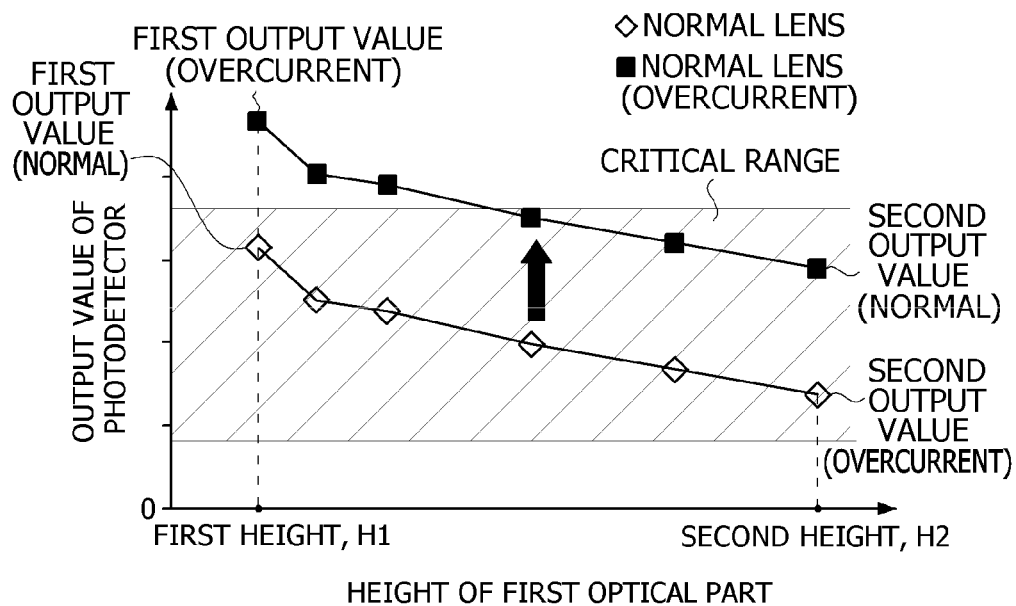
[Fig.38]
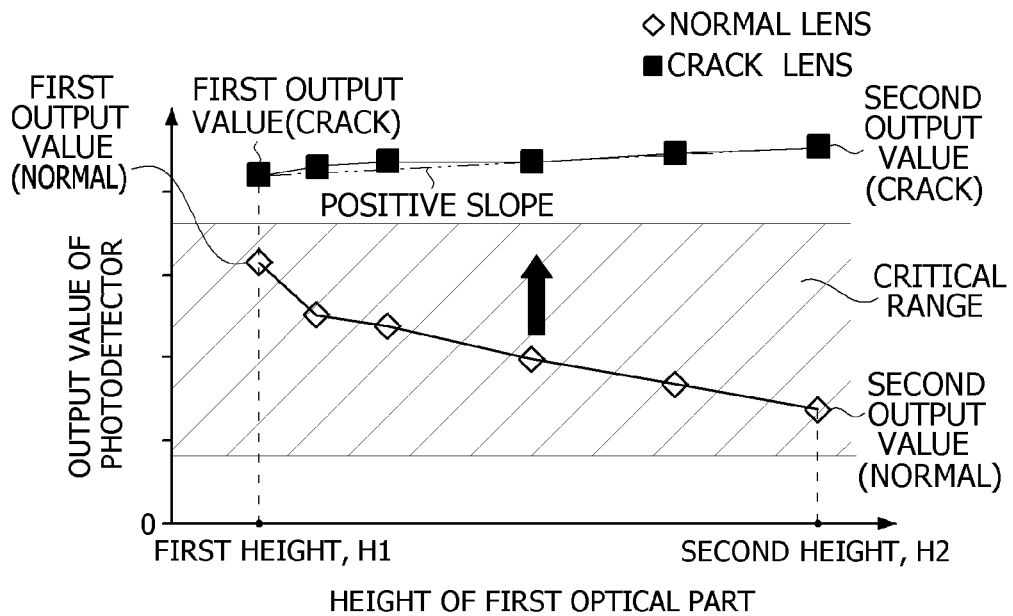
[Fig.39]

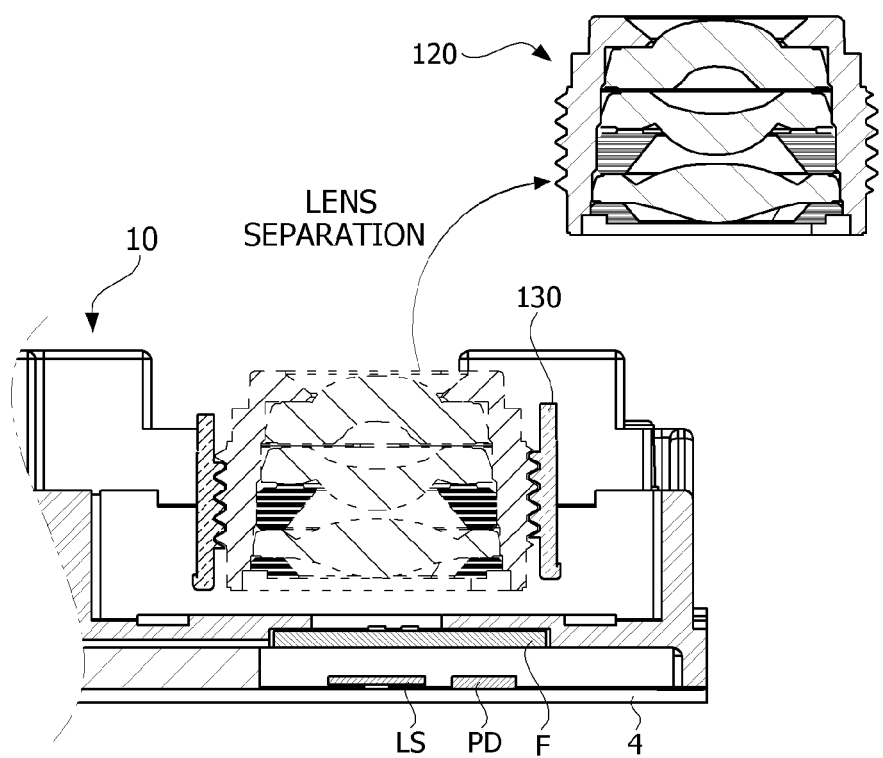

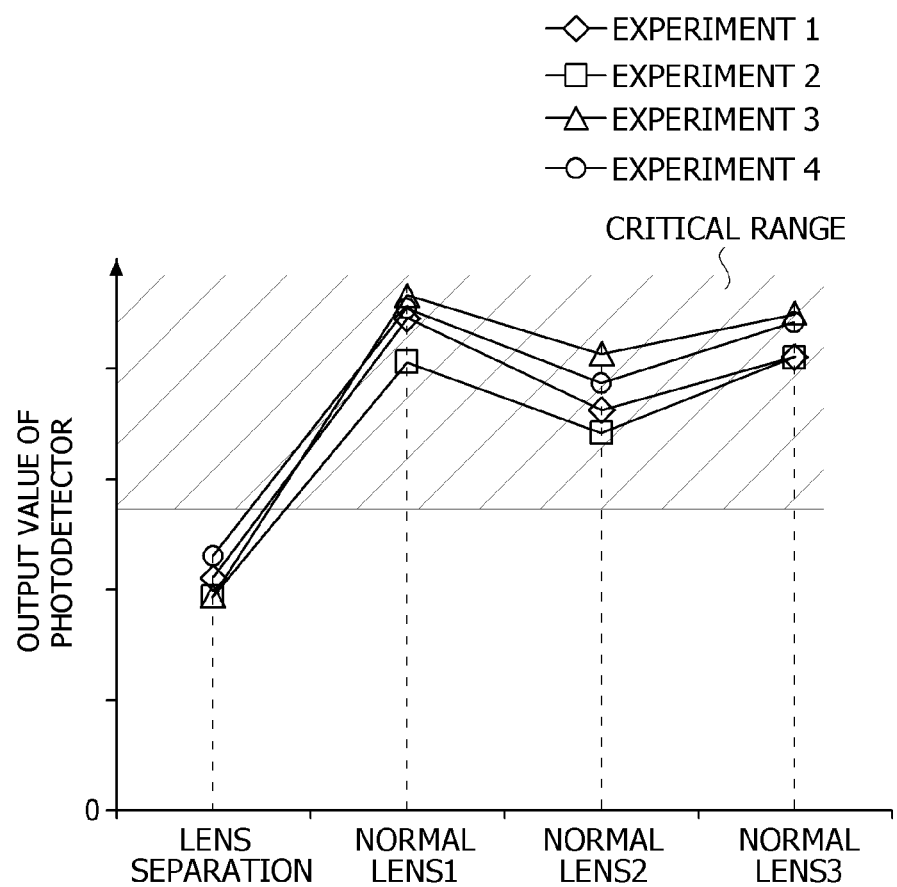
[Fig.41]

[Fig.42]
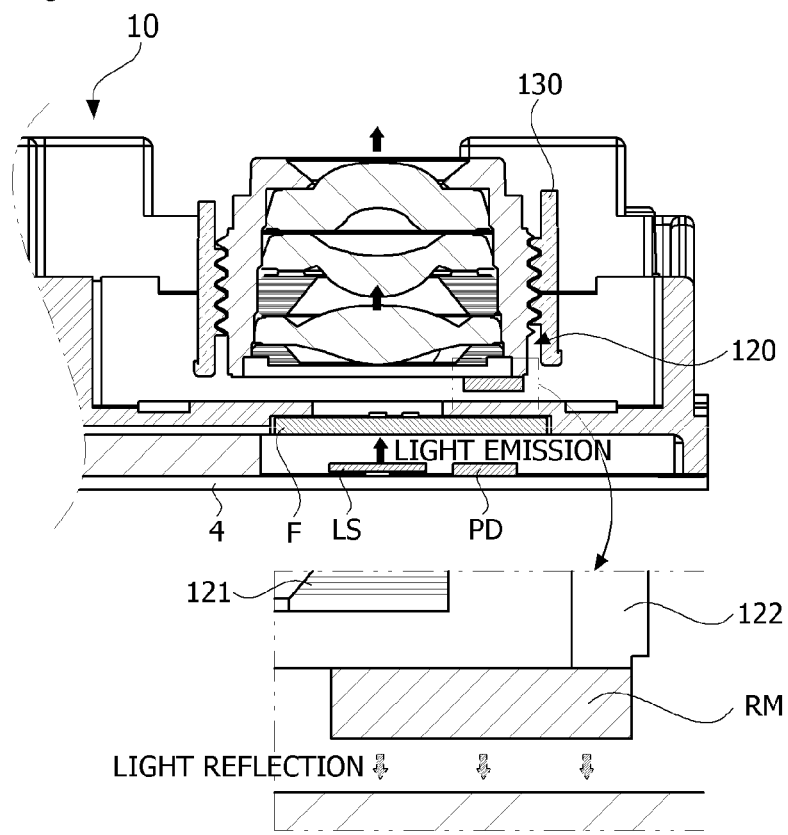
[Fig.43]
120
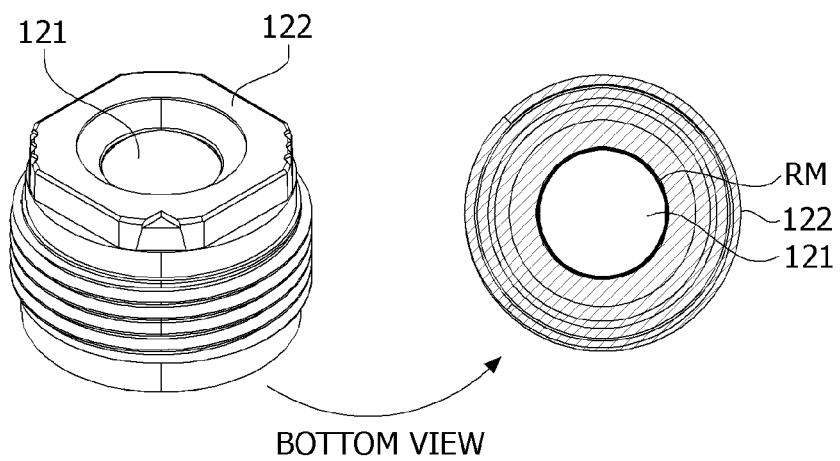
BOTTOM VIEW

[Fig.44]
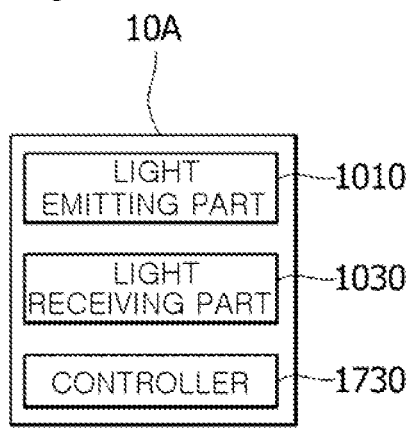
[Fig.45]
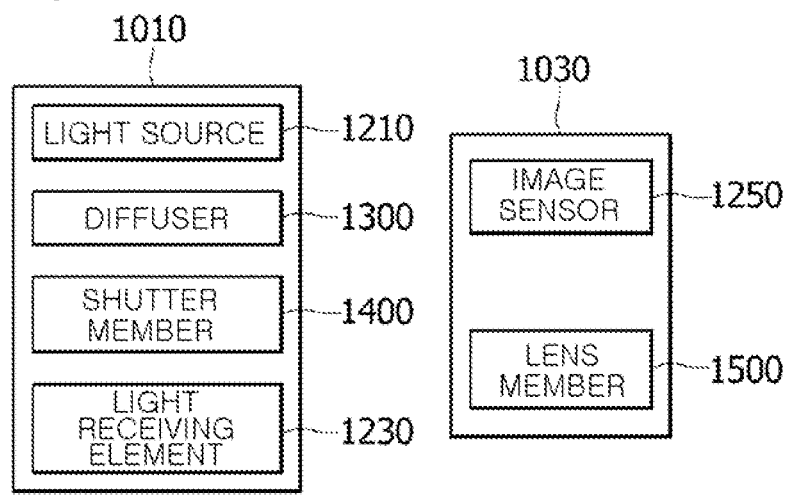
[Fig.46]
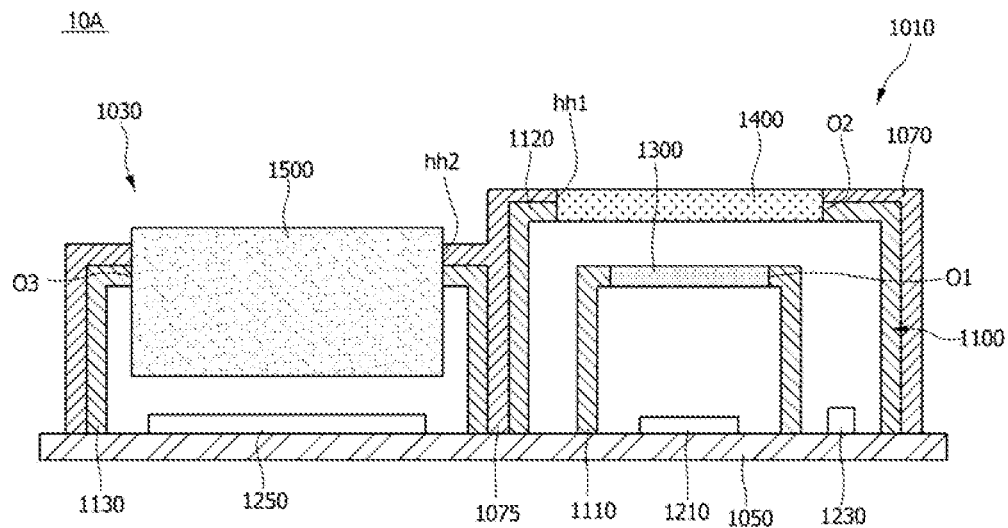

[Fig.47]
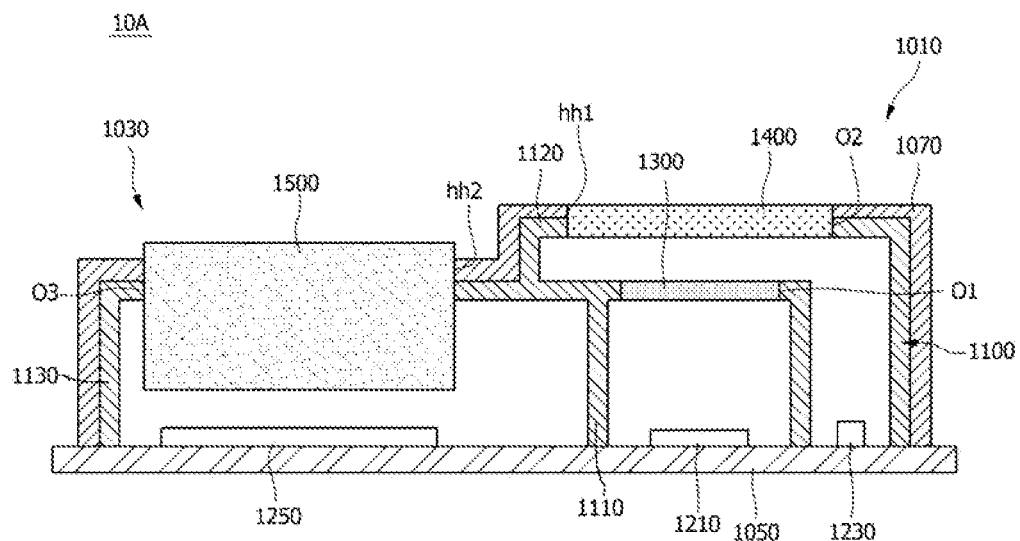
[Fig.48]
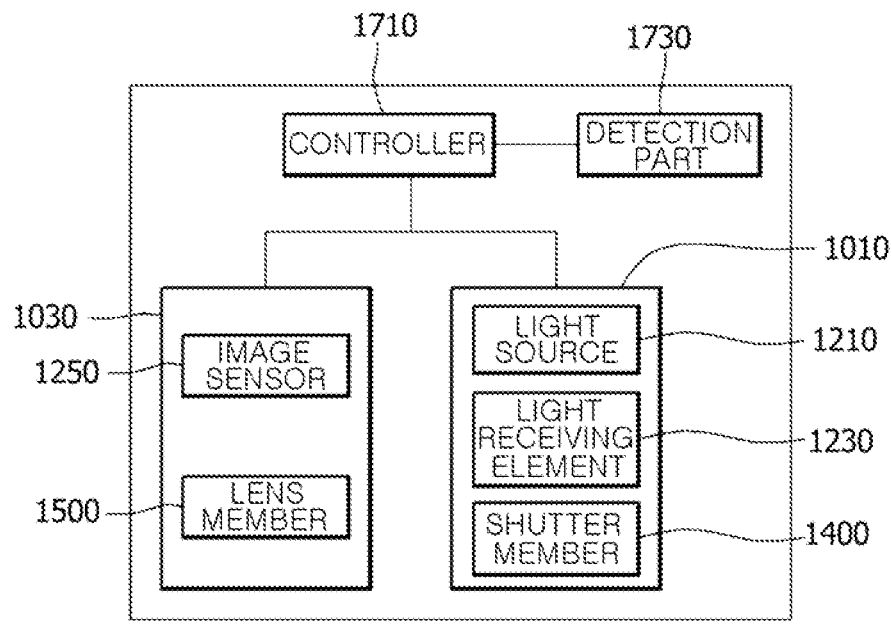

[Fig.49]
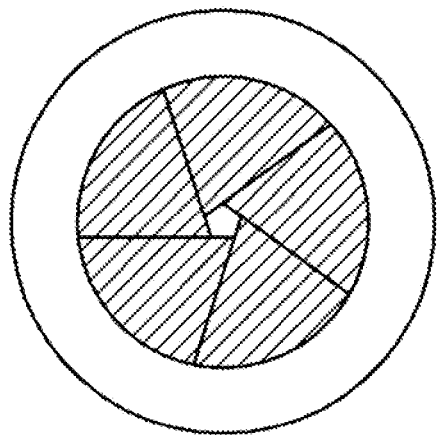
OFF
(a)
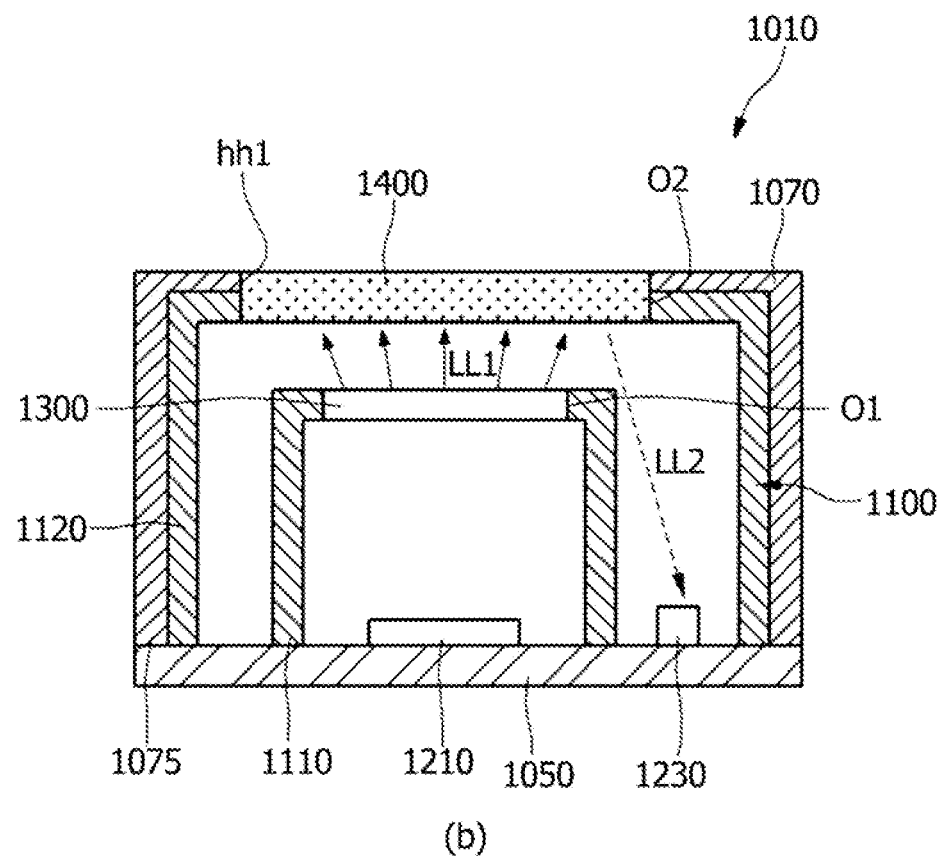
(b)

[Fig.50]
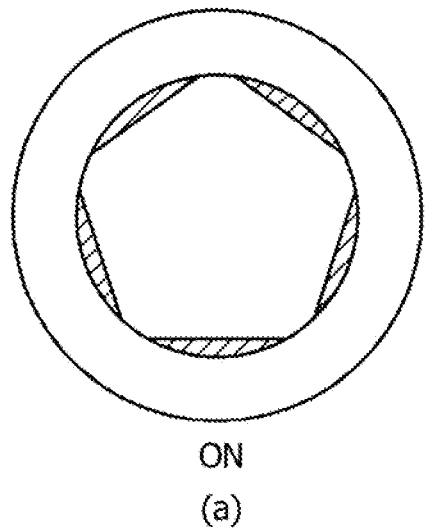
ON
(a)
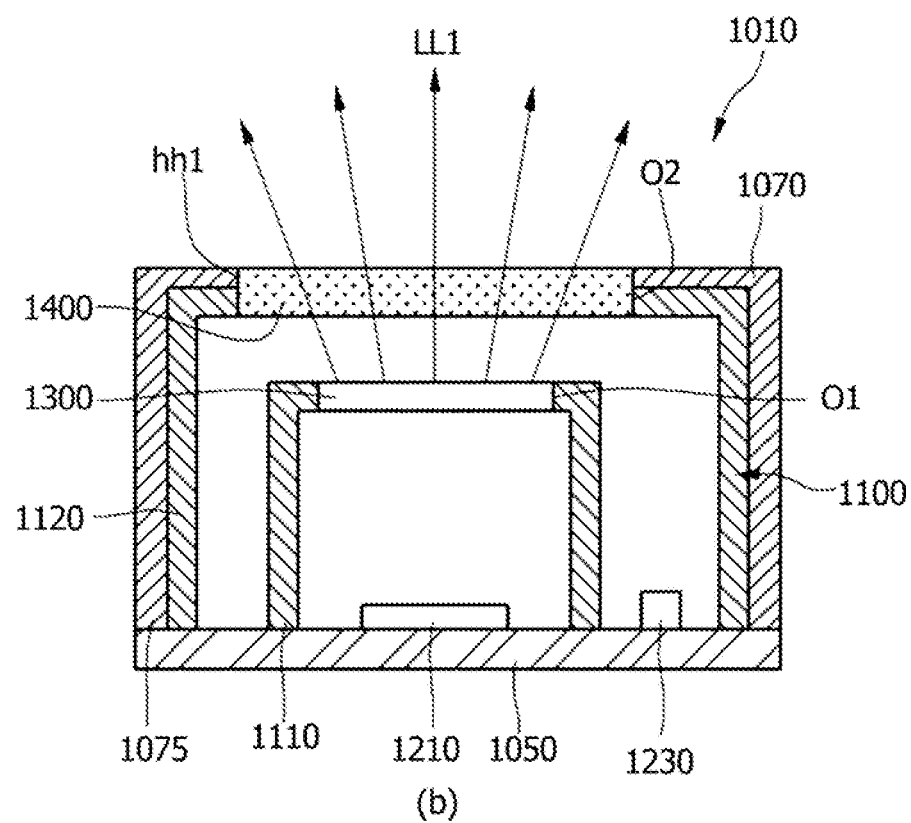
(b)

[Fig.51]
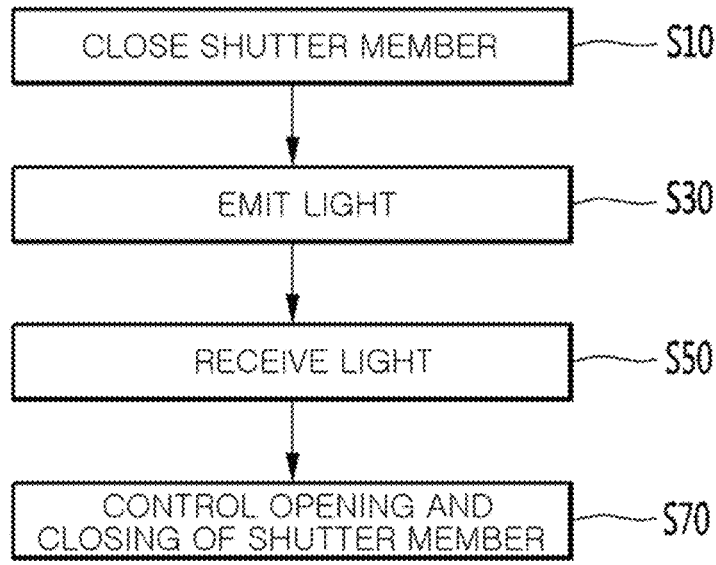
[Fig.52]
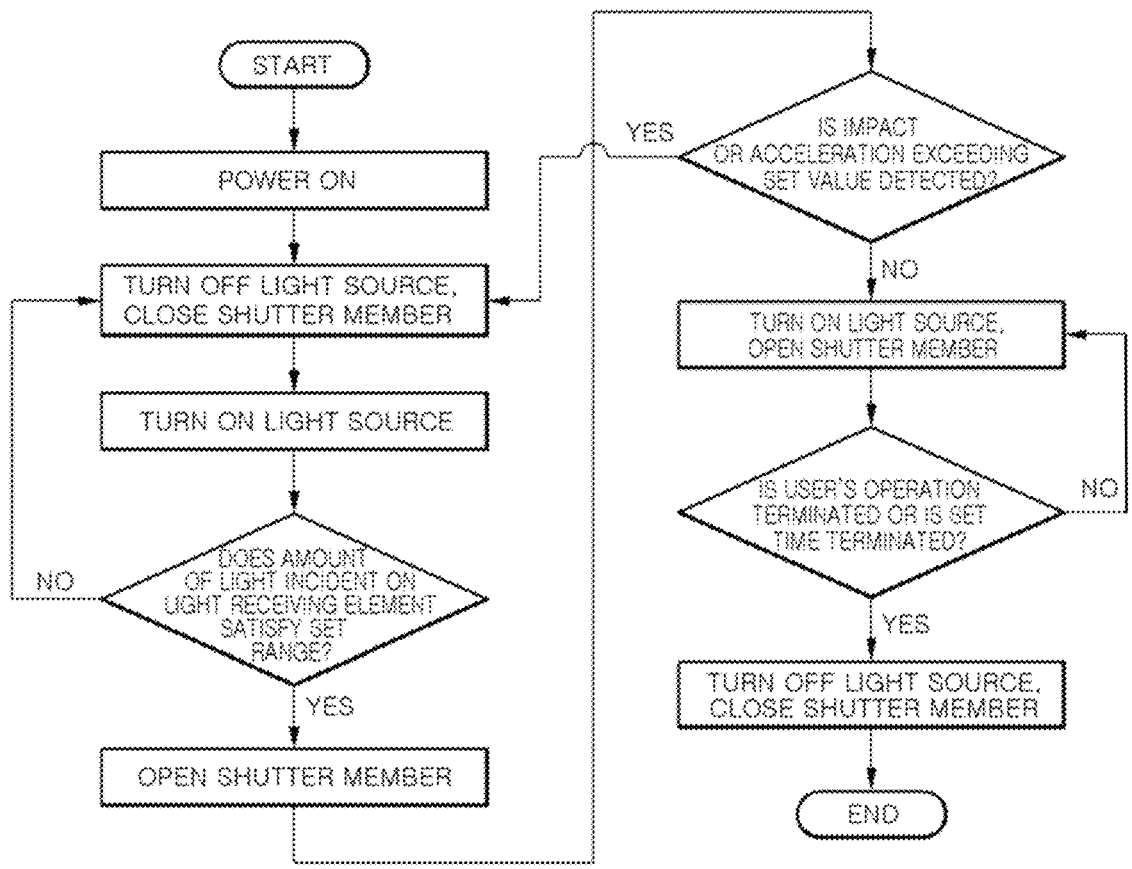

[Fig.53]
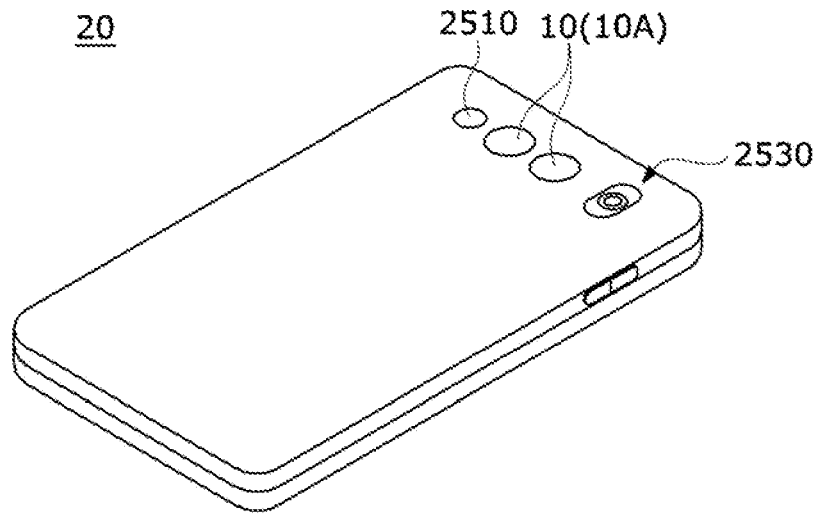
[Fig.54]
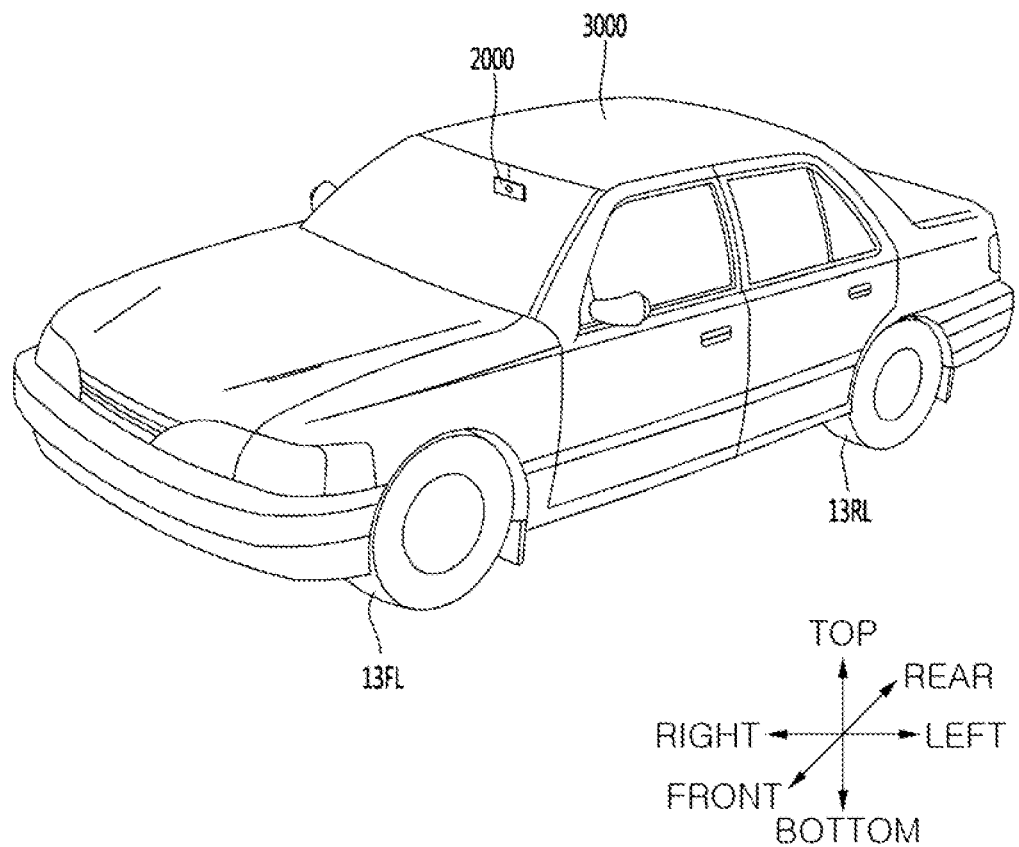

DISTANCE MEASURING CAMERA APPARATUS

CROSS REFERENCE TO RELATED APPLICATIONS

This application is the National Phase of PCT International Application No. PCT/KR2021/002551, filed on Mar. 2, 2021, which claims priority under 35 U.S.C. 119 (a) to Patent Application No. 10-2020-0026597, filed in the Republic of Korea on Mar. 3, 2020 and to Patent Application No. 10-2021-0005926, filed in the Republic of Korea on Jan. 15, 2021, all of which are hereby expressly incorporated by reference into the present application.

TECHNICAL FIELD

An embodiment relates to a distance measuring camera apparatus.

BACKGROUND ART

Three-dimensional content is being applied in many fields such as education, manufacturing, and autonomous driving as well as games and culture, and a depth map is required to acquire the three-dimensional content. The depth map refers to information representing a distance in space, and represents perspective information of another point with respect to one point of a two-dimensional image. As a method of acquiring the depth map, a method of projecting infrared (IR) structured light on an object, a method using a stereo camera, a time of flight (TOF) method, and the like are used.

The TOF method or the structured light method uses light in an infrared wavelength range, and recently, attempts have been made to be used for biometric authentication using the characteristics of the infrared wavelength range. For example, it is known that shapes of veins distributed on fingers and the like are not changed from fetus throughout life, and vary from person to person. Accordingly, vein patterns may be identified using a camera apparatus equipped with an infrared light source. To this end, after the fingers are captured, each finger may be detected by removing a background based on the colors and shapes of the fingers, and a vein pattern of each finger may be extracted from the color information of each detected finger. In other words, an average color of the fingers, colors of the veins distributed in the fingers, and colors of wrinkles on the fingers may be different from each other. For example, the colors of the veins distributed on the fingers may have a lighter red color than the average color of the fingers, and the colors of the wrinkles on the fingers may be darker than the average color of the fingers. Using these features, a value approximating the vein for each pixel may be calculated, and a vein pattern may be extracted using the calculated result. In addition, an individual may be identified by comparing the extracted vein pattern of each finger with pre-registered data. As described above, distance measurement and position recognition are possible through light emission and light reception.

In addition, a three-dimensional camera may include at least one optical member capable of controlling the light emitted from the light source. However, there is a problem in that it is difficult to determine whether the optical member normally operates while the camera apparatus operates. For example, when the optical member is damaged, the accuracy of the light emitted from the light source, reflected to an object, and incident on a sensor may decrease, thereby lowering the reliability of the depth map.

Accordingly, there is a need for a new camera apparatus capable of solving the above-described problems.

In addition, the camera apparatus is required to improve the reliability of an optical axis alignment, eye-safety, and an impact.

Technical Problem

An embodiment is directed to providing a distance measuring camera apparatus for easily detecting an abnormal state of a moving optical part.

An embodiment is directed to providing a distance measuring camera apparatus for preventing a human body or the like from being damaged (e.g., eye-safety) by energy of a light signal by controlling a light output in response to the abnormal state.

An embodiment is directed to providing a camera apparatus that may determine whether to normally operate.

In addition, an embodiment is directed to providing a camera apparatus with improved safety.

The objects of the embodiment are not limited thereto, and objects or effects that may be identified from configurations or embodiments, which will be described below, will also be included.

Technical Solution

A camera apparatus according to an embodiment of the present invention includes: a substrate; a light emitting part including a light source disposed on the substrate, a holder disposed on the substrate, an optical part disposed on the light source, a driving part configured to move the optical part along an optical axis, and a photodetector disposed on the substrate; a light receiving part including an image sensor disposed on the substrate; and a controller configured to control the optical part or the light source using an output value received from the photodetector.

The light source may overlap the optical part along the optical axis, and the photodetector may overlap the optical part along the optical axis.

The optical part may move from a first height to a second height on the substrate along the optical axis, the second height may be a height when the optical part is disposed at the highest height, and the first height may be a height when the optical part is disposed at the lowest height.

A first line and a second line may form a first angle, the first line may be a line connecting the photodetector and an intersection of the optical axis and a lowermost surface of the optical part, the second line may be a line connecting the photodetector and an intersection of the optical axis and an uppermost surface of the light source, and the first angle may range from 10 degrees to 80 degrees.

A portion where the first line and the photodetector are connected may be a central area of the photodetector, and a portion where the second line and the photodetector are connected may be a central area of the photodetector.

The controller may detect, as an abnormal state, a case in which a first output value of the photodetector is greater than a critical range of the photodetector or a case in which a second output value of the photodetector is smaller than the critical range of the photodetector.

The controller may detect, as an abnormal state, a case in which a slope between the first output value of the photodetector and the second output value of the photodetector is positive.

The controller may detect, as an abnormal state, a case in which a slope between the first output value of the photodetector and the second output value of the photodetector is within a predetermined value.

The controller may decrease or block a current applied to the light source. The controller may adjust the current applied to the light source when the first output value of the photodetector deviates from the critical range of the photodetector.

The optical part may include a lens barrel and at least one lens accommodated in the lens barrel, and include a reflective member disposed on a lower surface of a lens closest to the light source among the at least one lens or the lens barrel.

A camera apparatus according to an embodiment includes a light emitting part and an image sensor, wherein the light emitting part includes a light source, a light receiving element, a diffuser disposed on the light source, and a shutter member disposed on the diffuser, the light receiving element is disposed to receive a part of the light emitted from the light source, and opening and closing of the shutter member is controlled by an amount of light received by the light receiving element.

The camera apparatus may include a controller configured to control the opening and closing of the shutter member.

In a state in which the shutter member is closed, when a part of the light emitted from the light source is reflected by the shutter member and incident on the light receiving element, and when the light received by the light receiving element satisfies a set light amount range, the controller may open the shutter member.

In the state in which the shutter member is closed, when a part of the light emitted from the light source is reflected by the shutter member and incident on the light receiving element, and when the light received by the light receiving element does not satisfy the set light amount range, the controller may maintain the shutter member in a closed state.

The camera apparatus may include a detection part connected to the controller, and when an impact or acceleration detected by the detection part exceeds a set value, the controller may close the shutter member.

The light emitting part may include: a first housing disposed on the light source and including a first opening vertically overlapping the light source; and a second housing disposed on the diffuser and including a second opening vertically overlapping the diffuser, and the light receiving element may be disposed between the first and second housings.

The camera apparatus may include a light receiving part spaced apart from the light emitting part, wherein the light receiving part may include: the image sensor spaced apart from the light source and the light receiving element; a third housing disposed on the image sensor and including a third opening vertically overlapping the image sensor; and a lens module disposed on the image sensor.

The camera apparatus may further include a cover member disposed on the light emitting part and the light receiving part.

In addition, a method of confirming a normal operation of a camera apparatus according to an embodiment includes closing a shutter member, emitting light toward the shutter member by a light source, receiving a part of light reflected by the shutter member by a light receiving element, and controlling opening and closing of the shutter member, wherein the controlling of the opening and closing of the shutter member includes determining an amount of light received by the light receiving element, and is an operation of controlling the opening and closing of the shutter member based on the amount of the received light.

In the controlling of the opening and closing of the shutter member, when the light received by the light receiving element deviates from a set light amount range, the shutter member may maintain a closed state.

In the controlling of the opening and closing the shutter member, when the light received by the light receiving element satisfies the set light amount range, the shutter member may be open.

The controlling of the opening and closing the shutter member may further include detecting an impact or acceleration, and in the detecting of the impact or acceleration, when an impact or acceleration exceeding a set value is detected, the shutter member may be closed.

Advantageous Effects

According to an embodiment, it is possible to flexibly drive a camera apparatus according to demands of various applications by changing a light pattern of light or a light signal according to various variables such as a distance with an object and resolution.

In addition, it is possible to implement a camera apparatus for easily detecting an abnormal state of a moving optical part.

According to the embodiment, it is possible to implement a camera apparatus for preventing a human body or the like from being damaged by energy of a light signal by controlling a light output in response to the abnormal state.

The camera apparatus according to the embodiment can effectively determine whether to normally operate. Specifically, the camera apparatus can effectively detect whether the light emitting part normally operates, for example, whether components are damaged and separated by disposing a light receiving element in a light emitting part.

In addition, the camera apparatus according to the embodiment can have improved safety. Specifically, the camera apparatus can determine damaged and separated states of a diffuser based on the light incident on the light receiving element. Accordingly, when a human is positioned in front of the camera apparatus, it is possible to prevent light of a light source from being directly irradiated to sensitive areas such as human eyes and skin.

Various and beneficial advantages and effects of the present invention are not limited to the above-described contents, and will be more easily understood in a course of describing specific embodiments of the present invention.

DESCRIPTION OF DRAWINGS

FIG. 1 is a perspective view of a camera apparatus according to an embodiment.

FIG. 2 is a cross-sectional view taken along line A-A' in FIG. 1.

FIG. 3 is an exploded perspective view of the camera apparatus according to the embodiment.

FIG. 4 is a perspective view showing a housing of a light emitting part according to the embodiment.

FIG. 5 is a top view of the housing of the light emitting part according to the embodiment.

FIG. 6 is another perspective view of the housing of the light emitting part according to the embodiment.

FIG. 7 is a view showing a first optical part and a first lens holder of the light emitting part according to the embodiment.

FIG. 8 is a perspective view of the first lens holder of the light emitting part according to the embodiment.

FIG. 9 is a cross-sectional view of the first lens holder, the housing, and a drive coil part of the light emitting part according to the embodiment.

FIG. 10 is a view showing a drive magnet part and the drive coil part of the light emitting part according to the embodiment.

FIG. 11 is a view for describing a driving of the drive magnet part and the drive coil part of the light emitting part according to the embodiment.

FIG. 12 is a top view of the drive magnet part, the drive coil part, a side substrate, and a control element of the light emitting part according to the embodiment.

FIG. 13 is a view for describing a positional relationship between the drive coil part and the drive magnet part according to the embodiment.

FIG. 14 is a view showing one side of the side substrate of the light emitting part according to the embodiment.

FIG. 15 is a view showing the other side of the side substrate of the light emitting part according to the embodiment.

FIG. 16 is a top view of the first lens holder, the drive magnet part, the drive coil part, the housing, the side substrate, and the control element of the light emitting part according to the embodiment.

FIG. 17 is a cross-sectional view taken along line Z-Z' in FIG. 16.

FIG. 18 is a cross-sectional view taken along line Q-Q' in FIG. 16.

FIG. 19 is a cross-sectional view taken along line Y-Y' in FIG. 16.

FIG. 20 is a view showing a first elastic member of the light emitting part according to the embodiment.

FIG. 21 is a view showing a coupling of the first elastic member of the light emitting part according to the embodiment.

FIG. 22 is a view showing a second elastic member of the light emitting part according to the embodiment.

FIG. 23 is a view showing a coupling of the second elastic member of the light emitting part according to the embodiment.

FIG. 24 is a view showing a base of a camera module according to the embodiment.

FIG. 25 is a view showing a second optical part and a second lens barrel of a light receiving part according to the embodiment.

FIG. 26 is a view showing a cover of the camera module according to the embodiment.

FIG. 27 is a view for describing a movement of the first optical part in the light emitting part according to the embodiment.

FIG. 28 is a view for describing a form of a light signal according to the movement of the first optical part.

FIG. 29 is a view showing an example of an image of the light receiving part according to the movement of the first optical part.

FIG. 30 is a configuration diagram of a camera apparatus according to the embodiment and is a diagram for describing a light reflection in the camera apparatus.

FIG. 31 is a cross-sectional view of the camera apparatus according to the embodiment.

FIG. 32 is a cross-sectional view of a camera apparatus according to one example.

FIG. 33 is a cross-sectional view of a camera apparatus according to another example.

FIG. 34 is a view illustrating a light source and an output value in the camera apparatus according to the embodiment.

FIG. 35 is a view for describing the movement of the first optical part in the camera apparatus according to the embodiment.

FIG. 36 is a view showing the output value according to a movement of the camera apparatus.

FIG. 37 is a view showing an abnormal state of the first optical part in the camera apparatus according to the embodiment.

FIG. 38 is a view showing an output value for the movement of the camera apparatus upon overcurrent in the camera apparatus according to the embodiment.

FIG. 39 is a view showing an output value for the movement of the camera apparatus when the first optical part is damaged in the camera apparatus according to the embodiment.

FIG. 40 is a view showing a separation of the first optical part in the camera apparatus according to the embodiment.

FIG. 41 is a view showing an output value for the movement of the camera apparatus when the first optical part is separated in the camera apparatus according to the embodiment.

FIG. 42 is a view showing a modified example of the camera apparatus according to the embodiment.

FIG. 43 is a view showing a perspective view and a bottom view of the first optical part.

FIG. 44 is a configuration diagram of a camera apparatus according to another embodiment.

FIG. 45 is a configuration diagram of a light emitting part and a light receiving part in the camera apparatus according to another embodiment.

FIG. 46 is a cross-sectional view of the camera apparatus according to another embodiment.

FIG. 47 is another cross-sectional view of the camera apparatus according to another embodiment.

FIG. 48 is a configuration diagram showing the connection between the light emitting part, the light receiving part, and a controller in the camera apparatus according to another embodiment.

FIGS. 49 and 50 are views showing a movement path of light according to an opening and closing of a shutter member in the light emitting part of the camera apparatus according to another embodiment.

FIGS. 51 and 52 are views showing a method of confirming a normal operation of the camera apparatus according to another embodiment.

FIGS. 53 and 54 are perspective views of a mobile terminal and a vehicle to which the camera apparatus according to the embodiment is applied.

MODES OF THE INVENTION

Hereinafter, exemplary embodiments of the present invention will be described in detail with reference to the accompanying drawings.

However, the technical spirit of the present invention is not limited to some embodiments described but may be implemented in various different forms, and one or more of the components may be used by being selectively coupled or substituted between the embodiments without departing from the technical spirit scope of the present invention.

In addition, terms (including technical and scientific terms) used in the embodiments of the present invention may be construed as the meaning that may be generally understood by those skilled in the art to which the present invention pertains, unless specifically defined and described explicitly, and the meaning of generally used terms such as terms defined in the dictionary may be construed in consideration of the contextual meaning of the related art.

In addition, the terms used in the embodiments of the present invention are intended to describe the embodiments and are not intended to limit the present invention.

In this specification, the singular form may also include the plural form unless otherwise specified in the phrase, and when it is described as "at least one (or one or more) of A and B, C," it may include one or more of all possible combinations of A, B, and C.

In addition, in describing the components of the embodiment of the present invention, terms such as first, second, A, B, (a), and (b) may be used.

These terms are only intended to distinguish the component from other components, and the essence, sequence, or order of the corresponding components is not limited by the terms.

In addition, when it is described that a component is "connected," "coupled," or "joined" to another component, this may include a case in which the component is not only directly connected, coupled, or connected to another component, but also a case in which the component is "connected," "coupled," or "joined" to another component through other components interposed therebetween.

In addition, when it is described as being formed or disposed on "top (above) or bottom (below)" of each component, the top (above) or bottom (below) includes not only a case in which two components come into direct contact with each other but also a case in which one or more other components are formed or disposed between the two components. In addition, when expressed as "top (above) or bottom (below)," this may also include the meaning of not only an upward direction but also a downward direction with respect to one component.

Hereinafter, an optical device according to this embodiment will be described. The optical device may include any one of a cell phone, a mobile phone, a smart phone, a portable smart device, a digital camera, a laptop computer, a digital broadcasting terminal, a personal digital assistant (PDA), a portable multimedia player (PMP), and a navigation system. However, the type of the optical device is not limited thereto, and any device for capturing images or photos may be included in the optical device.

The optical device may include a main body. The main body may be in the form of a bar. Alternatively, the main body may have various structures such as a slide type, a folder type, a swing type, and a swivel type in which two or more sub-bodies are coupled to be relatively movable. The main body may include a case (casing, housing, or cover) forming an exterior. For example, the main body may include a front case and a rear case. Various electronic components of the optical device may be embedded in a space formed between the front case and the rear case.

The optical device may include a display. The display may be disposed on one surface of the main body of the optical device. The display may output an image. The display may output an image captured by a camera.

The optical device may include a camera. The camera may include a time of flight (TOF) camera apparatus. The TOF camera apparatus may be disposed on a front surface of the main body of the optical device. In this case, the TOF camera apparatus may be used for various types of biometric recognition such as user's face recognition and iris recognition for security authentication of the optical device.

Hereinafter, a configuration of the camera apparatus or the TOF/distance measuring camera apparatus according to this embodiment will be described with reference to the drawings.

In addition, before describing the embodiment of the invention, a first direction may refer to an X-axis direction shown in the drawings, a second direction may be a different direction from the first direction. For example, the second direction may refer to a Y-axis direction shown in the drawing as a direction perpendicular to the first direction. In addition, a horizontal direction may refer to the first and second directions, and a vertical direction may refer to a direction perpendicular to at least one of the first and second directions. For example, the horizontal direction may refer to the X-axis and Y-axis directions of the drawings, and the vertical direction may be a direction perpendicular to the X-axis and Y-axis directions as a Z-axis direction of the drawings.

FIG. 1 is a perspective view of a camera apparatus according to an embodiment, FIG. 2 is a cross-sectional view taken along line A-A' in FIG. 1, and FIG. 3 is an exploded perspective view of the camera apparatus according to the embodiment.

Referring to FIGS. 1 to 3, a camera apparatus 10 according to the embodiment may include a light emitting part 1, a light receiving part 2, a connect part 3, a main substrate 4, an extension substrate 5, a connection substrate 6, and a connector 7. In addition, the camera apparatus 10 according to the embodiment may include a controller. The controller may be positioned on any one of the light emitting part 1, the light receiving part 2, the connect part 3, and the main substrate 4. Hereinafter, the controller will be described as a component disposed in the light emitting part 1.

In addition, in this specification, the camera apparatus may be a concept having only any one of the light emitting part 1 and the light receiving part 2. Alternatively, the camera apparatus may be a concept including a substrate (e.g., the main substrate 4) electrically connected to any one of the light emitting part 1 and the light receiving part 2.

First, the light emitting part 1 may be a light emitting module, a light emitting unit, a light emitting assembly, or a light emitting device. The light emitting part 1 may generate light or a light signal and then irradiate the light or the light signal to an object. Hereinafter, the light or the light signal is used interchangeably. At this time, the light emitting part 1 may generate and output the light signal in the form of a pulse wave or a continuous wave. The continuous wave may be in the form of a sinusoid wave or a squared wave.

In addition, by generating the light signal in the form of the pulse wave or the continuous wave, for example, the TOF camera apparatus may detect a phase difference between a light signal output from the light emitting part 1 and input light input to the light receiving part 2 of the TOF camera apparatus after the light signal is reflected from an object O. In this specification, the output light may refer to a light signal that is output from the light emitting part 1 and incident on the object O, and the input light or the reflected light may refer to a light signal that is output from the light emitting part 1 to reach the object O and reflected from the object O and then input to the TOF camera apparatus. In addition, from the viewpoint of the object O, the output light may be incident light, and the input light may be reflected light.

The light emitting part 1 irradiates the generated light signal to the object O for a predetermined integration time. Here, the integration time refers to one frame period. When a plurality of frames are generated, a set integration time is repeated. For example, when the TOF camera apparatus captures the object at 20 FPS, the integration time is ⅟₂₀ [sec]. In addition, when 100 frames are generated, the integration time may be repeated 100 times. Accordingly, a light source may also emit light in a frame period.

In addition, the light emitting part 1 may generate a plurality of light signals having different frequencies. The light emitting part 1 may sequentially generate repeatedly the plurality of light signals having different frequencies. Alternatively, the light emitting part 1 may also generate the plurality of light signals having different frequencies at the same time.

The light emitting part 1 may include a light source LS. The light source LS may generate light. The light source LS may output light. The light source LS may irradiate light. Light generated by the light source LS may be infrared rays having a wavelength of 770 nm to 3000 nm. Alternatively, light generated by the light source LS may be visible rays having a wavelength of 380 nm to 770 nm. The light source LS may include all of various elements configured to generate and output light. For example, the light source LS may include a light emitting diode (LED) and a vertical cavity surface emitting laser (VCSEL). For example, when the light source LS is the vertical cavity surface emitting laser, a plurality of emitters may be formed in the form disposed horizontally or vertically on a plane perpendicular to an optical axis. Furthermore, when light is output in a point form, the point form may correspond to the form in which the emitters are arranged. For example, when the emitter is 3×3 (width×length), light in the point form may also be 3×3.

In addition, the light source LS may include a plurality of light emitting diodes having a form arranged according to a regular pattern. In addition, the light source LS may include an organic light emitting diode (OLED) or a laser diode (LD).

The light emitting part 1 may include a light modulation part configured to modulate light. The light source LS may generate a light signal in the form of the pulse wave or the continuous wave by repeating blinking (on/off) at a certain time interval. The certain time interval may be a frequency of the light signal. The blinking of the light source LS may be controlled by the light modulation part. The light modulation part may control the blinking of the light source LS to control the light source LS to generate the light signal in the form of the continuous wave or the pulse wave. The light modulation part may control the light source LS to generate the light signal in the form of the continuous wave or the pulse wave through frequency modulation, pulse modulation, or the like. The light modulation part may be positioned in the controller. Accordingly, it should be understood that the controller may block (off or turn off) or provide (on) the output of the light signal by the light source by controlling the light modulation part as will be described below.

The light emitting part 1 may include a diffuser (not shown). The diffuser (not shown) may be a diffuser lens. The diffuser (not shown) may be disposed in front of the light source LS. The light emitted from the light source LS may pass through the diffuser (not shown) to be incident on the object O. The diffuser (not shown) may change a path of the light emitted from the light source LS. The diffuser (not shown) may diffuse the light emitted from the light source LS. The diffuser (not shown) may also be positioned in a first optical part to be described below or above the first optical part.

Specifically, the light emitting part 1 may include the above-described light source LS, a housing 110, a first optical part 120, a first lens holder 130, a driving part including a drive magnet part 140 and a drive coil part 150, an elastic part 160, a side substrate 170, and a control element SS.

First, the housing 110 may be positioned inside a cover 400 to be described below. The housing 110 may be coupled to the first lens holder 130, the side substrate 170, the drive coil part 150, and the elastic part 160, which will be described below.

The housing 110 may include an open barrel accommodation part therein. The above-described first lens holder 130 and drive coil part 150 may be positioned in the barrel accommodation part.

The first optical part 120 may be positioned in the housing 110. The first optical part 120 may be held by the first lens holder 130 to be described below, and coupled to the housing 110 through the first lens holder 130. In addition, the first lens holder 130 may move in the housing 110 or in a base 200 in an optical axis direction. The first optical part 120 may also move in the optical axis direction together with the first lens holder 130.

The first optical part 120 may be composed of a lens and a first lens barrel accommodating a plurality of lenses. The lens may be composed of a plurality of optical elements or lenses. For example, the first optical part 120 may be composed of a plurality of lenses.

In addition, the first optical part 120 may include a convex, concave, or collimator lens. For example, the collimator lens may be composed of a plurality of lenses, and may have an angle of view (FoI) of 60 degrees to 120 degrees. The collimator lens may lower a divergence angle of the light output from the light source. When the laser divergence angle of each aperture of the vertical cavity surface emitting laser (VCESL) as the light source is 20 to 25 degrees, the divergence angle of the light passing through the collimator lens may be 1 degree or less.

In addition, the first optical part 120 may duplicate the light signal output from the light source LS according to a preset duplication pattern. Accordingly, the first optical part 120 may include a diffractive optical element (DOE) or a diffuser lens. For example, the first optical part 120 may include an optical member having a micro-scale or nano-scale structure.

The light signal (output light) emitted from the light source LS toward the object may pass through the first optical part 120, that is, the lens and the first lens barrel. In addition, a central axis of the first optical part 120 or the first lens holder 130 and the optical axis of the light source LS may be aligned.

The first lens holder 130 may be coupled to the housing 110. In addition, the first lens holder 130 may be fixed to the housing 110. The first lens holder 130 may hold the first optical part 120 composed of a plurality of optical elements. The first lens holder 130 may include a lens accommodating part 131 on which the first optical part 120 is seated. The first lens holder 130 may be moved up and down by a voice coil motor or the like, as will be described below. In other words, the first lens holder 130 may move up and down in the optical axis direction by an actuator such as a voice coil motor. Accordingly, as will be described below, the light generated from the light source may be changed into a planar form or a point form while passing through the first lens holder 130. In addition, the first lens holder 130 may include a magnet seating groove 132 in which the drive magnet part is seated. For example, the first lens holder 130 may be a bobbin of the first optical part 120.

In addition, a screw thread structure may be formed on a side surface of the lens accommodation part 131 for coupling with the first optical part 120. Accordingly, the first optical part 120 may move up and down in the housing 110 together with the first lens holder 130 by a driving part to be described below.

In addition, the side substrate 170 may be coupled to the housing 110. The side substrate 170 may be positioned in the substrate groove 112 positioned on a side surface of the housing 110. In addition, the side substrate 170 may be electrically connected to the main substrate 4.

In addition, the drive unit may include the drive magnet part 140 and the drive coil part 150.

The drive magnet part 140 may include a plurality of magnets. The plurality of magnets may be positioned in the magnet seating groove 132 positioned on a side surface of the first lens holder 130.

The drive magnet part 140 may vertically move the first lens holder 130 and the first optical part 120 with respect to the housing 110 by electromagnetic interaction with the drive coil part 150 to be described below. Accordingly, a separation distance from the light source LS disposed thereunder to the first optical part 120 and the first lens holder 130 may be increased or decreased. In addition, according to the above-described separation distance, the output light may have a form of a light source having a planar form (or a surface light source) or a point form (or a point light source) with respect to the object.

The drive coil part 150 may include a plurality of coils, and may be positioned on the side surface of the housing 110. In addition, the drive coil part 150 may be positioned inside the housing 110. The drive coil part 150 may be positioned to face the drive magnet part 140. For example, the drive coil part 150 may be positioned to face at least a part of the drive magnet part 140. Accordingly, when a current is applied to the drive coil part 150, the first lens holder 130 may be moved by the electromagnetic interaction (e.g., Lorentz force) between the drive coil part 150 and the drive magnet part 140.

The drive coil part 150 may be positioned in each coil seating part 114 formed on the side surface of the housing 110. The drive coil part 150 may be electrically connected to the side substrate 170. For example, the drive coil part 150 may be electrically connected to the side substrate 170 through a wire or the like. In addition, since the side substrate 170 is coupled to the housing 110 as described above, the drive coil part 150 may also be seated in the coil seating part 114 formed on the side surface of the housing 110 and may be coupled to the housing. A detailed description thereof will be given below.

The elastic part 160 may be disposed on the housing 110. The elastic part 160 may be coupled to the first lens holder 130 and the housing 110. The housing 110 may be coupled and fixed to the main substrate 4 or the base 200 to be described below. Alternatively, the first lens holder 130 may move up and down with respect to the housing 110 by the above-described Lorentz force. The elastic part 160 may provide a preload for the vertical movement of the first lens holder 130 or the first optical part 120. Accordingly, when the Lorentz force by the driving part is not generated, the first lens holder 130 may maintain a predetermined position with respect to the housing 110. In addition, even when the Lorentz force by the driving part is generated, a positional relationship between the first lens holder 130 and the housing 110 is maintained within a certain range, so that it is possible to improve the reliability of the camera apparatus.

The control element SS may be electrically connected to the side substrate 170. In addition, the control element SS may be positioned on the side substrate 170. In addition, the control element SS may be disposed to be spaced apart from the above-described drive magnet part 140 by a predetermined distance.

The control element SS may include a Hall sensor or a Hall IC. The control element SS may detect a magnetic force of the drive magnet part 140.

The control element SS according to the embodiment may detect an intensity of the magnetic field generated by the drive magnet part and output position information of the first lens holder 130 or the first optical part 120 with respect to the light source LS. Accordingly, the controller may determine a defect of the first optical part 120 or the first lens holder 130 based on the position information of the control element SS and control (turn on/off) the output of the light source LS in response to the determination result.

In the embodiment, the control element SS may include a plurality of control elements. The control element SS may include two sensors. The control element SS may detect the movements of the first lens holder 130 and the first optical part 120 in the optical axis direction. In this specification, the Z-axis direction is an optical axis direction or a vertical direction as the third direction. In addition, the X-axis direction is a direction perpendicular to the Z-axis direction and is the first direction from the light emitting part toward the light receiving part in the embodiment. In addition, the Y-axis direction is a direction perpendicular to the X-axis direction and the Z-axis direction, and is the second direction. A description thereof will be given below based on this.

Furthermore, the light emitting unit 1 may further include a photodetector PD. The photodetector PD may include, for example, a light receiving element disposed in a charged coupled device (CCD), a complementary metal oxide semiconductor (CMOS) linear image sensor, or a photodiode array. The light emitted from the light source LS is reflected by the first optical part 120, the first lens holder 130, and the like, and the photodetector PD may receive the above-described reflected light. In addition, the photodetector PD may output an output value indicating a detected amount according to the amount of received light. For example, the photodetector PD may output an output value corresponding to the amount of received light. In other words, the output value may also increase as the amount of received light increases. In addition, the controller may control the light source LS and the like by detecting abnormal states of the first optical part 120 and the light source LS based on the output value received from the photodetector PD. A detailed description thereof will be given below.

The light receiving part 2 may be a light receiving module, a light receiving unit, a light receiving assembly, or a light receiving device, and may be one component of the camera apparatus. The light receiving part 2 may receive light (reflected light) emitted from the light emitting part 1 and reflected from the object, and may convert the received light into an electrical signal.

The light receiving part 2 may generate input light corresponding to the light signal output from the light emitting part 1. The light receiving part 2 may be disposed side by side with the light emitting part 1. The light receiving part 2 may be disposed next to the light emitting part 1. The light receiving part 2 may be disposed in the same direction as the light emitting part 1. With this configuration, reception efficiency of the input light can be improved in the light receiving part 2.

The light receiving part 2 may receive the reflected light for an integration time and generate an electric signal therefor. In the embodiment, the camera apparatus may perform direct distance measurement or indirect distance measurement through the light receiving part 2. The light receiving part 2 may also have a structure separated from the light emitting part 1.

First, in the case of the direct distance measurement, the camera apparatus may measure a distance to the object through a time difference between a reception time point of the reflected light and an output time point of the output light.

In addition, in the case of the indirect distance measurement, the camera apparatus may measure the distance to the object through synthesis between a reference signal synchronized with the output light and having a different phase, and the reflected light.

The direct distance measurement may be easier to measure a long distance than the indirect distance measurement, may have a relatively high measurement speed because a switching speed is nanoseconds, and may be strong against multiple echoes. In contrast, there are advantages in that the indirect distance measurement has a lower switching speed than that of the direct distance measurement but is easy to measure a short distance, may be applied to multiple pixels, and has a small data volume for distance measurement.

The camera apparatus according to the embodiment may perform the above-described direct-TOF (or corresponding to the direct distance measurement) or indirect-TOF (or corresponding to the indirect distance measurement). In other words, the camera apparatus 10 may be a camera apparatus capable of measuring a distance or a camera apparatus.

The light receiving part 2 may include a second lens barrel 320, a second optical part 310, and an image sensor IS.

The second lens barrel 320 may be coupled to the base 200 to be described below. The second lens barrel 320 may be coupled to the base to be described below by screw coupling or the like. Accordingly, the second lens barrel 320 may include a screw thread positioned on a side surface thereof. The second lens barrel 320 may also be formed integrally with the second optical part 310. However, the present invention is not limited thereto.

The second optical part 310 may be coupled to the second lens barrel 320. The second optical part 310 may be coupled to the base 200 through the second lens barrel 320. The second optical part 310 may be coupled to the second lens barrel 320 through various coupling methods. The second optical part 310 may be formed through screw-coupling with the second lens barrel 320 as described above.

The second optical part 310 may include a plurality of lenses. In addition, the second optical part 310 may be aligned with the image sensor IS thereunder. Accordingly, the reflected light passing through the second optical part 310 may be provided to the image sensor IS.

The image sensor IS may detect the reflected light. In addition, the image sensor IS may detect the reflected light and output the detected reflected light as an electrical signal. In the embodiment, the image sensor IS may detect light having a wavelength corresponding to a wavelength of the light output from the light source LS. For example, the image sensor IS may detect infrared rays. Alternatively, the image sensor IS may detect visible rays. The image sensor IS may include various image sensors configured to sense light.

In the embodiment, the image sensor IS may include a pixel array configured to receive light passing through the second lens barrel 320 and the second optical part 310 and convert the received light into an electrical signal corresponding to the light, a drive circuit configured to drive a plurality of pixels included in the pixel array, and a read out circuit configured to read an analog pixel signal of each pixel. The read out circuit may generate a digital pixel signal (or an image signal) through analog-to-digital conversion by comparing the analog pixel signal with a reference signal. Here, the digital pixel signal of each pixel included in the pixel array may configure an image signal, and it may be defined as an image frame as the image signal is transmitted in a frame unit. In other words, the image sensor may output a plurality of image frames.

Furthermore, the light receiving part 2 may further include an image synthesis part. The image synthesis part may include an image processor configured to receive an image signal from the image sensor IS, and process (e.g., interpolation and frame synthesis) the image signal. In particular, the image synthesis part may synthesize image signals (low resolution) of a plurality of frames into an image signal (high resolution) of one frame. In other words, the image synthesis part may synthesize a plurality of image frames included in the image signal received from the image sensor IS, and generate the synthesized result as a synthesized image. The synthesized image generated by the image synthesis part may have a higher resolution than those of the plurality of image frames output from the image sensor IS. In other words, the image synthesis part may generate a high-resolution image through a super resolution (SR) technique. The plurality of image frames may include image frames generated by being changed into different light paths by the movements of filters F and F'. The image synthesis part may be positioned inside or outside the light receiving part 2.

The filters F and F' may be coupled to the base 200. The filters F and F' may be disposed between the first lens holder 130 and the light source LS or between the second lens barrel 320 and the image sensor IS. For example, the filters F and F' may be disposed on each of the light emitting part 1 and the light receiving part 2. Accordingly, the filters F and F' may be disposed on a light path between the object and the image sensor IS or a light path between the object and the light source LS. The filters F and F' may filter light having a predetermined wavelength range.

The filters F and F' may pass light having a specific wavelength. In other words, the filters F and F' may block light by reflecting or absorbing light other than the specific wavelength. For example, the filters F and F' may pass infrared rays and block light having wavelengths other than the infrared rays. Alternatively, the filters F and F' may pass visible rays and block light having wavelengths other than the visible rays. Each of the filters F and F' may be an infrared ray band pass filter. Accordingly, the filters F and F' may pass only infrared rays. Alternatively, the optical member may be a separate fixed focus lens or variable focus lens (e.g., liquid lens) separated from the lens module.

In addition, the filters F and F' can suppress foreign substances from being introduced into the light source LS, the photodetector PD, and the image sensor IS in each of the light emitting part 1 and the light receiving part 2. Accordingly, it is possible to improve the reliability of the camera apparatus.

In addition, the filters F and F' are movable. In the embodiment, the filters F and F' may be tilted. When the filters F and F' are tilted, the light path may be adjusted. When the filters F and F' are tilted, a path of light incident on the image sensor IS may be changed. For example, the filter F' in the light receiving part 2 may change an angle of a field of view (FOV) or a direction of the FOV of the incident light. In addition, in the embodiment, the filters F and F' may enable the high-resolution time of flight (TOF) by changing a path through which light enters as the filters F and F' are tilted.

The cover 400 may be a bracket. The cover 400 may include a "cover can." The cover 400 may be disposed to surround the light emitting part 1 and the light receiving part 2. The cover 400 may be coupled to the housing 110 and the base 200. The cover 400 may accommodate the light emitting part 1 and the light receiving part 2. Accordingly, the cover 400 may be positioned at an outermost side of the camera apparatus.

In addition, the cover 400 may be a non-magnetic substance. In addition, the cover 400 may be made of a metal. In addition, the cover 400 may be made of a metal plate.

The cover 400 may be connected to a ground portion of the main substrate 4. Accordingly, the cover 400 may be grounded. In addition, the cover 400 may block electromagnetic interference (EMI). At this time, the cover 400 may be referred to as an "EMI shield can." The cover 400 may protect a product from an external impact as a finally assembled component. The cover 400 may be made of a material having a small thickness and a high strength.

In addition, in the camera apparatus 10 according to the embodiment, the light emitting part 1 and the light receiving part 2 may be disposed on the main substrate 4 (printed circuit board (PCB)). The main substrate 4 may be electrically connected to the light emitting part 1 and the light receiving part 2.

In addition, in the camera apparatus 10, the connect part 3 may be electrically connected to the main substrate 4. The connect part 3 may be connected to the configuration of the optical device. The connect part 3 may include the connector 7 connected to the configuration of the optical device. The connect part 3 may include the extension substrate 5 on which the connector 7 is disposed and which is connected to the connection substrate 6. The extension substrate 5 may be a PCB, but is not limited thereto.

In addition, in the camera apparatus, the connection substrate 6 may connect the main substrate 4 and the extension substrate 5 of the connect part 3. The connection substrate 6 may have flexibility. The connection substrate 6 may be a flexible printed circuit board (flexible PCB (FPCB)).

In addition, the main substrate 4, the connection substrate 6, and the extension substrate 5 may be formed integrally or separately.

In addition, the above-described light emitting part 1 and light receiving part 2 may be positioned on the main substrate 4, and the light emitting part 1 and the light receiving part 2 may be electrically connected to the main substrate 4.

The camera apparatus may include a reinforcement plate 8. The reinforcement plate 8 may include a stiffener. The reinforcement plate 8 may be disposed on a lower surface of the main substrate 4. The reinforcement plate 8 may be made of a stainless steel.

Furthermore, the light receiving part 2 may include a lens drive device. In other words, the light receiving part 2 may include a voice coil motor (VCM). In addition, the light receiving part 2 may include a lens drive motor. In addition, the light receiving part 2 may include a lens drive actuator. With this configuration, as described above, the light receiving part 2 according to the embodiment may tilt the filter F'. In addition, as the filter F' is tilted, a light path of the input light passing through the filter F' may move repeatedly according to a predetermined rule. Accordingly, the light receiving part 2 may output high-resolution image information using a plurality of pieces of image information converted by the image sensor according to the tilting of the filter F', and provide the output image information to an external optical device.

FIG. 4 is a perspective view showing the housing of the light emitting part according to the embodiment, FIG. 5 is a top view of the housing of the light emitting part according to the embodiment, and FIG. 6 is another perspective view of the housing of the light emitting part according to the embodiment.

Referring to FIGS. 4 to 6, the housing 110 of the light emitting part according to the embodiment may include a housing hole 111, the substrate groove 112, a hole 113, the coil seating part 114, and a seating protrusion 115.

The housing hole 111 may be positioned at a center of the housing 110. The first optical part, the first lens holder, and the driving part may be seated in the housing hole 111.

In the embodiment, the housing 110 may include a housing side portion 110*k*1, a second housing side portion 110*k*2, a third housing side portion 110*k*3, and a fourth housing side portion 110*k*4. The housing side portion 110*k*1 to the fourth housing side portion 110*k*4 refer to portions positioned on each side portion of the housing 110. The housing side portion 110*k*1 is used interchangeably with a first housing side portion.

Specifically, the housing side portion 110*k*1 and the second housing side portion 110*k*2 may be disposed to face each other. In addition, the housing side portion 110*k*1 and the second housing side portion 110*k*2 may be disposed to be spaced apart from each other in the second direction (Y-axis direction). In other words, the housing side portion 110*k*1 and the second housing side portion 110*k*2 may be symmetrically disposed in the first direction (X-axis direction) or the third direction (Z-axis direction).

The third housing side portion 110*k*3 and the fourth housing side portion 110*k*4 may be disposed to face each other. In addition, the third housing side portion 110*k*3 and the fourth housing side portion 110*k*4 may be positioned between the housing side portion 110*k*1 and the second housing side portion 110*k*2. In addition, the third housing side portion 110*k*3 and the fourth housing side portion 110*k*4 may be disposed to be spaced apart from each other in the first direction (X-axis direction). In other words, the third housing side portion 110*k*3 and the fourth housing side portion 110*k*4 may be symmetrically disposed in the second direction (Y-axis direction) or the third direction (Z-axis direction).

In the embodiment, the substrate groove 112 may be positioned on a side portion of the housing 110 having a maximum separation distance from the light receiving part. Accordingly, the substrate groove 112 may be positioned in the third housing side portion 110*k*4 of the housing 110. With this configuration, it is possible to minimize an influence of electromagnetic waves generated by an electrical signal or the like in the light receiving part on driving the light emitting part.

In the embodiment, the housing 110 may have a rectangular shape on a plane XY. However, the present invention is not limited thereto and the housing 110 may be formed in various shapes.

In addition, a coupling protrusion for coupling with the side substrate may be positioned in the substrate groove 112. The coupling protrusion may extend outward from an outer surface of the third housing side portion 110k3 of the housing 110. In addition, a coupling hole is provided in the side substrate, and the coupling protrusion is inserted into the coupling hole so that the side substrate and the housing 110 may be coupled to each other.

The hole 113 may overlap the substrate groove 112 in the first direction (X-axis direction) and the second direction (Y-axis direction).

In the embodiment, the hole 113 may pass through an outer surface 110b and an inner surface 110a of the housing. Accordingly, the hole 113 may be positioned in the third housing side portion 110k3. The hole 113 may be positioned under the seating part 114 to be described below. Accordingly, even when the control element is seated in the hole 113, the control element may not overlap the drive coil part in the first direction (X-axis direction) or the second direction (Y-axis direction). In addition, the control element may be electrically connected easily to the side substrate while being disposed to face the magnet in the hole 113. In addition, a position of the control element coupled to the housing 110 is fixed so that a position of the drive magnet part may be accurately measured.

The coil seating part 114 may be positioned on the inner surface 110a of the housing 110. In the embodiment, the coil seating part 114 may extend inward from the inner surface 110a of the housing 110. Accordingly, a maximum separation distance W1 at which the inner surface 110a of the housing 110 faces may be greater than a maximum separation distance W2 at which the coil seating part 114 faces. In addition, in this specification, the inward may be a direction toward a central axis HX of the housing hole 111. Alternatively, the inward may be a direction from the housing toward the first optic part. In addition, the outward may be a direction from the first optical part toward the housing in an opposite direction to the inward. The central axis HX of the housing hole 111 may be an axis that passes through an intersection of bisectors that bisect the housing 110 in the first direction (X-axis direction) and the second direction (Y-axis direction), and is parallel with the third direction (Y-axis direction).

In addition, at least one groove IH may be positioned on the inner surface 110a of the housing 110. An adhesive member such as epoxy may be applied to the at least one groove IH. Accordingly, the coil on the coil seating part 114 and the housing 110 may be coupled.

In addition, an upper surface of the coil seating part 114 may be flat. Accordingly, the drive coil part may be easily seated, and the vertical movement of the first lens holder may be accurately performed according to the electromagnetic interaction between the drive coil part and the drive magnet part.

In addition, the coil seating part 114 may include a seating groove 114h that is convex downward (or concave upward) from the third housing side portion 110k3. The seating groove 114h may be positioned to correspond to the above-described hole 113, and may be a groove that is formed downward from the coil seating part 114. The seating groove 114h may have a shape that is convex downward and concave upward.

A control element to be described below may be seated in the seating groove 114h. Accordingly, the control element may at least partially overlap the drive coil part in the third direction (Z-axis direction). A detailed description thereof will be given below.

In addition, the drive coil part may have a closed loop shape as will be described below. Accordingly, the coil seating part 114 may also have a closed loop shape corresponding to the shape of the drive coil part.

The seating protrusion 115 may be connected to the coil seating part 114 and positioned inside the coil seating part 114. Accordingly, since the seating protrusion 115 is positioned inside the coil seating part 114, the seating protrusion 115 may at least partially overlap the first lens holder positioned inside the coil seating part 114. Accordingly, the seating protrusion 115 may function as a stopper for the vertical movement of the first lens holder.

In addition, an upper surface of the seating protrusion 115 may have a stepped portion with the coil seating part 114. In other words, the upper surface of the seating protrusion 115 may be positioned above the coil seating part 114. With this configuration, the seating protrusion 115 can easily prevent the drive coil part from being separated from the coil seating part 114.

For example, the coil seating part 114 may be formed as a ledge extending inward from the inner surface of the housing 110. In this specification, the inward may be a direction from the housing toward the first optical part, and the outward may be a direction from the first optical part toward the housing as an opposite direction to the inside.

FIG. 7 is a view showing the first optical part and the first lens holder of the light emitting part according to the embodiment, FIG. 8 is a perspective view of the first lens holder of the light emitting part according to the embodiment, and FIG. 9 is a cross-sectional view of the first lens holder, the housing, and the drive coil part of the light emitting part according to the embodiment.

Referring to FIGS. 7 and 8, the first optical part 120 of the light emitting part may be inserted into the lens accommodation part 131 of the first lens holder 130. As described above, the first optical part 120 may be composed of a plurality of lenses. In addition, the first optical part 120 may include a screw thread positioned on the outer surface thereof. The first lens holder 130 may also have a screw groove corresponding to the screw thread of the first optical part 120 on the inner surface thereof. Accordingly, the first optical part 120 and the first lens holder 130 may be screw-coupled to each other.

In the embodiment, the first lens holder 130 may include not only the above-described lens accommodation part 131, but also magnet seating grooves 132h1 to 132h4. A plurality of magnet seating grooves 132h1 to 132h4 may be provided. In the embodiment, four magnet seating grooves are provided, and may be positioned on each outer surface of the first lens holder 130.

In the embodiment, the first lens holder 130 may include a first outer surface 132a and a second outer surface 132b facing each other, and a third outer surface 132c and a fourth outer surface 132d that face each other and are positioned between the first outer surface 132a and the second outer surface 132b.

In addition, the first outer surface 132a may be opposite to the above-described housing side portion, the second outer surface 132b may be opposite to the above-described second housing side portion, the third outer surface 132c may be opposite to the above-described third housing side portion, and the fourth outer surface 132*d* may be opposite to the above-described fourth housing side portion.

In addition, the plurality of magnet seating grooves may include a first magnet seating groove 132*h*1 to a fourth magnet seating groove 132*h*4. The first magnet seating groove 132*h*1 may be positioned on the first outer surface 132*a*. In addition, the second magnet seating groove 132*h*2 may be positioned on the second outer surface 132*b*. In addition, the third magnet seating groove 132*h*3 may be positioned on the third outer surface 132*c*. In addition, the fourth magnet seating groove 132*h*4 may be positioned on the fourth outer surface 132*d*.

The magnet of the drive magnet part to be described below may be seated in each of the first magnet seating groove 132*h*1 to the fourth magnet seating groove 132*h*4.

In addition, the first magnet seating groove 132*h*1 and the second magnet seating groove 132*h*2 may face each other, and the third magnet seating groove h3 and the fourth magnet seating groove 132*h*4 may be positioned to face each other. Furthermore, the first magnet seating groove 132*h*1 to the fourth magnet seating groove 132*h*4 may have the same shape. With this configuration, an electromagnetic force generated by the magnet seated in the magnet seating groove is constantly generated upward or downward, so that the first lens holder may be moved upward or downward in a balanced manner without being tilted to one side. According to the embodiment, areas (on a plane XZ or YZ) of the first magnet seating groove 132*h*1 to the fourth magnet seating groove 132*h*4 may decrease outward. In addition, lengths L1 of the first magnet seating groove 132*h*1 to the fourth magnet seating groove 132*h*4 at outermost sides may be smaller than lengths L2 of the first magnet seating groove 132*h*1 to the fourth magnet seating groove 132*h*4 at innermost sides. With this configuration, it is possible to suppress a phenomenon in which each of the plurality of magnets to be described below is separated from the first magnet seating groove 132*h*1 to the fourth magnet seating groove 132*h*4. In other words, it is possible to improve a coupling force between the plurality of magnets and the plurality of magnet seating grooves.

Furthermore, the first lens holder according to the embodiment may further include injection holes eh positioned in lower portions of the first magnet seating groove 132*h*1 to the fourth magnet seating groove 132*h*4. The injection holes eh may be positioned in the lower portions of the first magnet seating groove 132*h*1 to the fourth magnet seating groove 132*h*4. For example, the injection holes eh may be position at the bottoms of the first magnet seating groove 132*h*1 to the fourth magnet seating groove 132*h*4. In addition, the injection holes eh may be positioned to overlap the first magnet seating groove 132*h*1 to the fourth magnet seating groove 132*h*4 in the third direction (Z-axis direction). Accordingly, when the adhesive member is injected through the injection hole eh, the adhesive member may move between the magnet seating groove and the magnet. In other words, the adhesive member may be spread over the entire area between the magnet and the magnet seating groove through an injection pressure and a capillary action. Accordingly, it is possible to further improve the coupling force between the magnet and the magnet seating groove, thereby preventing the magnet from being separated from the magnet seating groove.

In addition, barrel grooves gr may be positioned between adjacent magnet seating grooves of the first magnet seating groove 132*h*1 to the fourth magnet seating groove 132*h*4. According to the embodiment, the barrel grooves gr may be positioned on a first virtual line VX1 and a second virtual line VX2. In addition, the barrel grooves gr may be bisected by the first virtual line VX1 and the second virtual line VX2.

In addition, in the embodiment, the first virtual line VX1 bisects the second magnet seating groove 123*h*2 and the fourth magnet seating groove 132*h*4, and bisects the first magnet seating groove 132*h*1 and the third magnet seating groove 132*h*3. In addition, the second virtual line VX2 may bisect the first magnet seating groove 132*h*1 and the fourth magnet seating groove 132*h*4, and bisect the third magnet seating groove 132*h*3 and the second magnet seating groove 132*h*2. In addition, an intersection of the first virtual line VX1 and the second virtual line VX2 may be positioned on the above-described central axis HX of the housing hole.

The barrel groove gr may be positioned in a lower portion of the first lens holder 130. Accordingly, the first lens holder 130 may have a structure in which a lower edge is open by the barrel groove gr. Accordingly, the above-described seating protrusion of the housing may be positioned in the barrel groove gr. Accordingly, the first lens holder 130 may be supported by the seating protrusion.

Referring to FIG. 9, the barrel groove gr may overlap the seating protrusion 115 of the housing 110 in the third direction (Z-axis direction). Accordingly, even when the first lens holder 130 moves in the third direction (the Z-axis direction), the first lens holder 130 may be blocked from being moved downward by the seating protrusion 115 of the housing 110. Accordingly, even when the first lens holder moves, it is possible to prevent a collision between the control element positioned in the above-described hole and the first lens holder. Accordingly, it is possible to improve the reliability of the element.

FIG. 10 is a view showing the drive magnet part and the drive coil part of the light emitting part according to the embodiment, FIG. 11 is a view for describing a driving of the drive magnet part and the drive coil part of the light emitting part according to the embodiment, FIG. 12 is a top view of the drive magnet part, the drive coil part, the side substrate, and the control element of the light emitting part according to the embodiment, and FIG. 13 is a view for describing a positional relationship between the drive coil part and the drive magnet part according to the embodiment.

Referring to FIGS. 10 to 12, the driving part according to the embodiment may include the drive magnet part 140 and the drive coil part 150. The drive magnet part 140 may include a plurality of magnets.

In the embodiment, the drive magnet part 140 may include a first magnet 141 to a fourth magnet 144. The first magnet 141 and the second magnet 142 may be positioned to face each other. For example, the first magnet 141 and the second magnet 142 may be symmetrically disposed with respect to the first direction (X-axis direction).

The third magnet 143 and the fourth magnet 144 may be positioned to face each other, and positioned between the first magnet 141 and the second magnet 142. For example, the third magnet 143 and the fourth magnet 144 may be symmetrically disposed with respect to the second direction (Y-axis direction).

The first magnet 141 to the fourth magnet 144 may be positioned in the above-described first magnet seating groove to fourth magnet seating groove, respectively. The first magnet 141 to the fourth magnet 144 may be disposed to be spaced apart from each other by the same distance with respect to the above-described central axis HX. Accordingly, a current and a magnetic force flowing through the drive coil part 150 may interact in a balanced manner so that the first lens holder may be moved by the electromagnetic force in a balanced manner without being tilted to one side.

In addition, the first magnet 141 to the fourth magnet 144 may be unipolarly magnetized in each magnet seating groove. With this configuration, a balanced electromagnetic force may be generated only by the drive coil part through which a current flows in a single direction.

Alternatively, the first magnet 141 to the fourth magnet 144 may be bipolarly magnetized in each magnet seating groove. At this time, contrary to what will be described below, each coil corresponding to the first magnet 141 to the fourth magnet 144 may be present individually. In this case, it is possible to more precisely control the movement of the first lens holder by controlling the amount of current flowing through each coil.

As described above, the drive coil part 150 may have a closed loop shape on a plane XY. Accordingly, the drive coil part 150 may surround the drive magnet part 140. In other words, since the drive coil part 150 has the closed loop shape, the camera apparatus may control each magnet of the drive magnet part 140 with one current. With this configuration, it is possible to prevent the phenomenon of being tilted in the third direction by the plurality of magnets. Accordingly, the upper surface of the first optical part may move in a direction opposite to the light receiving part (e.g., a direction opposite to the first direction) so that the first optical part may not be tilted. In addition, a decrease in the efficiency of the input light input to the light receiving part due to the tilting may also be suppressed.

The drive coil part 150 may be seated on the above-described coil seating part. In addition, the drive coil part 150 may at least partially overlap the drive magnet part 140 in the first direction (X-axis direction) or the second direction (Y-axis direction).

In addition, the drive coil part 150 may be disposed to surround the drive magnet part 140. In other words, the drive magnet part 140 may be positioned on a closed loop of the drive coil part 150.

In addition, when a current flows through the drive coil part 150, the first lens holder and the drive magnet part 140 may be moved by the electromagnetic force in the third direction (Z-axis direction).

For example, the current may flow through the drive coil part 150 counterclockwise. In addition, the first magnet 141 to the fourth magnet 144 may generate a magnetic field outward. Based on this, the movement of the first lens holder by the electromagnetic force will be described below.

At this time, a magnetic field B1 is generated by the first magnet 141 in a direction opposite to the second direction, and a current I1 flows through the drive coil part 150 in a direction opposite to the first direction in an area facing the first magnet 141. Accordingly, an electromagnetic force F1 is generated by the magnetic field B1 and the current I1 in a direction opposite to the third direction (Z-axis direction).

In addition, a magnetic field B2 is generated by the second magnet 142 in the second direction, and a current I2 flows through the drive coil part 150 in the first direction in an area facing the second magnet 142. Accordingly, an electromagnetic force F2 is generated by the magnetic field B2 and the current I2 in a direction opposite to the third direction (Z-axis direction).

In addition, a magnetic field B3 is generated by the third magnet 143 in a direction opposite to the first direction, and a current I3 flows through the drive coil part 150 in the second direction in an area facing the third magnet 143. Accordingly, an electromagnetic force F3 is generated by the magnetic field B3 and the current I3 in a direction opposite to the third direction (Z-axis direction).

In addition, a magnetic field B4 is generated by the fourth magnet 144 in the first direction, and a current I4 flows through the drive coil part 150 in a direction opposite to the second direction in an area facing the fourth magnet 144. Accordingly, an electromagnetic force F4 is generated by the magnetic field B4 and the current I4 in a direction opposite to the third direction (Z-axis direction). At this time, the first lens holder may move in the third direction (Z-axis direction) or upward by the electromagnetic forces F1 to F4. For example, since the coil coil part is fixed to the housing, the electromagnetic forces F1 to F4 may act on the movable drive magnet. In other words, when the electromagnetic forces F1 to F4 are generated in a direction opposite to the third direction (Z-axis direction), the drive magnet part 140 may move in the third direction (axial direction).

In addition, when a current flows through the drive coil part 150 clockwise, the first lens holder may move in a direction opposite to the third direction or downward.

In addition, the drive coil part 150 may be disposed to be spaced apart from the drive magnet part 140 by a first separation distance dd1. The separation distance dd1 may be 70 μm to 90 μm. With this configuration, ease of assembly may be secured, and the movement of the first lens holder according to the intensity of the electromagnetic force may be easily controlled. Furthermore, the electromagnetic force between the magnet and the coil may be 0.002 mN/mA when the separation distance dd1 is 90 μm.

In addition, the drive coil part 150 may have one end connected to a first wire w1 and a second wire w2 for electrically connecting with the side substrate 170. The first wire w1 and the second wire w2 are electrically connected to the side substrate 170, and in particular, disposed at positions corresponding to the side substrate 170, so that it is possible to minimize an electrical resistance. Accordingly, it is possible to prevent a decrease in accuracy due to the resistance and improve power efficiency.

In addition, the first wire w1 and the second wire w2 may be connected to one end and the other end of the drive coil part 150 composed of a coil, respectively. Accordingly, a predetermined current is applied to the drive coil part 150 through the first wire w1 and the second wire w2 according to a control signal received to the side substrate 170, and the first lens holder may be moved by the electromagnetic force due to the applied current or the like. Accordingly, it is possible to improve drive stability by disposing the side substrate 170 adjacent to the driving part of the light emitting part.

In addition, since a rectification element (e.g., a capacitor) or the like is disposed on the side substrate 170, noise of the current supplied to the drive coil part may be removed by the rectification element. Accordingly, the first lens holder may be accurately moved. In addition, the rectification element or the like is not disposed on the main substrate, so that the size of the camera apparatus may be easily decreased.

In addition, the side substrate 170 may include a terminal portion disposed thereunder and electrically connected to the main substrate. The terminal portion may be electrically connected to the main substrate through soldering or the like. With this configuration, a control signal such as a current between the main substrate and the side substrate may be transmitted and received.

In addition, the control element SS may be mounted on the side substrate 170. The control element SS may be formed integrally with the side substrate. The control element SS may be positioned under the drive coil part 150. For example, the control element SS may be disposed on a lower portion of a lowermost end of the drive coil part 150. In addition, the control element SS may be positioned to at least partially overlap the drive coil part 150 in the third direction (Z-axis direction). Accordingly, the control element SS may accurately sense the intensity of the magnetic force from the drive magnet part 140 positioned inside the drive coil part 150. In addition, in the camera apparatus according to the embodiment, the control element SS may calculate a position of the first lens module or provide a signal indicating the position by detecting the magnetic force generated from the drive magnet part without a separate magnet. Accordingly, it is possible to easily implement the compactness of the light emitting part.

In addition, the control element SS and the drive magnet part, in particular, the third magnet may have a predetermined separation distance from each other. The separation distance may be 0.44 mm to 0.66 mm. With this configuration, the magnetic force or the detection value detected by the control element corresponding to the position of the first lens module may be linear. Accordingly, it is possible to improve the accuracy of the position detection of the control element.

In addition, a height T1 of the drive coil part 150 in the third direction (Z-axis direction) may be smaller than a height T2 of each magnet or the drive magnet part in the third direction (Z-axis direction). With this configuration, the drive coil part 150 may be positioned to overlap the drive magnet part 140 in the first direction (X-axis direction) and the second direction (Y-axis direction) even when the first lens holder and the drive magnet part 140 move in the third direction (Z-axis direction).

Referring to FIG. 13, when the first lens holder is positioned on the lowermost portion (hereinafter referred to as "lowest driving"), the drive coil part 150 and the drive magnet part 140 may overlap in a movement direction, that is, a direction perpendicular to the third direction (Z-axis direction) or on a plane (XY). Alternatively, upon the lowest driving, an upper surface of the drive coil part 150 may be positioned at least lower than an upper surface of the drive magnet part 140.

Furthermore, even when the first lens holder is positioned on the uppermost portion (hereinafter referred to as "highest driving"), the drive coil part 150 and the drive magnet part 140 may overlap on the plane (XY). Alternatively, a lower surface of the drive coil part 150 may be positioned at least above a lower surface of the drive magnet part 140 upon the highest driving.

In other words, the drive coil part 150 according to the embodiment may overlap the drive magnet part 140 in a direction perpendicular to the third direction (Z-axis direction) even when the drive magnet part 140 is moved (e.g., the lowest driving to the highest driving).

In addition, a first center or a first central axis Z1 that bisects the drive coil part 150 in the third direction may be positioned in a first magnet area ZP1 of the drive magnet part 140.

In the embodiment, the drive magnet part 140 may include the first magnet area ZP1 and a second magnet area ZP2. The first magnet area ZP1 may be positioned above the second magnet area ZP2, and the second magnet area ZP2 may be positioned under the first magnet area ZP1. The first magnet area ZP1 and the second magnet area ZP2 may be partitioned with respect to a second center or a second central axis Z2 that bisects the drive magnet part 140 in the third direction.

At this time, the first central axis Z1 of the drive coil part 150 may be positioned on the first magnet area ZP1 upon the lowest driving to the highest driving. With this configuration, it is possible to improve the magnitude of the electromagnetic force generated between the driving part, that is, the drive magnet part 140 and the drive coil part 150 upon the lowest driving to the highest driving.

Furthermore, the current applied to the drive coil part may be greater upon the highest driving than upon the lowest driving. However, according to the embodiment, a separation distance between the first central axis Z1 and the second central axis Z2 may be smaller upon the highest driving than upon the lowest driving. Accordingly, it is possible to improve energy efficiency by reducing the amount of current applied to the drive coil part upon the highest driving.

With this configuration, an overlapping area between the drive coil part 150 and the drive magnet part 140 on the plane XY may be constant. Accordingly, it is possible to minimize a change in the electromagnetic force generated by the drive coil part 150 and the drive magnet part 140 according to a position (in particular, a position in the Z-axis direction) between the drive coil part 150 and the drive magnet part 140. In other words, the driving or movement of the first lens holder by the electromagnetic force may be linear with the amount of change in the current. In other words, the first lens holder may be accurately moved.

In addition, upon the lowest driving, an area in which the drive coil part 150 overlaps the first magnet area ZP1 in a direction perpendicular to the optical axis or the third direction (Z-axis direction) may be greater than a nonoverlapping area. Furthermore, upon the highest driving, the area in which the drive coil part 150 overlaps the first magnet area ZP1 in the direction perpendicular to the optical axis or the third direction (Z-axis direction) may be greater than an area in which the drive coil part 150 overlaps the second magnet area ZP2 in the direction perpendicular to the optical axis or the third direction (Z-axis direction). In addition, upon the highest driving, a lowermost portion of the drive coil part 150 may be positioned above a lowermost portion of the drive magnet part 140.

FIG. 14 is a view showing one side of the side substrate of the light emitting part according to the embodiment, and FIG. 15 is a view showing the other side of the side substrate of the light emitting part according to the embodiment.

Referring to FIGS. 14 and 15, the side substrate 170 may have one side, and the other side facing the one side and coming into contact with the housing.

The side substrate 170 may include first and second conductive parts EC1 and EC2 connected to the first and second wires of the drive coil part on one side thereof. In addition, the side substrate 170 may include a coupling hole 170a at the other side. As described above, the coupling hole 170a may be coupled to the coupling protrusion of the housing. Accordingly, the side substrate 170 may be coupled to the side surface of the housing.

In addition, the control element SS may be positioned on the other side of the side substrate 170. The control element SS may be seated on the other side of the side substrate 170 and inserted into the hole.

FIG. 16 is a top view of the first lens holder, the drive magnet part, the drive coil part, the housing, the side substrate, and the control element of the light emitting part according to the embodiment, FIG. 17 is a cross-sectional view taken along line Z-Z' in FIG. 16, FIG. 18 is a cross-sectional view taken along line Q-Q' in FIG. 16, and FIG. 19 is a cross-sectional view taken along line Y-Y' in FIG. 16.

Referring to FIGS. 16 to 19, in the housing 110 according to the embodiment, the hole 113 and the seating groove 114h may overlap in the first direction (X-axis direction). In addition, as described above, the hole 113 and the seating groove 114*h* may be positioned on the third housing side portion 110*k*3 having the greatest minimum separation distance from the light receiving part in the housing.

In addition, the side substrate 170 may include the first and second conductive parts disposed on the outer surface thereof, and include the control element SS disposed on the inner surface thereof.

In addition, the control element SS may be seated in the hole 113. In addition, the control element SS may at least partially overlap the seating groove 114*h*. In addition, the control element SS may be positioned under the coil seating part 114, that is, under the drive coil part 150.

In addition, the control element SS according to the embodiment may at least partially overlap the third magnet 143 facing the third housing side portion 110*k*3 in the first direction (X-axis direction). In addition, since the seating groove 114*h* is positioned between the control element SS and the third magnet 143, the control element SS may easily detect the magnetic force generated from the third magnet 143 due to the opening.

In addition, the control element SS may at least partially overlap the drive coil part 150 in the third direction (Z-axis direction) (OV). Accordingly, when a coupling member EX such as epoxy is applied to the third housing side portion 110*k*3, the coupling member EX may be positioned on an upper surface SSa of the control element SS. Accordingly, the upper surface SSa of the control element SS and an upper surface of the hole 113 may be coupled to each other through the coupling member. In other words, the position of the drive coil part 150 may be guided along the coil seating part 114, and the position of the control element SS may be guided by the hole 113 and the seating groove 114*h*. Accordingly, the control element SS and the drive coil part 150 may be accurately disposed at designed positions. Accordingly, the camera apparatus according to the embodiment may accurately adjust the form of the input light according to the distance.

In addition, the control element SS may be disposed under the drive coil part 150, and at least a part of the above-described coupling member EX may be positioned between the control element SS and the drive coil part 150. In other words, the coupling member EX may at least partially overlap the control element SS and the drive coil part 150 in the third direction. With this configuration, the coupling member EX can block the magnetic field generated from the drive coil part 150 from acting as a noise to the control element SS. Accordingly, the position of the optical part may be accurately detected by the control element SS.

Furthermore, a third central axis Z3 of the control element SS may overlap the drive magnet part 140 in the direction perpendicular to the third direction or the plane XY when the first optical part converts the light into a point form.

In addition, the third central axis Z3 of the control element SS may not overlap the drive magnet part 140 in the direction perpendicular to the third direction or on the plane XY when the first optical part converts the light into a planar form.

Accordingly, the separation distance between the drive magnet part 140 and the control element SS is reduced in the case of the point form compared to the planar form, so that the position of the first optical part may be accurately detected through the control element SS. Accordingly, it is possible to easily perform a control (e.g., notification) of eye-safety by light in the case of the point form by precisely detecting the position of the first optical part.

In addition, the housing 110 may include a stepped portion 110st positioned at the side thereof. In other words, the stepped portion 110st may be positioned or formed at the side of the housing side portion of the housing 110. The stepped portion 110st may be positioned on a facing surface in the second direction (Y-axis direction) and a side spaced apart from the light receiving part. In other words, the outer surface of the housing 110 may have a groove due to the stepped portion 110st. In the embodiment, the stepped portion on the outer surface of the housing 110 may have a structure bent inward. Accordingly, the outer surface of the housing 110 in the stepped portion may be positioned inside the outer surface of the housing 110 in an area other than the stepped portion. With this configuration, the housing 110 may be seated on a first base and easily coupled to the first base as will be described below. In addition, the stepped portion of the housing 110 may be seated in a second groove to be described below. For example, the stepped portion of the housing 110 may be seated in a 2-2 groove (corresponding to G2*b* in FIG. 26). With this configuration, the stepped portion 110st of the housing 110 or the 2-2 groove may function as an alignment mark. Accordingly, it is possible to improve left and right asymmetry between the housing 110 and the base.

FIG. 20 is a view showing a first elastic member of the light emitting part according to the embodiment, and FIG. 21 is a view showing a coupling of the first elastic member of the light emitting part according to the embodiment. In addition, FIG. 22 is a view showing a second elastic member of the light emitting part according to the embodiment, and FIG. 23 is a view showing a coupling of the second elastic member of the light emitting part according to the embodiment.

Referring to FIGS. 20 to 23, the elastic part 160 may include a first elastic member 161 and a second elastic member 162. The elastic part 160 may be positioned above or under the first lens holder 130 and coupled to the housing 110 and the first lens holder 130. Accordingly, even when the first lens holder 130 is vertically moved by the driving part, a preload may be applied to the vertical movement of the first lens holder 130 through the elastic part 160 coupled to the housing 110. Accordingly, when no current is applied to the drive coil part, the first lens holder 130 may be present at the same position in the housing 110 by a restoring force of the elastic part 160.

The first elastic member 161 may be positioned above the first lens holder 130. The second elastic member 162 may be positioned under the first lens holder 130.

The first elastic member 161 may include a first elastic coupling portion P1 and a second elastic coupling portion P2. The first elastic coupling portion P1 may be positioned outside the second elastic coupling portion P2. In addition, the first elastic coupling portion P1 may be coupled to the protrusion of the housing 110. In addition, the second elastic coupling portion P2 may be coupled to the first lens holder 130. At this time, the above-described coupling member for coupling may be applied to the first elastic coupling portion P1 and the second elastic coupling portion P2 (DA1). The coupling member may include epoxy or the like. In addition, the coupling member may also be, for example, a damper liquid. Furthermore, the first elastic coupling portion P1 and the second elastic coupling portion P2 may further include an additional groove extending to one side, so that it is possible to easily apply the coupling member.

In addition, a first pattern portion PT1 having various bent portions may be positioned between the first elastic coupling portion P1 and the second elastic coupling portion P2. In other words, the first elastic coupling portion P1 and the second elastic coupling portion P2 may be coupled to each other with the first pattern portion PT1 interposed therebetween.

Furthermore, the first elastic coupling portion P1 and the second elastic coupling portion P2 may have a hole or groove shape, and have a shape that has an assembly tolerance with the housing or the first lens holder to be coupled.

In addition, the first pattern portion PT1 may be symmetrically disposed with respect to a first diagonal line DL1 or a second diagonal line DL2. The first diagonal line DL1 may be a line connecting a contact point between the first housing side portion and the fourth housing side portion and a contact point between the second housing side portion and the third housing side portion. In addition, the second diagonal line DL2 may be a line connecting a contact point between the housing side portion and the third housing side portion and a contact point between the second housing side portion and the fourth housing side portion.

In addition, a damping member may be applied to the first pattern portion PT1. The damping member may include a damper liquid. It is possible to suppress an oscillation of the elastic part from being generated by the damper liquid. The damping member may be applied to the first pattern portion PT1. In addition, the damping member may be disposed to be spaced apart from the housing. Accordingly, it is possible to reduce an oscillation generated from the first pattern portion PT1, and block a malfunction due to the coupling between the housing and a spring. More specifically, the damping member may be applied to an area adjacent to the first elastic coupling portion P1 or the second elastic coupling portion P2 in the first pattern portion PT1 (DP). Accordingly, it is possible to improve oscillation suppression by coupling the first pattern portion PT1 to the first elastic coupling portion P1 and the second elastic coupling portion P2 having small oscillations.

In addition, the above-described first elastic coupling portion P1 and second elastic coupling portion P2 may be positioned on the first diagonal line DL1 or the second diagonal line DL2. With this configuration, even when the coupling member is applied to the first elastic coupling portion P1 and the second elastic coupling portion P2, it is possible to prevent the phenomenon that the coupling member is applied to the magnet or the first optical part 120. Accordingly, the first elastic member 161 may be prevented from being coupled to a member other than the housing 110 or the first lens holder 130 so that a preload may be uniformly applied between the housing and the first lens member. Accordingly, the vertical movement of the first lens holder may be performed linearly, that is, accurately according to the control.

In addition, when the first lens holder 130 moves up and down, that is, in the third direction (Z-axis direction), the occurrence of tilt or movement based on the first direction (X-axis direction) or the second direction (Y-axis direction) may be suppressed by the first elastic coupling portion P1 and the second elastic coupling portion P2 on the first diagonal line DL1 and the second diagonal line DL2.

The first pattern portion PT1 may be designed with an elastic modulus of the first elastic member 161 that linearly corresponds to an electromagnetic force and a vertical movement distance of the first lens holder. Furthermore, as will be described below, the first and second elastic members 161 and 162 may be disposed above and under the first lens holder, thereby minimizing the influence of momentum on the vertical movement of the first lens holder 130.

In addition, the first elastic member 161 may have a shape that has a safety factor of the elastic member greater than or equal to a threshold so that the shape is not deformed due to an impact or the like. In other words, the safety factor of the first elastic member with respect to the first direction or the second direction may be greater than the safety factor of the first elastic member with respect to the third direction. Accordingly, durability against an impact applied in the first direction or the second direction may be increased.

Similarly, the second elastic member 162 may include a third elastic coupling portion P3 and a fourth elastic coupling portion P4. The third elastic coupling portion P3 may be positioned outside the fourth elastic coupling portion P4.

In addition, the third elastic coupling portion P3 may be coupled to the protrusion of the housing 110. In addition, the fourth elastic coupling portion P4 may be coupled to the first lens holder 130. At this time, the coupling member may also be applied to the third elastic coupling portion P3 and the fourth elastic coupling portion P4 to implement the above-described coupling (DA2).

The coupling member may include epoxy or the like. In addition, the coupling member may also be, for example, a damper liquid. Furthermore, the third elastic coupling portion P3 and the fourth elastic coupling portion P4 may further include an additional groove extending to one side, so that it is possible to easily apply the coupling member.

In addition, a second pattern portion PT2 having various bent portions may be positioned between the third elastic coupling portion P3 and the fourth elastic coupling portion P4. In other words, the third elastic coupling portion P3 and the fourth elastic coupling portion P4 may be coupled to each other with the second pattern portion PT2 interposed therebetween.

Furthermore, the third elastic coupling portion P3 and the fourth elastic coupling portion P4 may have a hole or groove shape, and have a shape that has an assembly tolerance with the housing or the first lens holder to be coupled.

In addition, the second pattern portion PT2 may be symmetrically disposed with respect to a third diagonal line DL3 or a fourth diagonal line DL4. The third diagonal line DL3 may be a line connecting the contact point between the first housing side portion and the fourth housing side portion and the contact point between the second housing side portion and the third housing side portion. In addition, the fourth diagonal line DL4 may be a line connecting a contact point between the housing side portion and the third housing side portion and a contact point between the second housing side portion and the fourth housing side portion.

In addition, a damping member may be applied to the second pattern portion PT2. The damping member may include a damper liquid. It is possible to suppress an oscillation of the elastic part from being generated by the damper liquid. The damping member may be applied to the second pattern portion PT2.

In addition, the above-described third elastic coupling portion P3 and fourth elastic coupling portion P4 may be positioned on the third diagonal line DL3 or the fourth diagonal line DL4. With this configuration, even when the coupling member is applied to the third elastic coupling portion P3 and the fourth elastic coupling portion P4, it is possible to prevent the phenomenon that the coupling member is applied to the magnet or the first optical part 120. Accordingly, the second elastic member 162 may be prevented from being coupled to a member other than the housing 110 or the first lens holder 130, so that a preload may be uniformly applied between the housing and the first lens member. Accordingly, the vertical movement of the first lens holder is linearly performed according to the control, so that the vertical movement control may be accurately performed.

In addition, when the first lens holder 130 moves up and down, that is, in the third direction (Z-axis direction), the occurrence of tilt or movement of the first lens holder 130 based on the first direction (X-axis direction) or the second direction (Y-axis direction) may be suppressed by the first elastic coupling portion P1 and the fourth elastic coupling portion P4 on the third diagonal line DL3 and fourth diagonal line DL4.

The second pattern portion PT2 may be designed with an elastic modulus of the second elastic member 162 that linearly corresponds to an electromagnetic force and a vertical movement distance of the first lens holder. Furthermore, as will be described below, the first and second elastic members 161 and 162 may be disposed above and under the first lens holder, thereby minimizing the influence of momentum on the vertical movement of the first lens holder 130.

In addition, the second elastic member 162 may have a shape that has a safety factor of the elastic member greater than or equal to a threshold so that the shape is not deformed due to an impact. In other words, the safety factor of the second elastic member with respect to the first direction or the second direction may be greater than the safety factor of the second elastic member with respect to the third direction. Accordingly, durability against an impact applied in the first direction or the second direction may be increased.

FIG. 24 is a view showing a base of a camera module according to the embodiment, FIG. 25 is a view showing a second optical part and a second lens barrel of the light receiving part according to the embodiment, and FIG. 26 is a view showing a cover of the camera module according to the embodiment.

Referring to FIG. 24, the base 200 may be positioned on the main substrate 4, and may come into contact with the main substrate 4. In addition, the first lens holder, the first optical part, the second lens barrel, the second optical part, and the housing, which are described above, may be seated on the base 200.

The base 200 may include a first base 210 and a second base 220, which are disposed to be spaced apart from each other. The first base 210 and the second base 220 may be disposed to be spaced apart from each other in the first direction (X-axis direction). The first base 210 and the second base 220 may be integrally formed. Alternatively, the first base 210 and the second base 220 may have a separated structure. In the embodiment, it will be described below that the first base 210 and the second base 220 are integrally formed with each other, and thus it is possible to improve the stiffness of the base 200 and improve the reliability of the camera apparatus.

The housing (or a component of the light emitting part such as the first optical part or the first lens holder) may be seated on the first base 210. In other words, the first base 210 may accommodate the housing (or a component of the light emitting part such as the first optical part or the first lens holder).

In addition, the second base 220 may be disposed adjacent to the first base 210 so that the second optical part and the second lens barrel may be seated thereon. An image sensor may be positioned under the second base 220.

The first base 210 and the second base 220 may include base holes 210a and 220a, respectively. The light signal from the light source may be output toward the object through the base holes 210a and 220a, and the light signal (reflected light) reflected from the object may be provided to the image sensor. For example, the light signal may be output toward the object through a first base hole 210a, and the light signal reflected through a second base hole 220a may be provided to the image sensor.

In addition, the above-described filter may be seated on each of the first base 210 and the second base 220. Furthermore, although the first base 210 and the second base 220 are shown as an integrated form, the first base 210 and the second base 220 may be separated. In addition, the first base 210 and the second base 220 may have a separated structure.

In the camera apparatus according to the embodiment, the light receiving part 2 may also have a structure separated from the light emitting part 1. Accordingly, in the camera apparatus, the main substrate may also be divided into a first substrate and a second substrate, the first base may be seated on the first substrate, and the second base may be seated on the second substrate. In addition, the camera apparatus may include a housing coupled to the base and a light emitting part including the optical part disposed in the housing. At this time, the camera apparatus may include a first cover. As a detailed configuration of each component, the same configuration described above or to be described below may be applied. In addition, the first cover may correspond to a cover to be described below, and the cover may also have a structure that is divided into the first cover on the first base and a second cover on the second base. In other words, the distance measuring camera apparatus may include the light emitting part including the first substrate, the first base disposed on the first substrate, the housing coupled to the first base, and the optical part disposed in the housing.

Furthermore, in the distance measuring camera apparatus, the light receiving part may include the second substrate separated from the first substrate, the image sensor disposed on the second substrate, and the second base disposed on the second substrate and separated from the first base. Furthermore, the light receiving part may further include the second cover.

In addition, the distance measuring camera apparatus may include a single substrate or an integrated substrate without separating the first substrate and the second substrate. In addition, the separated first base and second base may be seated on the integrated substrate. In addition, the camera apparatus may have only the second cover without the first cover, or only the first cover without the second cover.

As described above, in the distance measuring camera apparatus, the main substrate, the base, and the cover may be formed in a separated structure or an integrated structure. When separated, each of the main substrate, the base, and the cover may correspond to one component of the light emitting part and the light receiving part.

In addition, as described above, the second base 220 may be tilted, and the filter attached to the second base 220 may also be tilted, so that the camera apparatus according to the embodiment may perform a super resolution technique.

More specifically, the first base 210 according to the embodiment may include a body and a sidewall having a cavity therein.

The body may be positioned under the first base 210. Accordingly, the body may come into contact with the main substrate. In other words, the body may be supported by the main substrate. In addition, the body may be used interchangeably with a "bottom portion," and a bottom surface of the first base 210 may be the bottom portion or an upper surface of the body.

The sidewall may be disposed along an edge of the body at an upper portion of the body. In other words, the sidewall may be disposed on the bottom portion or the bottom surface of the first base 210.

In the embodiment, the sidewall may have the cavity inside, and the housing (or a component of the light emitting part such as the first optical part and the first lens holder) may be seated in the cavity as described above.

Furthermore, a first bonding member to be described below may be disposed between the bottom portion, which is the body, and the housing 110. In addition, the first bonding member may be disposed between the bottom portion, which is the body, and the lower surface of the housing 110. Accordingly, the first bonding member may come into contact with the body or the bottom portion and the lower surface of the housing to couple the base and the housing.

In addition, a second bonding member may be disposed to be spaced apart from the first bonding member in the optical axis direction, and disposed between the sidewall and the housing in the first base. For example, the first bonding member may be positioned inside the second bonding member. In addition, the second bonding member may be positioned above the first bonding member.

In addition, the second bonding member may be disposed between the stepped portion of the housing and the side wall of the base. Accordingly, the second bonding member may come into contact with the stepped portion of the housing and the sidewall of the base, and couple the stepped portion and the sidewall. In other words, the second bonding member may couple the housing and the base to each other, and improve the coupling force between the housing and the base.

Referring to FIG. 25, the second optical part 310 may be coupled to the second lens barrel 320. The second optical part 310 may be inserted into a hole positioned in a center of the second lens barrel 320. In addition, the second lens barrel 320 may be screw-coupled to the second base 220 of the base 200 by having a screw thread on the outer surface thereof.

The second optical part 310 may also be composed of a plurality of lenses. The second optical part 310 may have the same structure as the above-described first optical part or optical part.

Referring to FIG. 26, the cover 400 may include a first cover part 410 and a second cover part 420 in addition to the above description. The first cover part 410 may include a first cover hole 410a positioned on the first base part and overlapping the first optical part. A light signal (output light) passing through the first optical part through the first cover hole 410a may be irradiated to the object.

The second cover part 420 may include a second cover hole 420a positioned on the second base part and overlapping the second optical part. A light signal (reflected light) passing through the second optical part through the second cover hole 420a may be irradiated to the image sensor.

FIG. 27 is a view for describing a movement of the first optical part in the light emitting part according to the embodiment, FIG. 28 is a view for describing a form of the light signal according to the movement of the first optical part, and FIG. 29 is a view showing an example of an image of the light receiving part according to the movement of the first optical part.

Referring to FIGS. 27 to 29, as described above, the light signal (output light) may be converted into a surface light source or a point light source by moving the first optical part according to the embodiment in the vertical direction. At this time, as the first lens holder moves in the optical axis direction or in the vertical direction, the first optical part accommodated in the first lens holder may also move in the vertical direction together. Hereinafter, the movement of the first optical part will be described.

The first optical part may move from a first position (or a first height, H1) to a second position (or a second height, H2) along an optical axis (parallel to the Z-axis direction). In the camera apparatus according to the embodiment, when the first optical part is positioned in an area between the first position (or the first height, H1) and the second position (or the second height, H2), the light source may emit light.

At this time, the first position or the first height H1 refers to a position or a height when the first optical part 120 is moved to the lowermost portion by the driving part. For example, the first height H1 is a height at which the first optical part 120 is disposed at the lowest height.

The second position or the second height H2 refers to a position or a height when the first optical part 120 is moved to the uppermost portion by the driving part. For example, the second height H2 is a height when the first optical part 120 is disposed at the highest height.

In addition, in the camera apparatus according to the embodiment, the first optical part 120 may move from an initial position to an area between the first height H1 and the second height H2. In addition, the initial position may be positioned between the first height H1 and the second height H2. In this case, the camera apparatus can reduce energy consumption required for moving from the initial position to the position or height for light emission. In other words, it is possible to improve energy efficiency.

Alternatively, the initial position in the camera apparatus may be positioned under the first position (or the first height, H1). Accordingly, the camera apparatus according to the embodiment may output the light from the light source LS in the form of a point light source or a point pattern. Accordingly, since a user performs distance measurement on an object positioned at a long distance in most situations, the camera apparatus can reduce the energy efficiency and quickly perform the distance measurement.

In addition, in this specification, when the first optical part is positioned at the first height from the substrate, this corresponds to the above-described first position. In addition, when the first optical part is positioned at the second height from the substrate, this corresponds to the above-described second position. The second height may be greater than the first height.

The output light may be output in a planar pattern or multi-point form according to an interval between the light source and the first lens module (or the first optical part (hereinafter used interchangeably with "optical part")). Accordingly, when the first optical part 120 is positioned at the first height H1, the output light is irradiated to the object in the point form, and when the first optical part 120 is positioned at the second height H2, the output light may be irradiated to the object in the planar form.

In the embodiment, the first optical part 120 may be moved in the optical axis direction (Z-axis direction) by the driving part. In addition, as described above, the amount of movement to the upper portion of the first optical part 120 may be adjusted according to the amount of current flowing through the drive coil part.

For example, in the camera apparatus according to the embodiment, the first optical part 120 may move to have the distance from the light source LS from the maximum (the second height, see FIG. 27A) to the minimum (the first height, see FIG. 27B).

Specifically, the above-described distance between the light source and the optical part (the first optical part) may be a distance between an uppermost surface of an aperture of the light source and a lowermost surface of the optical part. In addition, when the distance between the uppermost surface of the aperture of the light source and the lowermost surface of the optical part is smaller than or equal to a predetermined distance, the light is output in the point form. In addition, when the distance between the uppermost surface of the aperture of the light source and the lowermost surface of the optical part is greater than or equal to the predetermined distance, the light source may be output in the planar form.

The controller to be described below may control the amount of current provided to the drive coil part to adjust the distance between the first lens module (or the first optical part) and the light source and finally control the form of the output light (surface light source or point light source). For example, the controller may change the amount of movement of the first lens module by the actuator when the amount of current provided to the drive coil part is changed (e.g., a current value is increased/decreased).

In the embodiment, when the distance between the light source and the first lens module (or the first optical part) is greater than or equal to or smaller than or equal to a certain distance, the light signal (output light) may be output in the form of the surface light source or the planar form as shown in FIGS. 28A and 29A. In other words, when the distance between the light source and the first lens module (or the first optical part) is between a preset distance (or the certain distance) and a maximum distance, the light signal (output light) may be output in the form of the surface light source or the planar form. Here, the maximum distance is a distance (second height) when the distance between the light source and the movable first lens module is maximum, and may be a distance between the height of the first lens module and the light source when the actuator is maximally driven (e.g., maximum current).

On the other hand, when the distance between the light source and the first lens module (or the first optical part) is smaller than or equal to the certain distance, the light signal may be output in the form of the point light source or the point form as shown in FIGS. 28B and 29B. In other words, when the distance between the light source and the first lens module (or the first optical part) is between the preset distance (or the certain distance) and a minimum distance, the light signal may be output in the form of the point light source or the point form. Here, the minimum distance is a distance (first height) when the distance between the light source and the movable first lens module (or first optical part) is minimum, and may also be a distance between the position (initial position) of the first lens module when the actuator is not driven and the light source.

In addition, as described above, the light signal (output light) from the light source may be output in the point form in a range of a predetermined distance or less, and higher energy may be applied to the object.

The camera apparatus according to the embodiment of the present invention provides the advantage in that it flexibly responses to the demands of various applications by changing the light pattern of the output light from the surface light source to the point light source or changing the resolution of the point light source according to the resolution of the output light, the distance from the object, the degree of power consumption, and the like.

FIG. 30 is a configuration diagram of the camera apparatus according to the embodiment and is a diagram for describing a light reflection in the camera apparatus, FIG. 31 is a cross-sectional view of the camera apparatus according to the embodiment, FIG. 32 is a cross-sectional view of a camera apparatus according to one example, FIG. 33 is a cross-sectional view of a camera apparatus according to another example, and FIG. 34 is a view illustrating a light source and an output value in the camera apparatus according to the embodiment.

Referring to FIGS. 30 and 31, the camera apparatus 10 according to the embodiment may include the substrate 4, the light source LS, the first lens holder 130, the first optical part 120, the driving part, the photodetector PD, and the controller CP. Except for contents to be described below, the above-described contents may be applied to the substrate 4, the light source LS, the first lens holder 130, the first optical part 120, the driving part, the photodetector PD, and the controller CP in the same manner.

In the camera apparatus 10, as described above, the controller CP may include a light controller configured to control the current supplied to the light source, a movement controller configured to control the current supplied to the driving part, and a detection part configured to detect an abnormal state of the optical part.

The light controller may adjust light power output from the light source by adjusting power (e.g., current) applied to the light source.

The movement controller may adjust the current provided to the coil of the driving part. By this control, the first optical part 120 may move to the first height to the second height.

In addition, in the camera apparatus 10, the light emitted by the light source LS may be reflected by the first optical part 120, the first lens holder 130, the filter F, and the like and provided to the photodetector PD. In addition, the photodetector PD may provide a detection value for the received light as an output value. For example, the photodetector PD may output a voltage or the like as the output value.

The detection part may detect an abnormal state of the first optical part using the output value of the above-described photodetector. The abnormal state according to the embodiment may include an abnormal state such as damage (e.g., crack), separation, or overcurrent of the optical part. Accordingly, the controller may detect the abnormal state of the first optical part in the detection part, and adjust the light power output from the light source through the light controller.

In the camera apparatus 10 according to the embodiment, as described above, the light source LS may be disposed on the substrate 4, and the light source LS and the first optical part 120 may overlap each other along the optical axis. For example, a center of the light source LS and a center of the first optical unit 12 may be the same. In addition, the photodetector PD may be disposed to be spaced apart from the light source in a direction perpendicular to the optical axis.

In the embodiment, in the camera apparatus, the light source LS, the photodetector PD, and a driver part may be sequentially disposed in a direction perpendicular to the optical axis. The driver part may include the controller CP.

For example, the light source LS may entirely overlap the first optical part 120 along the optical axis. In addition, the photodetector PD may also overlap the first optical part 12 along the optical axis. With this configuration, the photodetector PD may more easily detect the light reflected from the first optical part 120 or the like. For example, compared to a case in which the photodetector is disposed outside the first optical part, the output value output from the photodetector may be improved. In other words, it is possible to improve discrimination power for light detection in the photodetector.

In addition, the light source LS and the photodetector PD may overlap the filter F along the optical axis. Accordingly, the light source LS and the photodetector PD may be protected from foreign substances by the filter F.

Additionally, referring to FIGS. 32 and 33, in the camera apparatus 10 according to one example, the light source LS may overlap the first optical part 12 along the optical axis.

In addition, the photodetector PD may be disposed to be spaced apart from the light source LS in a direction perpendicular to the optical axis. In addition, the photodetector PD may at least partially overlap the first optical part 120 along the optical axis. In addition, the photodetector PD may overlap the filter F along the optical axis. With this configuration, it is possible to increase the sensitivity of the photodetector PD to the light reflected from the first optical part 120 among the light emitted from the light source LS. In other words, the photodetector PD may receive the light reflected from the first optical part 120 at a high rate.

Referring to FIG. 33, in a camera apparatus according to another example, the light source LS may overlap the first optical part 120 along the optical axis, and the photodetector PD may be disposed to be spaced apart from the light source LS in the direction perpendicular to the optical axis.

Furthermore, the photodetector PD may partially overlap or not overlap the first optical part 120 along the optical axis. For example, the photodetector PD may not be positioned in an area overlapping the first optical part 120 along the optical axis. In addition, the light source LS may overlap the filter F along the optical axis, but the photodetector PD may partially overlap or not overlap the filter F along the optical axis.

With this configuration, most of the light reflected by the first optical part 12 among the light emitted upward from the light source LS may be received by the photodetector PD. In other words, the light reflected only from the first optical part 120 may be intensively provided to the photodetector PD. Accordingly, it is possible to improve the accuracy of detecting the abnormal state of the first optical part 120.

Furthermore, in the camera apparatus according to the embodiment, the light source LS, the photodetector PD, and the first optical part 120 may be disposed at a predetermined angle.

For example, in the camera apparatus 10, a first line VL1 and a second line VL2 may form a first angle θ. Here, the first line VL1 is a line connecting the photodetector PD and an intersection AP1 between the optical axis OX and the lowermost surface of the first optical part 120. In addition, the second line VL2 is a line connecting the photodetector PD and an intersection AP2 between the optical axis OX and the uppermost surface of the light source LS. At this time, the first angle may be 10 degrees to 80 degrees.

A portion where the first line VL1 and the photodetector PD are connected may be a central area of the photodetector PD. In addition, a portion where the second line VL2 and the photodetector PD are connected may also be the central area of the photodetector PD. For example, the portion may be the center of the upper surface of the photodetector PD.

In addition, in the camera apparatus, the first angle θ may vary depending on the movement of the first optical part 120. For example, the first angle θ may vary from a second angle to a third angle. Here, the second angle may indicate the first angle when the first optical part 120 is positioned at the first height, and the third angle may indicate the first angle when the first optical part 120 is positioned at the second height. In the embodiment, the second angle may be smaller than the third angle. In other words, as the first optical part 120 moves away from the substrate 4, the first angle θ may decrease.

Referring to FIG. 34, in the camera apparatus according to the embodiment, when the light power output from the light source LS increases, the light detection by the photodetector PD, that is, output sensitivity increases. Conversely, in the camera apparatus according to the embodiment, when the light power output from the light source increases, the light detection by the photodetector, that is, the output value also increases.

FIG. 35 is a view for describing the movement of the first optical part in the camera apparatus according to the embodiment, and FIG. 36 is a view showing the output value according to a movement of the camera apparatus.

Referring to FIGS. 35 and 36, in the camera apparatus according to the embodiment, the photodetector PD may provide different output values according to the position of the first optical part 120. For example, the photodetector PD may output different output values as the first optical part 120 moves from the first height to the second height.

For example, the output value of the photodetector PD may decrease as the first optical part 120 moves upward along the optical axis. In other words, the light received by the photodetector PD may decrease.

In the embodiment, in the camera apparatus, the photodetector PD may output a first output value with respect to the light received from the first optical part 120 at the first height. In addition, the photodetector PD may output a second output value with respect to the light received from the first optical part 120 at the second height.

In addition, as the first optical part 120 is adjacent to the light source LS, the light reflected from the first optical part 120 may be provided to the photodetector PD, and the number of reflections and the amount of absorption may be decreased. Accordingly, the photodetector PD may provide a high output value. For example, the first output value may be greater than the second output value.

Here, the light source LS may output light to the first optical part at the first height and the second height with the same light power. For example, since the power applied by the light controller is the same, the light power of the light emitted from the light source LS may be equally provided regardless of the height of the first optical part 120. Accordingly, when the light power by the light source LS is the same, the output value of the photodetector may vary in response to the movement of the first optical part 120. In particular, when the height of the first optical part 120 increases from the substrate, the output value may decrease. In this case, the output value may increase linearly or non-linearly in response to the height of the first optical part 120.

Furthermore, even when the same light power is output by the light source LS, the output value of the photodetector in a case of outputting the surface light source may be smaller than that in a case of outputting light having the point pattern.

Furthermore, in the camera apparatus according to the embodiment, as described above, the controller may detect an abnormal state of the first optical part 120 or the light source LS using the output value of the photodetector PD. In addition, the controller may control the first optical part 120 or the light source LS based on the detected abnormal state of the first optical part 120.

In addition, the controller may detect the abnormal state, in particular, any one of an overcurrent, and an abnormality (e.g., damage) and separation of the first optical part by comparing the first output value detected through the detection part with a critical range.

For example, the controller may detect, as the abnormal state, a case in which the first output value of the photodetector PD is greater than the critical range of the photodetector PD, or a case in which the second output value of the photodetector PD is smaller than the critical range of the photodetector PD.

FIGS. 37 to 39 show the case in which the first output value is greater than the critical range of the photodetector PD, and FIGS. 40 and 41 show the case in which the second output value is smaller than the critical range of the photodetector PD, and descriptions thereof will be made below.

FIG. 37 is a view showing an abnormal state of the first optical part in the camera apparatus according to the embodiment, FIG. 38 is a view showing an output value for the movement of the camera apparatus upon overcurrent in the camera apparatus according to the embodiment, and FIG. 39 is a view showing an output value for the movement of the camera apparatus when the first optical part is damaged in the camera apparatus according to the embodiment.

Referring to FIG. 37, when the abnormality of the first optical part or the abnormality of the light source LS is present (abnormal state), the light provided to the photodetector PD may increase. For example, when the first optical part 120 is cracked or an overcurrent is applied to the light source LS, the output value of the photodetector may increase. In other words, as shown, when the overcurrent is applied to the first optical part (normal lens (overcurrent)), the first output value (overcurrent) may be greater than the first output value (normal). Likewise, the second output value (overcurrent) may be greater than the second output value (normal).

In addition, the first output value (crack) for a crack lens may be greater than the first output value (normal) for a normal lens. Likewise, the second output value (crack) for the crack lens may be greater than the second output value (normal) for the normal lens.

For example, when the first output value is greater than the critical range, the controller may detect, as the abnormal state, any one of the overcurrent and the abnormality (crack) of the first optical part. In other words, the controller may detect the abnormal state as any one of the overcurrent and the abnormality (crack) of the first optical part using the light received from the first optical part 120 at the first height. In addition, in response thereto, the controller may provide eye-safety to a human or the like by adjusting the light power irradiated to the object.

Referring to FIGS. 38 and 39, when the first output value of the photodetector is greater than the critical range, the controller may detect the abnormal state with any one of the overcurrent and the abnormality of the first optical part. In the following drawings, the first output value upon overcurrent is shown as a "first output value (overcurrent)," the second output value upon overcurrent is shown as a "second output value (overcurrent)," the first output value for the normal driving or lens is shown as a "first output value (normal)," and the second output value for the normal driving or lens is shown as a "second output value (normal)." In addition, the first output value for the crack lens is shown as a "first output value (crack)," and the second output value for the crack lens is shown as a "second output value (crack)."

In addition, the controller may detect or determine whether the abnormal state is the overcurrent or the abnormality (e.g., crack) of the first optical part using a slope between the first output value and the second output value output from the photodetector.

As shown in FIG. 38, the tendency may appear that the output values (the first output value (overcurrent) and the second output value (overcurrent)) output from the photodetector increase upon overcurrent, and when the height of the first optical part increases, the output values decrease. Accordingly, in the camera apparatus, when the slope between the first output value and the second output value is positive, the controller may detect this case as the abnormal state. In particular, when the slope between the first output value and the second output value is within a predetermined value (e.g., a critical slope), the controller may detect the abnormal state as the overcurrent.

Furthermore, when the first optical part is positioned at different positions among the first height and the second height other than the first output value and the second output value, the controller may compare the slope between the output values of the photodetector and another predetermined value corresponding to the slope. Accordingly, the camera apparatus may more easily and accurately detect the overcurrent as the abnormal state.

In addition, when the overcurrent is detected, the controller may perform eye-safety by reducing or blocking the current applied to the light source. In addition, in this specification, as the output value of the photodetector increases, the light irradiated to the object decreases, and as the output value of the photodetector decreases, the light irradiated to the object increases.

As shown in FIG. 39, when the abnormality (e.g., crack) of the first optical unit occurs among the abnormal states, the output values (first output values (crack) and the second output values (crack)) output from the photodetector may increase. For example, since diffuse reflection increases due to an uneven shape by the crack when the abnormality (crack) is present in the lens (hereinafter referred to as a "crack lens"), a reflectivity may increase compared to when there is no abnormality (hereinafter referred to as a "normal lens"). Conversely, a light transmittance in the normal lens may be higher than that in the crack lens.

In addition, the output value of the photodetector may also vary depending on whether the lens is abnormal. For example, the first output value for the crack lens may be greater than the first output value for the normal lens. Accordingly, in the camera apparatus according to the embodiment, when the first output value is greater than the critical range, as described above, the controller may determine the abnormality of the first optical part or the overcurrent.

In addition, when the abnormality is present in the first optical part, the output value of the photodetector may be changed in response to a change in the light power of the light source like the normal lens.

Alternatively, the slope between the first output value and the second output value output from the photodetector may be different from the slope at each of the normal lens and the crack lens. In addition, in the case of the crack lens and the normal lens, when the first optical part moves up (moves to the second position), the output value of the photodetector may also be changed differently.

In the embodiment, when the slope between the first output value and the second output value deviates from the predetermined value, the controller may detect abnormal state the as the abnormality (crack) of the optical part. In addition, in the case of the crack lens, the slope between the first output value and the second output value may vary. For example, a sign of the slope between the first output value and the second output value may be positive. Alternatively, in the case of the normal lens, the slope or change between the first output value and the second output value may be negative (may decrease).

As described above, the controller may detect the abnormal state of the first optical part using the slope or change between the first output value and the second output value.

Alternatively, the slope or change between the first output value and the second output value for the crack lens (hereinafter referred to as a "crack slope") may be greater than the slope or change between the first output value and the second output value for the normal lens (hereinafter referred to as a "normal slope"). For example, the crack slope may not fall within a predetermined ratio of the normal slope.

Accordingly, the controller may adjust the power applied to the light source so that the first output value falls within the critical range. For example, the controller may decrease the power (e.g., current) applied to the light source so that the first output value falls within the critical range.

Furthermore, the controller may also adjust the current for the movement of the first optical part in response to the control of the first output value.

In addition, since the output value of the photodetector increases in the case of the crack lens, the controller may adjust the power applied to the light source so that the output value of the photodetector for the first optical part between the first position and the second position falls within the critical range.

Furthermore, the controller may detect the abnormal state as any one of the overcurrent and the abnormality (crack) of the first optical part using not only the first output value but also the light received from the first optical part positioned between the first height and the second height.

In addition, the critical range may be changed in response to at least one of the position of the first optical part and the light power of the light source. For example, in the critical range, the output value of the photodetector at the first height of the first optical part and maximum light power of the light source is set to a maximum value. In addition, in the critical range, the output value of the photodetector at the second height of the first optical part and minimum light power of the light source is set to a minimum value.

Alternatively, the critical range may be set for each height of the first optical part. Furthermore, the critical range may be set differently in response to the light power of the light source. With this configuration, the abnormal state of the first optical part may be detected even when the position of the first optical part is changed. Accordingly, it is possible to easily perform eye-safety for a human or the like by adjusting the light power irradiated to the object.

FIG. 40 is a view showing a separation of the first optical part in the camera apparatus according to the embodiment, and FIG. 41 is a view showing an output value for the movement of the camera apparatus when the first optical part is separated in the camera apparatus according to the embodiment.

Referring to FIGS. 40 and 41, in the camera apparatus according to the embodiment, as described above, the abnormal state of the first optical part may include the separation of the first optical part.

FIG. 41 shows output values of the photodetector obtained through experiments (Experiment 1 to Experiment 4) for each of the cases in which the lens is separated and the first optical part is normally positioned (normal lens 1 to normal lens 3).

For example, the separation of the first optical part may include a case in which the first optical part is separated from the lens holder, a case in which the lens is separated from the lens barrel, a case in which the lens barrel or the lens is separated, a case in which the first optical part is separated from the optical axis, and the like.

Since the amount of light reflection decreases when the first optical part is separated, the output value of the photodetector may also decrease.

Accordingly, when the second output value is smaller than the critical range, the controller may detect the abnormal state as the separation of the first optical part. For example, the controller may increase the output of the light source so that the second output value falls within the critical range or output an alarm for the separation of the first optical part.

Furthermore, the controller may detect the abnormal state even when the output value of the photodetector detected while the first optical part moves from the first height to the second height deviates the critical range.

FIG. 42 is a view showing a modified example of the camera apparatus according to the embodiment, and FIG. 43 is a view showing a perspective view and a bottom view of the first optical part.

Referring to FIGS. 42 and 43, in this embodiment, the first optical part may include a first lens barrel and at least one lens accommodated in the first lens barrel as described above.

In addition, the camera apparatus according to this embodiment may further include a reflective member RM disposed on a lower surface of a lens 121 or a first lens barrel 122.

For example, the reflective member RM may be disposed on the lower surface of the lens closest to the light source of the at least one lens 121, or disposed on the lower surface of the first lens barrel 122.

The reflective member RM may be made of a material having high reflectivity to light. For example, the reflective member RM may be made of a metal.

In addition, the reflective member RM may be disposed along an edge of the lens 121. For example, the reflective member RM may form a closed loop along an edge of the lens 121. At this time, the reflective members RM may be continuously or discontinuously disposed. With this configuration, the reflective member RM is not positioned within a viewing range of the light emitted from the light source LS, so that it is possible to reduce light loss.

Alternatively, the reflective member RM may be disposed under the first lens barrel 122 and positioned outside the viewing angle of the light source LS, so that it is possible to perform light reflection regardless of the movement (the first position and the second position) of the first optical part 120.

Due to the reflective member RM, the output value of the photodetector PD may increase. Accordingly, the discrimination power may increase in detecting or determining the abnormal state of the first optical part 120.

FIG. 44 is a configuration diagram of a camera apparatus according to another embodiment, and FIG. 45 is a configuration diagram of a light emitting part and a light receiving part in the camera apparatus according to another embodiment. In addition, FIG. 46 is a cross-sectional view of the camera apparatus according to another embodiment, and FIG. 47 is another cross-sectional view of the camera apparatus according to another embodiment. In addition, FIG. 48 is a configuration diagram showing the connection between the light emitting part, the light receiving part, and a controller in the camera apparatus according to another embodiment.

Referring to FIGS. 44 to 48, a camera apparatus 10A according to another embodiment may include a substrate 1050, a light emitting part 1010, a light receiving part 1030, and a cover member 1070. In this camera apparatus 10A, the substrate 1050 corresponds to the above-described substrate (the main substrate, the connection substrate, and the like), the light emitting part 1010 corresponds to the above-described light emitting part 1 (see FIG. 3), the light receiving part 1030 corresponds to the above-described light receiving part 2 (see FIG. 3), and the cover member 1070 corresponds to the above-described cover 400 (see FIG. 3). Accordingly, except for the above-described contents, contents to be described below will be applied to the components. Furthermore, a configuration in which opening and closing of a shutter member is controlled by a controller to be described below may also be applied to the above-described camera module 10 (see FIG. 3).

The substrate 1050 may support the light emitting part 1010 and the light receiving part 1030. The substrate 1050 may be electrically connected to the light emitting part 1010 and the light receiving part 1030. The substrate 1050 may be a circuit board. The substrate 50 may include a wiring layer for supplying power to the light emitting part 1010 and the light receiving part 1030, and may be a printed circuit board (PCB) formed of a plurality of resin layers. For example, the substrate 1050 may include at least one of a rigid PCB, a metal core PCB (MCPCB), a flexible PCB (FPCB), and a rigid flexible PCB (RFPCB).

In addition, the substrate 1050 may include a synthetic resin including glass, resin, epoxy, and the like, and include a ceramic having excellent thermal conductivity and a metal having an insulated surface. The substrate 1050 may have a shape such as a plate or a lead frame, but is not limited thereto. In addition, although not shown in the drawings, a Zener diode, a voltage regulator, a resistor, and the like may be further disposed on the substrate 1050, but the present invention is not limited thereto.

An insulating layer (not shown) or a protective layer (not shown) may be disposed on the substrate 1050. The insulating layer or the protective layer may be disposed on at least one of one surface and the other surface of the substrate 1050.

The light emitting part 1010 may be disposed on the substrate 1050. The light emitting part 1010 may emit light. The light emitting part 1010 may emit light having a set intensity in a set direction. For example, the light emitting part 1010 may emit light toward the front surface of the light emitting part 1010, for example, an object positioned in a light emission direction of the light emitting part 1010.

The light receiving part 1030 may be disposed on the substrate 1050. The light receiving part 1030 may detect light. The light receiving part 1030 may detect the light emitted from the light emitting part 1010. The light receiving part 1030 may detect the light reflected by the object. Specifically, the light receiving part 1030 may detect the light emitted from the light emitting part 1010 and reflected by the object.

In other words, the camera apparatus 10A may be a time of flight (TOF) camera that calculates a depth map of the object based on light information that emits light toward an object, is reflected by the object, and returned.

In addition, the camera apparatus 10A may further include a coupling part (not shown), a connection part (not shown), and a controller 1730.

The coupling part may be connected to an optical device to be described below. The coupling part may include a circuit board and a terminal disposed on the circuit board. For example, the terminal may be a connector for physical and electrical connection with the optical device.

The connection part may be disposed between the substrate 1050 and the coupling part. The connection part may connect the substrate 1050 and the coupling part. For example, the connection part may include a flexible PCB (FBCB), and may electrically connect the substrate 1050 and the circuit board of the coupling part.

The controller 1730 may control opening and closing of a shutter member 1400. Specifically, the controller 1730 may control the opening and closing of the shutter member 1400 based on the amount of light incident on a light receiving element 1230. A description of the controller 1730 will be described in more detail with reference to FIGS. 48 to 52 to be described below.

Again, when the light emitting part 1010 is described in more detail, the light emitting part 1010 may be disposed on the substrate 1050. The light emitting part 1010 may include a light source 1210, a first housing 1110, a diffuser 1300, a second housing 1120, the shutter member 1400, and the light receiving element 1230. The light source 1210 may be disposed on the substrate 1050. The light source 1210 may directly come into contact with an upper surface of the substrate 1050 and may be electrically connected to the substrate 1050.

The light source 1210 may include a light emitting element. For example, the light source 1210 may include at least one light emitting element of a light emitting diode (LED), a vertical cavity surface emitting laser (VCSEL), an organic light emitting diode (OLED), and a laser diode (LD).

The light source 1210 may include one or a plurality of light emitting elements. When the light source 1210 includes the plurality of light emitting elements, the plurality of light emitting elements may be disposed along a set pattern on the substrate 1050. Specifically, the plurality of light emitting elements may be disposed so that an area in which light is emitted from the plurality of light emitting elements, for example, at least one aperture for light emission has a predetermined rule.

The light source 1210 may emit light having a set wavelength band. Specifically, the light source 1210 may emit visible rays or infrared rays. For example, the light source 1210 may emit visible rays having a wavelength band of about 380 nm to about 700 nm. In addition, the light source 1210 may emit infrared rays having a wavelength band of about 700 nm to about 1 mm.

The first housing 1110 may be disposed on the substrate 1050. The first housing 1110 may be disposed on the light source 1210. The first housing 1110 may be disposed to cover the light source 1210. For example, the first housing 1110 may include an accommodation space configured to accommodate the light source 1210 therein. The accommodation space of the first housing 1110 may have a greater width and height than a width and height of the light source 1210. Accordingly, an inner surface of the first housing 1110, specifically, an inner surface of the first housing 1110 formed by the accommodation space may be spaced apart without coming into contacting with the light source 1210.

The first housing 1110 may come into contact with the upper surface of the substrate 1050. For example, the first housing 1110 may directly come into contact with the substrate 1050 via a separate adhesive member (not shown) and may be fixed to the upper surface of the substrate 1050. In addition, the first housing 1110 may be fixed by fixing members such as a fixing protrusion and a fixing groove formed on the first housing 1110 and the upper surface of the substrate 1050, respectively, or fixed by a fastening member such as a screw.

The first housing 1110 may include a first opening O1. The first opening O1 may be disposed on the upper surface of the first housing 1110. The first opening O1 may be a hole passing through the upper surface of the first housing 1110 and the inner surface of the first housing 1110. The first opening O1 may be disposed in an area corresponding to the light source 1210. Specifically, the first opening O1 may be disposed in an area vertically overlapping the light source 1210. More specifically, a center of the light source 1210 may vertically overlap a center of the first opening O1. A width of the first opening O1 may have a greater width than that of the light source 1210 in consideration of a directivity angle of the light source 1210.

The first housing 1110 may include at least one material of a resin and a metal. For example, the first housing 1110 may include a thermoplastic resin or a thermosetting resin. In addition, the first housing 1110 may include at least one metallic material of silver (Ag), copper (Cu), gold (Au), platinum (Pt), titanium (Ti), magnesium (Mg), chromium (Cr), molybdenum (Mo), nickel (Ni), tin (Sn), aluminum (Al), stainless steel, and alloys including the same.

The diffuser 1300 may be disposed on the first housing 1110. The diffuser 1300 may be disposed in an area corresponding to the first opening O1. The diffuser 1300 may be disposed on the first opening O1. The diffuser 1300 may be coupled to the first housing 1110. For example, the diffuser 1300 may be disposed on a stepped portion of the first housing 1110 formed to be stepped on the first opening O1 and may be coupled to the first housing 1110.

The diffuser 1300 may be disposed on the light source 1210. The diffuser 1300 may be disposed on a path through which the light emitted from the light source 1210 moves. For example, the diffuser 1300 may be disposed in an area vertically overlapping the light source 1210. Specifically, a center of the diffuser 1300 may vertically overlap the center of the light source 1210.

The diffuser 1300 may control a path of the light emitted from the light source 1210. For example, the diffuser 1300 may condense, diffuse, scatter, and the like the light emitted from the light source 1210. The diffuser 1300 may emit the light emitted from the light source 1210 in various cross-sectional shapes, such as a circular shape, an elliptical shape, and a rectangular shape. Accordingly, the diffuser 1300 may protect the object by preventing the light of the light source 1210 from being directly irradiated to the object. For example, the diffuser 1300 may prevent the light of the light source 1210 from being directly irradiated to a light-sensitive area, such as human eyes or skin.

The second housing 1120 may be disposed on the substrate 1050. The second housing 1120 may be disposed on the light source 1210, the first housing 1110, and the diffuser 1300. The second housing 1120 may be disposed to cover the light source 1210, the first housing 1110, and the diffuser 1300. For example, the second housing 1120 may include an accommodation space configured to accommodate the components 210, 110, and 300 therein.

The second housing 1120 may come into contact with the upper surface of the substrate 1050. For example, the second housing 1120 may directly come into contact with the substrate 1050 via a separate adhesive member (not shown) and may be fixed to the upper surface of the substrate 1050. In addition, the second housing 1120 may be fixed by fixing members such as a fixing protrusion and a fixing groove formed on the second housing 1120 and the upper surface of the substrate 1050, respectively, or fixed by a fastening member such as a screw.

The accommodation space of the second housing 1120 may have a greater width and height than a width and height of the first housing 1110. Accordingly, an inner surface of the second housing 1120 and an outer surface of the first housing 1110 may be spaced apart from each other without coming into contact with each other, and a predetermined space may be formed therebetween.

In addition, the second housing 1120 may be spaced apart from the diffuser 1300. Specifically, an inner surface facing an upper surface of the diffuser 1300 among the inner surfaces of the second housing 1120 may be disposed above the upper surface of the diffuser 1300. Accordingly, a space between the diffuser 1300 and the shutter member 1400 to be described below, for example, a space in which light may move may be formed.

The second housing 1120 may include a second opening O2. The second opening O2 may be disposed on the upper surface of the second housing 1120. The second opening O2 may be a hole passing through the upper surface of the second housing 1120 and the inner surface of the second housing 1120.

The second opening O2 may be disposed in an area corresponding to the first opening O1. A center of the second opening O2 may vertically overlap the center of the first opening O1. In addition, the second opening O2 may be disposed in an area corresponding to the diffuser 1300. The center of the second opening O2 may vertically overlap the center of the diffuser 1300. A width of the second opening O2 may be greater than or equal to the width of the first opening O1 in consideration of the light emission direction, directivity angle, and the like of the light passing through the diffuser 1300.

The second housing 1120 may include at least one material of a resin and a metal. For example, the second housing 1120 may include a thermoplastic resin or a thermosetting resin. In addition, the second housing 1120 may include at least one metallic material of silver (Ag), copper (Cu), gold (Au), platinum (Pt), titanium (Ti), magnesium (Mg), chromium (Cr), molybdenum (Mo), nickel (Ni), tin (Sn), aluminum (Al), stainless steel, and alloys including the same. The second housing 1120 may include the same material as the first housing 1110.

The shutter member 1400 may be disposed on the second housing 1120. The shutter member 1400 may be disposed in an area corresponding to the second opening O2. The shutter member 1400 may be coupled to the second housing 1120. In addition, the shutter member 1400 may be connected to the substrate 1050. For example, the shutter member 1400 may be electrically connected to the substrate 1050 through a connection wiring (not shown), a flexible PCB (FPCB), or the like.

The shutter member 1400 may be disposed on the diffuser 1300. The shutter member 1400 may be disposed on a path through which the light emitted from the diffuser 1300 moves, and spaced apart from the diffuser 1300 by a predetermined distance. The shutter member 1400 may be disposed in an area vertically overlapping the diffuser 1300. For example, a center of the shutter member 1400 may overlap the center of the diffuser 1300.

The shutter member 1400 may pass or block the light emitted from the light source 1210. For example, the shutter member 1400 may control the movement path of the light by opening and closing the second opening O2. Specifically, the shutter member 1400 may open and close the second opening O2 according to a signal applied from the controller 1730. The shutter member 1400 may pass or block the light passing through the diffuser 1300. In other words, the shutter member 1400 may pass or block the light emitted toward the object from the light source 1210 to an outside of the camera apparatus 10A.

The light receiving element 1230 may be disposed on the substrate 1050. The light receiving element 1230 may be disposed to come into direct contact with the upper surface of the substrate 1050. The light receiving element 1230 may be electrically connected to the substrate 1050.

The light receiving element 1230 may include at least one of a photo diode PD, a photo transistor, a photogate, and a photo IC.

The light receiving element 1230 may be disposed between the first housing 1110 and the second housing 1120. Specifically, the light receiving element 1230 may be disposed in an area between the outer surface of the first housing 1110 and the inner surface of the second housing 1120. One or a plurality of light receiving elements 1230 may be disposed in the area.

The light receiving element 1230 may receive the light emitted from the light source 1210. The light receiving element 1230 may receive light corresponding to the light emitted from the light source 1210. The light receiving element 1230 may receive visible rays or infrared rays. For example, when infrared rays having a wavelength band of about 700 nm to about 1 mm are emitted from the light source 1210, the light receiving element 1230 may receive the infrared rays having a wavelength band of about 700 nm to about 1 mm.

The light receiving element 1230 may receive the light reflected by the shutter member 1400. Specifically, the light receiving element 1230 may receive light reflected by the closed shutter member 1400 among the light emitted from the light source 1210 and passing through the diffuser 1300. In other words, the light receiving element 1230 may be disposed at a position where a part of the light emitted from the light source 1210 may be received. The light receiving element 1230 may be disposed closer to the second housing 1120 than the first housing 1110 in consideration of the incidence of the reflected light reflected by the shutter member 1400. The shutter member 1400 may be controlled by the amount of light received by the light receiving element 1230. For example, the controller 1730 may control the opening and closing of the shutter member 1400 based on the amount of light received from the light receiving element 1230.

In other words, the camera apparatus 10A according to another embodiment may detect whether the light source 1210 and/or the diffuser 1300 is damaged and separated by disposing the shutter member 1400 and the light receiving element 1230. In addition, it is possible to control the power of the light source 1210 based on information on the amount of light received by the light receiving element 1230, thereby further improving safety.

The light emitted to the outside and the light incident on the light receiving element 1230 according to the opening and closing of the shutter member 1400 will be described in more detail with reference to FIGS. 49 and 50 to be described below. In addition, a description of the opening and closing operation of the shutter member 1400 will be described in more detail with reference to FIGS. 51 and 52 to be described below.

In addition, when the light receiving part 1030 is described in more detail, the light receiving part 1030 may be disposed on the substrate 1050. The light receiving part 1030 may include an image sensor 1250, a third housing 1130, and a lens member 1500.

The image sensor 1250 may be disposed on the substrate 1050. The image sensor 1250 may come into direct contact with the upper surface of the substrate 1050. The image sensor 1250 may be electrically connected to the substrate 1050. The image sensor 1250 may be spaced apart from the light source 1210. Here, the image sensor 1250 may be disposed on the same substrate 1050 as the light source 1210. However, the embodiment is not limited thereto, and the image sensor 1250 may be disposed on a substrate different from the light source 1210. In this case, the substrates on which each of the image sensor 1250 and the light source 1210 is disposed may be electrically connected to each other and spaced apart from each other.

The image sensor 1250 may detect light. The image sensor 1250 may detect the light reflected by the object and incident on the camera apparatus 10A. The image sensor 1250 may detect light having a wavelength corresponding to the light emitted from the light source 1210. Specifically, the image sensor 1250 may detect a depth map of the object by detecting the light emitted from the light source 1210 and reflected by the object.

The third housing 1130 may be disposed on the substrate 1050. The third housing 1130 may be disposed on the image sensor 1250. The third housing 1130 may be disposed to cover the image sensor 1250. For example, the third housing 1130 may include an accommodation space configured to accommodate the image sensor 1250 therein. The accommodation space of the third housing 1130 may have a greater width and height than a width and height of the image sensor 1250. Accordingly, an inner surface of the third housing 1130, specifically, an inner surface of the third housing 1130 formed by the accommodation space may be spaced apart without coming into contact with the image sensor 1250.

The third housing 1130 may come into contact with the upper surface of the substrate 1050. For example, the third housing 1130 may come into direct contact with the substrate 1050 via a separate adhesive member (not shown) and may be fixed to the upper surface of the substrate 1050. In addition, the third housing 1130 may be fixed by fixing members such as a fixing protrusion and a fixing groove formed on the third housing 1130 and the upper surface of the substrate 1050, respectively, or fixed by a fastening member such as a screw.

The third housing 1130 may include a third opening O3. The third opening O3 may be disposed on an upper surface of the third housing 1130. The third opening O3 may be a hole passing through the upper surface of the third housing 1130 and the inner surface of the first housing 1110. The third opening O3 may be disposed in an area corresponding to the image sensor 1250. Specifically, the third opening O3 may be disposed in an area vertically overlapping the image sensor 1250.

The third housing 1130 may include at least one material of a resin and a metal. For example, the third housing 1130 may include a thermoplastic resin or a thermosetting resin. In addition, the third housing 1130 may include silver (Ag), copper (Cu), gold (Au), platinum (Pt), titanium (Ti), magnesium (Mg), chromium (Cr), molybdenum (Mo), nickel (Ni), tin (Sn), aluminum (Al), stainless steel, and alloys including the same. The third housing 1130 may include the same material as the first housing 1110 and the second housing 1120.

The lens member 1500 may be disposed on the image sensor 1250. The lens member 1500 may be spaced apart from the image sensor 1250. The lens member 1500 may be disposed on the third housing 1130. The lens member 1500 may be disposed in an area corresponding to the third opening O3. The lens member 1500 may be inserted into the third opening O3 and coupled to the third housing 1130.

The lens member 1500 may be disposed on the image sensor 1250. The lens member 1500 may be spaced apart from the image sensor 1250 and may include at least one lens. The lens member 1500 may pass the light incident on the light receiving part 1030, for example, the light reflected by the object toward the image sensor 1250. To this end, the lens member 1500 may be disposed so that an optical axis corresponds to the optical axis of the image sensor 1250.

The lens member 1500 may be disposed on the third housing 1130. The lens member 1500 may be disposed in an area corresponding to the third opening O3. A part of the lens member 1500 may be inserted into the third opening O3, and coupled to the third housing 1130. An upper surface of the lens member 1500 may be disposed above the upper surface of the third housing 1130. A partial area of the lens member 1500 may be disposed in the third opening O3 and may protrude from the upper surface of the third housing 1130.

The light receiving part 1030 may further include a filter (not shown). The filter may be disposed between the image sensor 1250 and the lens member 1500. The filter may be coupled to the third housing 1130.

The filter may pass light having a set wavelength band. Specifically, the filter may pass light having a wavelength corresponding to the light source 1210 among light having various wavelengths incident on the light receiving part 1030 through the lens member 1500, and block light having a different wavelength band.

The camera apparatus 10A may include the cover member 1070. The cover member 1070 may be disposed on the substrate 1050. The cover member 1070 may be disposed on the light emitting part 1010 and the light receiving part 1030. For example, the cover member 1070 may include an accommodation space configured to accommodate the light emitting part 1010 and the light receiving part 1030, and the light emitting part 1010 and the light receiving part 1030 may be disposed in the accommodation space. The cover member 1070 may be disposed to cover the light emitting part 1010 and the light receiving part 1030 and may come into direct with the light emitting part 1010 and the light receiving part 1030.

The cover member 1070 may include a material having predetermined stiffness and reliability. Accordingly, the cover member 1070 may protect the light emitting part 1010 and the light receiving part 1030 disposed therein from an external impact. In addition, the cover member 1070 may be a non-magnetic substance. The cover member 1070 may include a metallic material. The cover member 1070 may be formed of a metal plate. The cover member 1070 may be electrically connected to the substrate 1050 and a ground electrode part. Accordingly, the cover member 1070 may be grounded. In addition, the cover member 1070 may include a material capable of shielding electromagnetic interference (EMI). At this time, the cover member 1070 may be referred to as an "EMI shield can." Accordingly, the camera apparatus 10A can prevent other adjacent modules from malfunctioning due to electromagnetic waves generated by the camera apparatus 10A, and prevent the camera apparatus 10A from malfunctioning due to electromagnetic waves generated from other adjacent modules.

The cover member 1070 may include a plurality of holes. For example, the cover member 1070 may include a first hole hh1 and a second hole hh2 spaced apart from each other.

The first hole hh1 may be disposed in an area corresponding to the light emitting part 1010. Specifically, the first hole hh1 may be disposed in an area corresponding to the second opening O2. More specifically, the first hole hh1 may be disposed in an area overlapping the shutter member 1400. The first hole hh1 may have a width corresponding to or different from the width of the shutter member 1400. A part of the shutter member 1400 may be inserted into and disposed in the first hole hh1. In this case, the cover member 1070 may fix a position of the shutter member 1400 and support the shutter member 1400.

The second hole hh2 may be disposed in an area corresponding to the light receiving part 1030. Specifically, the second hole hh2 may be disposed in the area corresponding to the third opening O3. More specifically, the second hole hh2 may be disposed in an area overlapping the lens member 1500. The second hole hh2 may have a width corresponding to or different from a width of the lens member 1500. A part of the lens member 1500 may be inserted into and disposed in the second hole hh2. In this case, the cover member 1070 may fix a position of the lens member 1500 and support the lens member 1500. In addition, the upper surface of the lens member 1500 may be disposed above an upper surface of the cover member 1070. A partial area of the lens member 1500 may protrude from the upper surface of the cover member 1070.

The cover member 1070 may include a partition wall part 1075. At least one partition wall part 1075 may be disposed between the light emitting part 1010 and the light receiving part 1030. The partition wall part 1075 may have a shape extending from the inner surface of the accommodation space of the cover member 1070 toward the upper surface of the substrate 1050.

The partition wall part 1075 may have a width corresponding to a width between the light emitting part 1010 and the light receiving part 1030. Specifically, the partition wall part 1075 may be provided to have a width corresponding to the area between the second housing 1120 and the third housing 1130 to stably fix the light emitting part 1010 and the light receiving part 1030.

In addition, referring to FIG. 47, the partition wall part 1075 of the cover member 1070 may be omitted. For example, the first housing 1110 and the third housing 1130 may be integrally formed, and the integrally formed housing may include a plurality of accommodation spaces configured to accommodate each of the light source 1210 and the image sensor 1250. At this time, at least one sidewall configured to separate the light source 1210 and the image sensor 1250, for example, at least one sidewall shared by the first housing 1110 and the third housing 1130 may function as the above-described partition wall part 1075.

When the first and third housings 1100 and 1300 are integrally formed, the second housing 1120 may be disposed on the first and third housings 1100 and 1300. For example, one area of the second housing 1120 may be coupled to the upper surface of the substrate 1050, and the other area of the second housing 1120 may be integrally formed with upper surfaces of the integrally formed first and third housings 1100 and 1300. Accordingly, the second housing 1120 may be coupled to the substrate 1050 and the first and third housings 1100 and 1300. In addition, the first to third housings 1100, 1200, and 1300 may be integrally formed, but the present invention is not limited thereto.

In addition, the camera apparatus 10A may further include a detection part 1730. The detection part 1730 may be connected to the controller 1730 and may include at least one sensor. For example, the detection part 1730 may include at least one of sensors that may detect an impact or acceleration, such as a vibration sensor, an impact detection sensor, a gyro sensor, and an acceleration sensor. The detection part 1730 may detect an impact or acceleration applied to the camera apparatus 10A.

FIGS. 49 and 50 are views showing a light movement path according to the opening and closing of the shutter member in the light emitting part of the camera apparatus according to another embodiment.

Referring to FIGS. 49 and 50, the shutter member 1400 may pass or block the light emitted from the light source 1210.

First, referring to FIG. 49, the shutter member 1400 according to another embodiment may be closed (OFF). For example, the shutter member 1400 may be closed by a signal applied from the controller 1730.

When the shutter member 1400 is closed, the light emitted from the light source 1210 may not be emitted to the outside of the camera apparatus 10A. Specifically, the light emitted from the light source 1210 may pass through the diffuser 1300, but may not be emitted to the outside of the camera apparatus 10A by the closed shutter member 1400.

In this case, light LL1 passing through the diffuser 1300 may be incident on the light receiving element 1230 of the light emitting part 1010. Specifically, a part of the light LL1 passing through the diffuser 1300 may be reflected by the shutter member 1400, and a part of reflected light LL2 reflected by the shutter member 1400 may be reflected by the light receiving element 1230. In this process, the light receiving element 1230 may receive a part of the light emitted from the light source 1210.

In addition, as shown in FIG. 50, the shutter member 1400 may be open (ON). For example, the shutter member 1400 may be open by a signal applied from the controller 1730.

When the shutter member 1400 is open, the light emitted from the light source 1210 may be emitted to the outside of the camera apparatus 10A. Specifically, the light emitted from the light source 1210 may pass through the diffuser 1300, and the light LL1 passing through the diffuser 1300 may be emitted to the outside of the camera apparatus 10A through the opened shutter member 1400. In other words, the light LL1 passing through the diffuser 1300 may be emitted toward an object positioned in front of the camera apparatus 10A. Thereafter, the light reflected by the object may be incident on the light receiving part 1030 of the camera apparatus 10A.

Light may be incident on the light receiving element 1230 of the light emitting part 1010. For example, a part of the light LL1 passing through the diffuser 1300 may be reflected by a component of the camera apparatus 10A, for example, the second housing 1120, the shutter member 1400, the cover member 1070, or the like and incident on the light receiving element 1230 by a small amount. In addition, as the shutter member 1400 is open, light from the outside of the camera apparatus 10A, for example, external light may be incident on the light receiving element 1230.

The controller 1730 may control the opening and closing of the shutter member 1400 based on the light received by the light receiving element 1230. Specifically, the controller 1730 may control the opening and closing of the shutter member 1400 based on the wavelength band and the amount of light received by the light receiving element 1230.

For example, the controller 1730 may apply power to the light source 1210 in a state in which the shutter member 1400 is closed (see FIG. 49). Accordingly, the light source 1210 may emit light, and the light emitted from the light source 1210 may be incident on the diffuser 1300. In addition, the light LL1 passing through the diffuser 1300 may be reflected by the shutter member 1400 and incident on the light receiving element 1230. At this time, the light receiving element 1230 may receive light having a wavelength band corresponding to the light source 1210, and when the received light satisfies a set light amount range, the controller 1730 may determine that a state of the diffuser 1300 is normal. In addition, when the received light does not satisfy the set light amount range, the controller 1730 may determine that the state of the diffuser 1300 is abnormal.

When it is determined that the state of the diffuser 1300 is normal, the controller 1730 may open the shutter member 1400 (see FIG. 50). Accordingly, the light emitted from the light source 1210 may pass through the shutter member 1400 and may be emitted toward the object. In addition, when it is determined that the state of the diffuser 1300 is abnormal, the controller 1730 may maintain the shutter member 1400 in a closed state, or close the shutter member 1400 when the shutter member 1400 is in an open state.

In addition, the controller 1730 may control the operation of the camera apparatus 10A based on a signal detected by the detection part 1730. Specifically, when the detection part 1730 detects an impact or acceleration exceeding a set range, the controller 1730 may control the operations of the light source 1210 and the shutter member 1400.

For example, as shown in FIG. 49, when the detection part 1730 detects the impact or acceleration exceeding the set range in a state in which the shutter member 1400 is closed, the controller 1730 may turn off the light source 1210, and maintain the closed state of the shutter member 1400.

In addition, as shown in FIG. 50, when the detection part 1730 detects the impact or acceleration exceeding the set range in a state in which the shutter member 1400 is open and the light source 1210 is turned on, the controller 1730 may turn off the light source 1210, and close the opened shutter member 1400.

Accordingly, the camera apparatus 10A may confirm whether the light emitting part 1010 is damaged, the components are separated, and the like, and in particular, confirm whether the diffuser 1300 is in a normal state. Accordingly, it is possible to confirm the safety of the light provided to the object by passing through the diffuser 1300, thereby further improving safety.

Hereinafter, a method of confirming a normal operation of the camera apparatus according to another embodiment will be described in more detail with reference to FIGS. 51 and 52. FIGS. 51 and 52 are views showing confirming whether the camera apparatus according to another exemplary embodiment is normal.

Referring to FIGS. 51 and 52, the method of confirming the normal operation of the camera apparatus 10A according to another embodiment may include an operation of closing a shutter member (S10), an operation of emitting light (S20), an operation of receiving light by a light receiving element (S30), and an operation of controlling the opening and closing of the shutter member (S40).

First, the operation of closing the shutter member (S10) may be an operation of closing the shutter member 1400 of the light emitting part 1010. For example, when the shutter member 1400 is open, the operation S10 may be an operation of closing the shutter member 1400. In addition, the operation S10 may be an operation of confirming that the shutter member 1400 is in a closed state. For example, the operation S10 may be an operation of confirming and maintaining the closed state when the shutter member 1400 is closed. In other words, in the operation S10, the shutter member 1400 may maintain the closed state. Accordingly, in the operation S10, light may not be introduced into the camera apparatus 10A from the outside of the camera apparatus 10A. In addition, the operation S10 may be an operation of not applying power to the light source 1210.

Subsequently, the operation of emitting light (S30) may proceed. The operation of emitting light (S30) may be an operation of applying power to the light source 1210. In the operation of emitting light (S30), the light source 1210 may emit light by the applied power. The light source 1210 may emit light toward the diffuser 1300. The light source 1210 may emit light toward the shutter member 1400.

Thereafter, the operation of receiving light by the light receiving element (S50) may proceed. The operation of receiving light (S50) may be an operation of receiving light by the light receiving element 1230 disposed between the first housing 1110 and the second housing 1120. The operation of receiving light (S50) may be an operation of receiving a part of the light emitted from the light source 1210. In the operation of receiving light (S50), the light receiving element 1230 may receive the light reflected by the shutter member 1400. Specifically, the operation S50 may be an operation of receiving a part of the light reflected by the shutter member 1400 by passing through the diffuser 1300 by the light receiving element 1230.

Subsequently, the operation of controlling the opening and closing of the shutter member (S70) may proceed. The operation S70 may be an operation of controlling the opening and closing of the shutter member 1400 based on the light incident on the light receiving element 1230.

Specifically, the operation of controlling the opening and closing of the shutter member (S70) may include an operation of determining the amount of light received by the light receiving element 1230. Specifically, the operation of determining the amount of light may be an operation of determining whether the shutter member 1400 is opened or closed based on the amount and wavelength band of the light incident on the light receiving element 1230.

For example, in the operation of receiving light (S50), the light receiving element 1230 may receive the light having a wavelength band corresponding to the light source 1210. However, in the operation of receiving light (S50), light deviating from a set light amount range may be incident on the light receiving element 1230. Here, the set light amount range may be a value of the amount of light reflected by the shutter member 1400 and incident on the light receiving element 1230 when the components of the light emitting part 1010 are normal. In addition, in the operation of receiving light (S50), light having the set light amount range may be incident on the light receiving element 1230, but light having a wavelength band that does not correspond to the light source 1210 may be incident thereon.

Specifically, the light deviating from the set light amount range may be incident on the light receiving element 1230 due to damage, separation, or the like of the components of the light emitting part 1010. For example, the light deviating from the set range, such as being less than or exceeding the set light amount range due to the damage, separation, and the like of the diffuser 1300, may be incident on the light receiving element 1230.

In this case, the controller 1730 may determine that the components of the light emitting part 1010 are not in a normal state, such as damage and separation. Accordingly, the controller 1730 may maintain the closed state without opening the shutter member 1400 in the operation of controlling the opening and closing of the shutter member (S70). In addition, the controller 1730 may turn off the power of the light source 1210 in the operation of controlling the opening and closing of the shutter member. Accordingly, the camera apparatus 10A according to another embodiment can prevent abnormal light from being emitted toward the object, thereby increasing safety in use.

In addition, in the operation S70, the light having a wavelength band corresponding to the light source 1210 may satisfy the set light amount range and may be incident on the light receiving element 1230. In this case, the controller 1730 may determine that the components of the light emitting part 1010 are in the normal state and open the shutter member 1400. Accordingly, the light passing through the diffuser 1300 may be emitted toward the object by passing through the opened shutter member 1400. In other words, the camera apparatus 10A may emit safe light having the set light amount toward the object.

The operation of controlling the opening and closing of the shutter member (S70) may further include an operation of detecting an impact or acceleration.

The operation of detecting the impact or acceleration is an operation of detecting the impact or acceleration by the detection part 1730, and may be an operation of controlling the opening and closing of the shutter member 1400 based on the detected impact or acceleration.

The operation of detecting the impact or acceleration may proceed after the shutter member 1400 is open. For example, after the shutter member 1400 is open in the operation of controlling the opening and closing of the shutter member (S70), the detection part 1730 may detect the impact or acceleration applied to the camera apparatus 10A. At this time, when the impact or acceleration detected by the detection part 1730 exceeds the set range, the controller 1730 may turn off the power of the light source 1210. In addition, the controller 1730 may close the shutter member 1400.

Alternatively, after the shutter member 1400 is open, no impact or acceleration may be applied to the camera apparatus 10A, or the impact or acceleration within the set range may be detected. In this case, the controller 1730 may maintain the shutter member 1400 in the open state while maintaining an ON state without turning off the power of the light source 1210.

In addition, the operation of detecting the impact or acceleration may proceed once more in the operation of controlling the opening and closing of the shutter member (S70). Accordingly, the shutter member 1400 may be open when the wavelength band and the amount of light incident on the light receiving element 1230 are satisfied and at the same time, the impact or acceleration set in the camera apparatus 10A is satisfied.

In this case, the shutter member 1400 may be open and light may be emitted toward the object, and in this process, the above-described operation of detecting the impact or acceleration may proceed again.

When the light emitting part 1010 maintains the normal state and the impact or acceleration within the set range is not detected, the camera apparatus 10A may automatically terminate the operation after operating for a set time. In addition, the camera apparatus 10A may be temporarily stopped or terminated by a user's control while operating for the set time.

In other words, the light emitting part 1010 of the camera apparatus 10A according to another embodiment may include the light receiving element 1230. Accordingly, it is possible to confirm whether the light emitting part 1010 is in the normal state, for example, whether the components are damaged and separated. In particular, it is possible to confirm whether the diffuser 1300 is damaged and separated based on the light incident on the light receiving element 1230. In addition, the camera apparatus 10A may include the detection part 1730 configured to detect an impact or acceleration. Accordingly, when the impact or acceleration is applied to the camera apparatus 10A, it is possible to stop the operation of the camera apparatus 10A and confirm whether the components are damaged and separated again.

Accordingly, the camera apparatus 10A according to another embodiment may effectively determine whether to normally operate, and thus may have improved safety.

FIGS. 53 and 54 are perspective views of a mobile terminal and a vehicle to which the camera apparatus according to the embodiment is applied. The camera apparatuses 10 and 10A according to the embodiments may be applied to an optical device.

First, referring to FIG. 53, the camera apparatuses 10 and 10A according to the embodiments may be applied to a mobile terminal 20. The mobile terminal 20 according to the embodiment may have a first camera apparatus 10 or 10A and a second camera apparatus 10 or 10A disposed on a rear surface thereof.

The first camera apparatus is the aforementioned camera apparatus 10 or 10A, and may include the light emitting part and the light receiving part. The first camera apparatus may be a time of flight (TOF) camera.

The second camera apparatus 10 or 10A may include an image capturing function. In addition, the second camera apparatus 10 or 10A may include at least one of an auto focus function, a zoom function, and an OIS function. The second camera apparatus 10 or 10A may process image frames of still images or moving images obtained by the image sensor in a capturing mode or a video call mode. The processed image frame may be displayed on a predetermined display part and stored in a memory. In addition, although not shown in the drawings, a camera may also be disposed on a front surface of the mobile terminal 20. For example, the first camera apparatus and the second camera apparatus may intensively perform different functions as well.

An auto focus device 2510 and a flash module 2530 may be disposed on the rear surface of the mobile terminal 20.

The auto focus device 2510 may include one of packages of a surface light emitting laser element as the light emitting part.

The auto focus device 2510 may include an auto focus function using a laser. The auto focus device 2510 may be mainly used in a condition in which the auto focus function using the images of the camera apparatuses 10 and 10A is degraded, for example, in an environment that is close to 10 m or less or dark.

The auto focus device 2510 may include the light emitting part including a vertical cavity surface emitting laser (VCSEL) semiconductor element and the light receiving part configured to convert light energy into electrical energy, such as a photodiode.

The flash module 2530 may include the light emitting element configure to emit light therein. The flash module 2530 may be operated by the camera operation of the mobile terminal or the user's control.

Accordingly, the user may capture and display the object using the mobile terminal 20. In addition, the user may effectively identify the depth map of the object using the first camera apparatus 10A.

In addition, referring to FIG. 54, the camera apparatuses 10 and 10A according to the embodiments may be applied to a vehicle 3000.

The vehicle 3000 according to the embodiment may include wheels 13FL and 13FR rotated by a power source and a predetermined sensor. The sensor may be a camera sensor 2000, and the camera sensor 2000 may be a camera sensor including the above-described camera apparatus 10A.

The vehicle 3000 according to the embodiment may acquire image information and depth map through the camera sensor 2000 configured to capture a front image or a surrounding image, determine a lane unidentified situation using the image information and the depth map, and generate a virtual lane when the lane is unidentified.

For example, the camera sensor 2000 may acquire the front image by capturing the front of the vehicle 3000, and a processor (not shown) may acquire image information by analyzing an object included in the front image.

For example, when the camera sensor 2000 captures objects such as a median strip, a curb, or a street tree corresponding to a lane, an adjacent vehicle, a traveling obstacle, and an indirect road mark in the captured image, the processor may detect not only the image information of the object but also the depth map of the object. In other words, the embodiment may provide more specific and accurate information on the objects to an occupant of the vehicle 3000.

Although the embodiments have been mainly described above, this is merely illustrative and does not limit the present invention, and those skilled in the art to which the present invention pertains will be able to understand that various modifications and applications not exemplified above are possible without departing from the essential characteristics of the embodiments. For example, each component specifically shown in the embodiment may be implemented by modification. In addition, differences related to the modifications and applications should be construed as being included in the scope of the present invention defined in the appended claims.

The invention claimed is:

1. A camera apparatus, comprising:
a substrate;
a light emitting part including a light source disposed on the substrate, a holder disposed on the substrate, an optical part disposed on the light source, a driving part configured to move the optical part along an optical axis, and a photodetector disposed on the substrate;
a light receiving part including an image sensor disposed on the substrate; and
a controller configured to:
control the optical part or the light source using an output value received from the photodetector; and
detect, as an abnormal state, a case in which a slope between a first output value of the photodetector and a second output value of the photodetector is positive.

2. The camera apparatus of claim 1, wherein the light source overlaps the optical part along the optical axis, and
wherein the photodetector overlaps the optical part along the optical axis.

3. The camera apparatus of claim 1, wherein the optical part is configured to move from a first height to a second height on the substrate along the optical axis,
wherein the second height is a height when the optical part is disposed at a highest height, and
wherein the first height is a height when the optical part is disposed at a lowest height.

4. The camera apparatus of claim 1, wherein a first line and a second line form a first angle, wherein the first line is a line connecting the photodetector and an intersection of the optical axis and a lowermost surface of the optical part, wherein the second line is a line connecting the photodetector and an intersection of the optical axis and an uppermost surface of the light source, and wherein the first angle ranges from 10 degrees to 80 degrees.

5. The camera apparatus of claim 4, wherein a portion where the first line and the photodetector are connected is a central area of the photodetector, and wherein a portion where the second line and the photodetector are connected is the central area of the photodetector.

6. The camera apparatus of claim 1, wherein the controller is further configured to decrease or block a current applied to the light source.

7. The camera apparatus of claim 1, wherein the controller is further configured to adjust a current applied to the light source when the first output value of the photodetector deviates from a critical range of the photodetector.

8. A camera apparatus, comprising:
a substrate;
a light emitting part including a light source disposed on the substrate, a holder disposed on the substrate, an optical part disposed on the light source, a driving part configured to move the optical part along an optical axis, and a photodetector disposed on the substrate;
a light receiving part including an image sensor disposed on the substrate; and
a controller configured to:
control the optical part or the light source using an output value received from the photodetector; and
detect, as an abnormal state, a case in which a slope between a first output value of the photodetector and a second output value of the photodetector is within a predetermined value.

9. The camera apparatus of claim 8, wherein the controller is further configured to decrease or block a current applied to the light source.

10. The camera apparatus of claim 8, wherein the controller is further configured to adjusts a current applied to the light source when the first output value of the photodetector deviates from a critical range of the photodetector.

11. The camera apparatus of claim 8, wherein the light source overlaps the optical part along the optical axis, and
wherein the photodetector overlaps the optical part along the optical axis.

12. The camera apparatus of claim 8, wherein the optical part is configured to move from a first height to a second height on the substrate along the optical axis,
wherein the second height is a height when the optical part is disposed at a highest height, and
wherein the first height is a height when the optical part is disposed at a lowest height.

13. The camera apparatus of claim 8, wherein a first line and a second line form a first angle,
wherein the first line is a line connecting the photodetector and an intersection of the optical axis and a lowermost surface of the optical part,
wherein the second line is a line connecting the photodetector and an intersection of the optical axis and an uppermost surface of the light source, and
wherein the first angle ranges from 10 degrees to 80 degrees.

14. The camera apparatus of claim 13, wherein a portion where the first line and the photodetector are connected is a central area of the photodetector, and
wherein a portion where the second line and the photodetector are connected is the central area of the photodetector.

* * * * *